(12) United States Patent
Norimatsu et al.

(10) Patent No.: US 8,123,411 B2
(45) Date of Patent: Feb. 28, 2012

(54) SENSOR-EQUIPPED BEARING FOR WHEEL

(75) Inventors: Takayuki Norimatsu, Iwata (JP); Toru Takahashi, Iwata (JP); Kazuo Komori, Iwata (JP); Kazuhiro Baba, Iwata (JP); Kentarou Nishikawa, Iwata (JP)

(73) Assignee: NTN Corporation, Osaka (JP)

( * ) Notice: Subject to any disclaimer, the term of this patent is extended or adjusted under 35 U.S.C. 154(b) by 67 days.

(21) Appl. No.: 12/450,442

(22) PCT Filed: Mar. 25, 2008

(86) PCT No.: PCT/JP2008/000713
§ 371 (c)(1),
(2), (4) Date: Sep. 25, 2009

(87) PCT Pub. No.: WO2008/117534
PCT Pub. Date: Oct. 2, 2008

(65) Prior Publication Data
US 2010/0046871 A1 Feb. 25, 2010

(30) Foreign Application Priority Data

| Mar. 27, 2007 | (JP) | 2007-080558 |
| Mar. 30, 2007 | (JP) | 2007-093779 |
| Jul. 6, 2007 | (JP) | 2007-178356 |
| Jul. 12, 2007 | (JP) | 2007-182780 |
| Jul. 23, 2007 | (JP) | 2007-190358 |

(51) Int. Cl.
F16C 32/00 (2006.01)
G01L 3/14 (2006.01)
(52) U.S. Cl. .................. 384/448; 73/862.322
(58) Field of Classification Search ............ 384/448, 384/544, 589; 73/862.322
See application file for complete search history.

(56) References Cited

U.S. PATENT DOCUMENTS

| 6,098,469 A * | 8/2000 | Nicot ................... 73/862.55 |
| 7,216,551 B2 * | 5/2007 | Koyagi et al. ............ 73/862.322 |
| 7,882,752 B2 * | 2/2011 | Ozaki et al. ............ 73/862.322 |

(Continued)

FOREIGN PATENT DOCUMENTS

JP 6-47833 6/1994

(Continued)

OTHER PUBLICATIONS

English Translation of the International Preliminary Report on Patentability, mailed Oct. 29, 2009 in corresponding International Patent Application PCT/JP2008/000713.

(Continued)

Primary Examiner — Thomas R Hannon
Assistant Examiner — Matthew R Vaerewyck

(57) ABSTRACT

To provide a sensor equipped wheel support bearing assembly, in which a load sensor can be installed compactly in an automotive vehicle, maintaining a high sensitivity while damage and/or malfunction caused by the external environments and/or the electromagnetic noises are avoided, with low manufacturing cost. This bearing assembly includes outer and inner members having respective rolling surfaces and a plurality of rows of rolling elements interposed between those rolling surfaces. A strain sensor unit including a sensor element is fitted to one of the outer and inner members, which is a stationary member, for example, the outer member. A sensor mounting surface of the strain sensor unit fitted with the sensor element has a covering member made of a resin, which is over-molded, or an elastomer bonded by vulcanization, so as to cover the sensor element sealingly.

7 Claims, 26 Drawing Sheets

U.S. PATENT DOCUMENTS

| | | | |
|---|---|---|---|
| 2006/0107765 A1* | 5/2006 | Sentoku | 73/862.322 |
| 2006/0278022 A1* | 12/2006 | Ono | 73/862.322 |
| 2007/0051187 A1* | 3/2007 | McDearmon | 73/862.322 |
| 2009/0120184 A1* | 5/2009 | Ozaki et al. | 73/494 |
| 2009/0199660 A1 | 8/2009 | Ozaki et al. | |
| 2010/0046871 A1* | 2/2010 | Norimatsu et al. | 384/448 |

FOREIGN PATENT DOCUMENTS

| | | |
|---|---|---|
| JP | 2003-530565 | 10/2003 |
| JP | 3657006 | 3/2005 |
| JP | 2006-062252 | 3/2006 |
| JP | 2006-77807 | 3/2006 |
| JP | 2008-51239 | 3/2008 |
| WO | 97/04295 | 2/1997 |
| WO | 01/77634 A2 | 10/2001 |
| WO | 2007/029512 A1 | 3/2007 |

OTHER PUBLICATIONS

U.S. Appl. No. 12/310,444, filed Feb. 25, 2009, Takayoshi Ozaki, et al., NTN Corporation.

U.S. Appl. No. 11/991,480, filed Mar. 5, 2008, Takayoshi Ozaki, et al., NTN Corporation.

U.S. Appl. No. 12/224,846, filed Sep. 8, 2008, Takayoshi Ozaki, et al., NTN Corporation.

International Search Report for PCT/JP2008/000713, mailed May 1, 2008.

Japanese Office Action issued Dec. 13, 2011 in corresponding Japanese Patent Application No. 2007-080558.

\* cited by examiner

SENSOR-EQUIPPED BEARING FOR WHEEL

CROSS REFERENCE TO RELATED APPLICATIONS

This application claims the benefit under 35 U.S.C. Section 371, of PCT International Application No. PCT/JP2008/000713, filed Mar. 25, 2008, which is based on and claims priority to Japanese patent application No. 2007-080558, filed Mar. 27, 2007, Japanese patent application No. 2007-093779, filed Mar. 30, 2007, Japanese patent application No. 2007-178356, filed Jul. 6, 2007, Japanese patent application No. 2007-182780, filed Jul. 12, 2007, and Japanese patent application No. 2007-190358, filed Jul. 23, 2007, the disclosures of which are hereby incorporated by reference.

BACKGROUND OF THE INVENTION

1. Field of the Invention

The present invention relates to a sensor equipped wheel support bearing assembly having a load sensor built therein for detecting a load imposed on a bearing unit for a vehicle wheel.

2. Description of the Related Art

For safety travel of an automotive vehicle, the wheel support bearing assembly has been well known, in which sensors for detecting the respective rotation speeds of the vehicle wheels are employed. While the automobile traveling safety precaution is generally taken by detecting the rotational speed of the respective vehicle wheel in various locations, it is not sufficient with only the rotational speed of the vehicle wheel and, therefore, it is desired to achieve a control for safety purpose with the use of other sensor signals.

In view of the above, it may be contemplated to achieve the vehicle stability control based on a load acting on each of the vehicle wheels during travel of an automotive vehicle. By way of example, a large load acts on the outside wheels during the cornering, on the wheels on one side during the run along horizontally inclined road surfaces or on the front wheels during the braking, and, thus, uneven load acts on the vehicle wheels. Also, even in the case of the uneven live load, the loads acting on those wheels tend to become uneven. For this reason, if the loads acting on the wheels can be detected as needed, suspension systems for the vehicle wheels can be controlled beforehand based on results of detection of the loads so that the stability control of the automotive vehicle during the traveling thereof (for example, prevention of a rolling motion during the cornering, prevention of diving of the front wheels during the braking, and prevention of diving of the vehicle wheels brought about by an uneven distribution of live loads) can be accomplished. However, it is difficult to find a suitable space for installation of the load sensor for detecting the load acting on the respective vehicle wheel and, therefore, the stability control through the detection of the load is hardly realized.

Also, in the event in the near future the steer-by-wire is introduced and the system in which the wheel axle and the steering come not to be coupled mechanically with each other is increasingly used, transmission of information on the road surface to the steering wheel, then hold by a driver, by detecting a wheel axis direction load would come to be required.

In order to meet those needs hitherto recognized, a wheel support bearing assembly has been suggested, in which a strain gauge is affixed to an outer ring of the wheel support bearing assembly so that strains occurring in the outer ring can be detected when the rolling elements pass through. (See, for example, the Patent Documents 1 listed below.) Also, the wheel support bearing assembly has been suggested, in which a sensor device including not a strain gauge attached directly to an outer ring, but a load sensor for detecting strains attached to a sensor support member. (See, for example, the Patent Document 2 listed below.) In the case of the Patent Document 2 referred to, the sensor support member is made up of a horizontal portion, held in engagement with an outer peripheral surface of an outer ring, and a vertical portion held in engagement with a vehicle body fitting flange of the outer ring, with the load sensor attached to the horizontal portion.

[Patent Document 1] Japanese Laid-open Patent Publication No. 2003-530565
[Patent Document 2] Japanese Laid-open Patent Publication No. 2006-077807
[Patent Document 3] JP Patent Application No. 2006-062252
[Patent Document 4] JP Patent Application No. 2006-228906

SUMMARY OF THE INVENTION

The outer ring of the wheel support bearing assembly is a bearing component part having a rolling surface defined therein and required to have a strength, which bearing component part is manufactured through complicated process steps including, for example, a plastic forming, a turning process, a heat treatment and a grinding process, and, accordingly, while a strain gauge is attached to the outer ring such as disclosed in the Patent Document 1 referred to above, there is a problem in that the productivity is low and the cost of manufacturing thereof during a mass production tends to become high. Also, it is not easy to detect a strain occurring in the outer ring with high sensitivity and, when a result of such detection is utilized in controlling the vehicle stability of an automotive vehicle then travelling, a problem will arise in association with the accuracy of the control. There is also such a problem that since a portion of the wheel support bearing assembly is processed, the bearing rigidity tends to be lowered.

When arrangement is made to fit the sensor device, including a sensor support member and a load sensor fitted to the sensor support member for the detection of strains, to the outer ring such as disclosed in the Patent Document 2 referred to above, not only can the load sensor be installed easily, but also the productivity can be increased and, when the position at which the sensor support member is fixed to the outer ring is properly set, the strains occurring in the outer member can be detected with a high sensitivity. However, in order for the strains in the outer ring to be detected with a high sensitivity, it is necessary to fix the sensor support member to the outer ring at two or more locations spaced from each other. For this reason, the shape of the sensor support member tends to become complicated, making it difficult to fix the sensor support member to the outer ring in a stabilized posture. In particular, where the sensor support member is to be fixed to a peripheral surface of the outer ring which has a cylindrical surface shape, rattling tends to occur between respective contact surfaces of the sensor support member and the outer ring and, therefore, the posture in which the sensor support member is fixed is apt to become instable. When the posture of fixing the sensor support member is instable, the strains occurring in the outer ring will not be properly transferred to the sensor support member, failing to detect the strains in the outer ring with a high precision.

In view of the foregoing, the applicant, to which the present invention has been assigned, has suggested fixing of a strain generating member and a strain sensor unit to the outer ring through a fixing member such as, for example, a spacer (in the Patent Documents 3 and 4 listed above). In such case, there is the possibility that displacement in position of the fixing member referred to above may result in an undesirable movement of the fulcrum about which the sensor deforms, resulting in an increased variation in sensor strain sensitivity.

In order to alleviate those problems, it may be contemplated to fit a strain sensor unit, made up of a strain generating member and a sensor element such as, for example, a strain gauge fitted to the strain generating member for detecting strains occurring in the strain generating member, to, for example, the outer ring which is a stationary ring of a wheel support bearing assembly. In such case, the strain generating member is rendered to have a first contact fixing element, which is fixed to a surface of a vehicle body fitting flange in the outer ring, and a second contact fixing element fixed to an outer periphery of the outer ring.

In the wheel support bearing assembly of the structure described above, when a load acts on a hub unit, which is a rotating member, during the travel of an automotive vehicle, the outer member undergoes a deformation through rolling elements and such deformation is transferred to the strain generating member of the strain sensor unit so that the sensor element, fitted to the strain generating member, may measure the strains. Since the first contact fixing element of the strain generating member is fixed to the surface of the vehicle body fitting flange in the outer ring while the second contact fixing element is fixed to the outer ring outer periphery, respective positions of the first and second contact fixing elements in a radial direction are different from each other and the strains occurring in the outer ring can appear as expanded in the strain generating member. Since the sensor element measures the expanded strains, the strains occurring in the outer ring can be detected with a high sensitivity.

In the construction described above, however, since the strain sensor unit is exposed to the outside of the wheel support bearing assembly, there is the possibility that due to external environments (ingress of muddy water and/or collision with foreign matter), the strain sensor unit may be damaged or malfunctioned and, therefore, it would not be possible to achieve an accurate strain detection for a long time. Also, since the sensor element employed in the strain sensor unit is an electronic component part, it tends to be affected by electromagnetic noises from the outside and, therefore, the reliability of a result of detection will be lowered if the sensor element is exposed to the outside as hereinabove described.

An object of the present invention is to provide a sensor equipped wheel support bearing assembly, in which a sensor for the detection of the load can be installed in an automotive vehicle in a stabilized posture and compactly, which can detect the load, acting on a vehicle wheel, for a long time with a high sensitivity while any possible damage and/or malfunction caused by the external environments and/or influence brought about by the electromagnetic noises are avoided, and which is low in cost during the mass production, is effective to avoid an undesirable movement of the fulcrum, about which the sensor deforms, and effective to reduce variation in sensor strain sensitivity.

The sensor equipped wheel support bearing assembly in accordance with one embodiment of the present invention is a wheel support bearing assembly for supporting a vehicle wheel rotatably relative to a vehicle body, including an outer member having an inner periphery formed with a plurality of rolling surfaces; an inner member having rolling surfaces defined therein in face-to-face relation with the respective rolling surfaces in the outer member; a plurality of rows of rolling elements interposed between those rolling surfaces; a strain sensor unit, made up of a strain generating member and a sensor element fitted to the strain generating member for detecting strains induced in the strain generating member, is fitted to one of the outer and inner members, that serves as a stationary member; and a covering member that covers at least the sensor element sealingly, provided on a mounting surface of the strain generating member of the strain sensor unit, on which the sensor element is mounted, the covering member being made of a resin, which is over-molded, or an elastomer bonded by vulcanization.

When a load acts on the rotating member incident to travel of the automotive vehicle, the stationary member undergoes deformation through the rolling elements, which deformation in turn result in a strain brought about on the strain generating member. The strain element fitted to the strain generating member detects the strain induced in the strain generating member. By determining the relation between the strain and the load beforehand by means of a series of experiments and/or simulations, the load acting on the vehicle wheel can be detected from an output of the sensor element. The load so detected is processed by the sensor signal processing circuit and is then used in vehicle control of the automotive vehicle.

The wheel support bearing assembly of the structure described above is so designed that the strain sensor unit including the strain generating member and the sensor element fitted to the strain generating member is fitted to the stationary member and, therefore, the sensor for the detection of the load can be installed compactly. Also, since the strain generating member is a simple component part that is fitted to the stationary member, fitting of the sensor element thereto makes it possible to render it to be excellent in mass productivity and to facilitate reduction in cost.

In particular, since the covering member made of an over-molded resin or an elastomer bonded by vulcanization is provided in the mounting surface of the strain generating member where the sensor element is fitted, to thereby the sensor element to be covered sealingly with this covering member, it is possible to avoid an undesirable damage or malfunction of the sensor element, which would otherwise result from intrusion of muddy water and/or collision with foreign matter depending on the external environment. As a result thereof, a highly precise strain detection can be achieved for a long time. It is also possible to prevent influences of the electromagnetic noises, brought about from the outside, from being extended to the sensor element and, therefore, a highly precise strain measurement can be accomplished.

The strain generating member referred to above may have first and second contact fixing elements fixed to respective locations of the stationary member, in which the first contact fixing element is fixed to a flange surface provided in the stationary member and the second contact fixing element is fixed to a peripheral surface of the stationary member.

While hereinabove described the strain generating member has the contact fixing element at two locations, in which the first contact fixing element is the flange surface provided in the stationary member and the second contact fixing element is the peripheral surface of the stationary member, respective positions of the first and second contact fixing elements in a radial direction differ from each other and the strains occurring in the stationary member can be caused to appear as transferred and expanded in the strain generating member. Since the sensor element measures the strains so transferred and expanded, the strain occurring in the stationary member can be detected with a high sensitivity and the accuracy of measurement of the load can be increased.

In one embodiment of the present invention, the sensor element in the strain sensor unit may be provided with a cable drawn outwardly from a location proximate to the second contact fixing element in the strain generating member fixed to the peripheral surface of the stationary member in a direction circumferentially of the stationary member.

In such case, since the cable for the sensor element can be wired along the peripheral surface of the stationary member, the cable will not disturb as compared with the wiring thereof along the flange of the stationary member, and, therefore, influences of the electromagnetic noises on an output signal of the sensor element can be reduced further.

While hereinabove described the cable for the sensor element in the strain sensor unit is drawn outwardly from the location proximate to the contact fixing element of the strain generating member relative to the peripheral surface of the stationary member in the peripheral direction of the stationary member, the cable may be fixed to the peripheral surface of the stationary member by means of a clamp member equipped with a ferrite.

In the case of this construction, since the cable is fixed to the peripheral surface of the stationary member by the use of the clamp member provided with a ferrite core, the resistance to noises appearing in a signal path from the sensor element to a signal processing circuit can be increased. Also, addition of the ferrite core, having a function of effectively attenuating a high frequency component such as the electromagnetic noises, to the clamp member is effective to eliminate the need of an extra space for installation of the ferrite core and, also, to facilitate fixing of the ferrite core.

The use may be made of an acting force calculating section operable in response to an output from the sensor element to calculate an external force acting on the wheel support bearing assembly or a force acting between a tire and a road surface.

When the external force, which is obtained from the acting force calculating section and which acts on the wheel support bearing assembly or the working force, which is obtained from the acting force calculating section and which is developed between the tire and the road surface, is used in a vehicle control of the automotive vehicle, a meticulous vehicle control can be achieved.

In one embodiment of the present invention, the strain generating member may of an L-shaped configuration including a radially oriented segment, extending in a radial direction, and an axially oriented segment extending in an axial direction. In such case, strains tend to concentrate in the vicinity of a corner on the side of the radially oriented segment, which lie between the radially oriented segment and the axially oriented segment, and, therefore, a larger strain than that in the outer member appears. Since the strains, which appears in the form of this large strain, can be measured, the strain occurring in the outer member can be detected with a high sensitivity and the strain measuring accuracy can be increased.

In one embodiment of the present invention, the strain generating member of the strain sensor unit may include two or more fixing faces adapted to be fixed to respective locations of the outer member spaced from each other, and contact fixing elements each interposed between each of the fixing faces and a fixing target surface to which the strain sensor unit is to be fixed, in which the contact fixing element is in the form of a spacer member having opposite end faces, one end face oriented towards the fixing face having a shape conforming with that of the fixing face and the other end face oriented towards the fixing target surface having a shape conforming with that of the fixing target surface.

When the stationary member undergoes deformation, the outer member deforms regardless of whether the outer member is the rotating member or whether the outer member is the stationary member. Deformation of the outer member brings about a strain on the strain generating member through the spacer member. The strain generating member is fixed at the fixing faces at least the two locations spaced a distance from each other relative to the outer member and since two or more deformations of different degrees are transferred from the outer member, the strain generating member deforms considerably depending on the difference between those deformations.

Since between each of the fixing faces and the fixing target surface where the strain sensor unit is to be fixed, the contact fixing element, which is a spacer member and which has an end face oriented towards the side of the fixing face, which end face is of the same shape as that of the fixing face, and also has an end face oriented towards the side of the fixing target surface, which end face is of the same shape as that of the fixing target surface, is interposed, the strain generating member can be fixed to the outer member in a stabilized posture. For this reason, the strain occurring in the outer member is accurately transferred to the strain generating member and, hence, the strain occurring in the outer member can be detected with a high precision.

Since the wheel support bearing assembly is such that the strain sensor unit made up of the strain generating member and the sensor element fitted to this strain generating member is fixed to the outer member through the spacer member, the sensor for the detection of the load can be installed compactly in the automotive vehicle. Interposition of the spacer member between the strain generating member and the outer member makes it possible to form the strain generating member in a simplified shape. When the sensor element is fitted to the strain generating member of the simplified shape, it is possible to render the mass productivity to be excellent and the cost can be reduced. Also, since it is possible to minimize the processing of the wheel support bearing assembly, the bearing rigidity will not be lowered.

At least one of the two or more spacer members referred to above may be so designed that the end face oriented towards the fixing face is in the form of a flat face and the end face oriented towards the fixing target surface is in the form of a cylindrical surface.

If the end face of the spacer member oriented towards the side of the fixing face is a flat face, the fixing face of the strain generating member can have a flat face and the strain generating member can be simplified in shape. Also, if the end face of the spacer member oriented towards the fixing target surface is a cylindrical surface, the spacer member can be brought into tight contact with the outer peripheral surface of the outer member and, therefore, the posture in which the strain generating member is fixed can be stabilized.

In one embodiment of the present invention, one of the outer and inner members, which serves as the stationary member, may be formed integrally with a sensor fixing boss, and the strain generating member and at least one strain sensor unit fitted to the strain generating member may be provided in the stationary member through the sensor fixing boss.

Since the wheel support bearing assembly is so designed that since the strain generating member and the strain sensor unit fitted to this strain generating member are so constructed as to be fitted to the stationary member, the sensor for the load detection can be installed compactly in the automotive vehicle. Since the strain generating member is a simple component parts that is fitted to one of the outer and inner members serving as the stationary member, fitting of the strain sensor unit to the strain generating member is effective to provide an excellent mass productivity and to reduce the cost.

Also, since the strain sensor unit is provided in the stationary member through the sensor fixing boss formed in the stationary member, the following functions and effects can be exhibited. The sensor fixing boss will no longer displace in position relative to a stationary member body. Accordingly, it is possible to assuredly avoid an undesirable movement of the sensor deforming fulcrum and, therefore, variation in sensor strain sensitivity can be reduced.

The sensor fixing boss referred to above may have a first boss formed integrally with the flange surface provided in the stationary member and a second boss formed integrally with the peripheral surface of the stationary member, in which the strain generating member includes a first contact fixing element adapted to be fixed to a foremost end face of the first boss in contact therewith and a second contact fixing element adapted to be fixed to a foremost end face of the second boss in contact therewith.

In this case, since the first contact fixing element is held in contact with the foremost end face of the first boss formed integrally with the flange surface of the stationary member and the second contact fixing element is held in contact with the foremost end face of the second boss formed integrally with the peripheral surface of the stationary member, and if the first and second bosses have their protruding lengths that are about equal to each other, the respective radial positions of the first and second contact fixing elements are different from each other. Accordingly, the strain in the stationary member is transferred to the strain generating member and then appears as expanded. Since the transferred and expanded strain is measured by the strain sensor unit, the strain occurring in the stationary member can be detected with a high sensitivity and the load measuring accuracy can be increased.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF THE PREFERRED EMBODIMENTS

A first embodiment of the present invention will now be described in detail with particular reference to FIGS. 1 to 3. This first embodiment is applied to a third generation model of a wheel support bearing assembly of an inner ring rotating type that is used for the support of a vehicle drive wheel. It is to be noted that in the following description, terms "outboard" and "inboard" represent one side of the vehicle body away from the longitudinal center of the vehicle body and the other side of the vehicle body close to the longitudinal center of the vehicle body, respectively, when assembled in the vehicle body, respectively.

Figure 1:
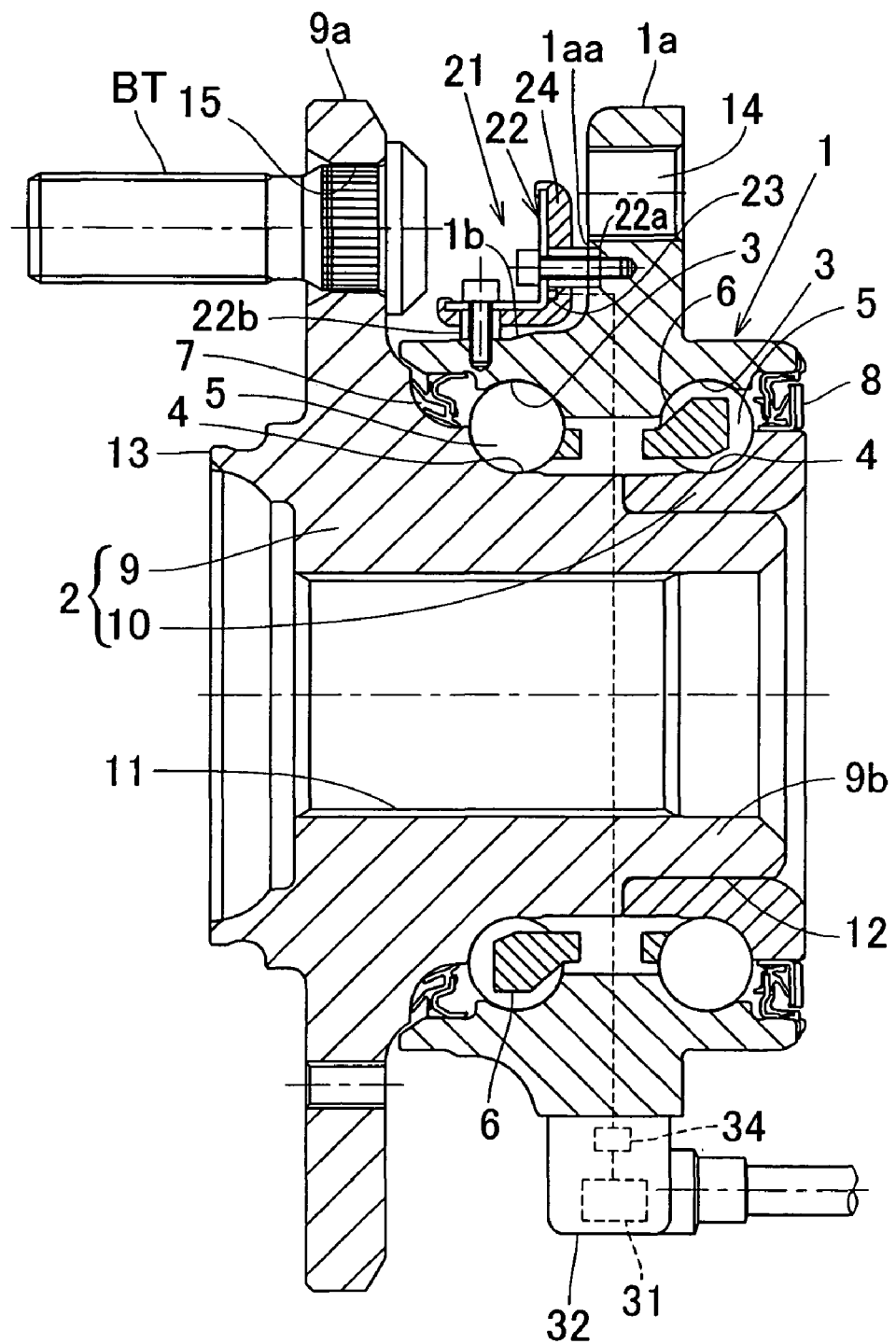
FIG. 1 is a sectional view of a wheel support bearing assembly according to a first embodiment of the present invention.

The sensor equipped wheel support bearing assembly according to this embodiment includes, as shown in FIG. 1 in a sectional view, an outer member 1 having an inner periphery formed with a plurality of rolling surfaces 3, an inner member 2 formed with rolling surfaces 4 opposed to the respective rolling surfaces 3, and a plurality of rows of rolling elements 5 interposed between the rolling surfaces 3 of the outer member 1 and the rolling surfaces 4 of the inner member 2. This wheel support bearing assembly is rendered to be a double row angular contact ball bearing type, in which the rolling elements 5 are employed in the form of balls that are rollingly retained by a retainer 6 employed for each row. The rolling surfaces 3 and 4 have an arcuately sectioned shape and the rolling surfaces 3 and 4 are so formed as to have respective contact angles held in back-to-back relation with each other. Opposite annular open ends of a bearing space delimited between the outer member 1 and the inner member 2 are sealed by respective sealing devices 7 and 8.

The outer member 1 serves as a stationary member and is of one-piece construction in its entirety including a flange 1a formed in an outer periphery thereof and adapted to be secured to a knuckle with a suspension system (not shown) for the automotive body structure. The flange 1a has a plurality of bolt holes 14 for fitting to a vehicle body defined therein at a corresponding number of peripheral portions thereof.

The inner member 2 serves as a rotating member and is made up of a hub unit 9 having a hub flange 9a for the support of a vehicle wheel, and an inner ring 10 mounted on an inboard end of a cylindrical portion 9b of the hub unit 9. The rolling surfaces 4 referred to previously are formed respectively in the hub unit 9 and the inner ring 10. The inboard end of the hub unit 9 has its outer periphery radially inwardly stepped to define an inner ring mounting area 12 of a reduced diameter, with the inner ring 10 fixedly mounted on such inner ring mounting area 12. The hub unit 9 has a center bore 11 defined therein so as to extend completely through the length of the hub unit 9. The hub flange 9a has a plurality of press-fitting holes 15 defined in respective circumferential locations thereof for receiving the corresponding hub bolts BT that are press-fitted therein. The hub flange 9a of the hub unit 9 has a root portion thereof formed with a cylindrical pilot portion 13 so as to protrude in an outboard direction, which pilot portion 13 serves to guide the vehicle wheel and brake components (not shown).

Figure 3:
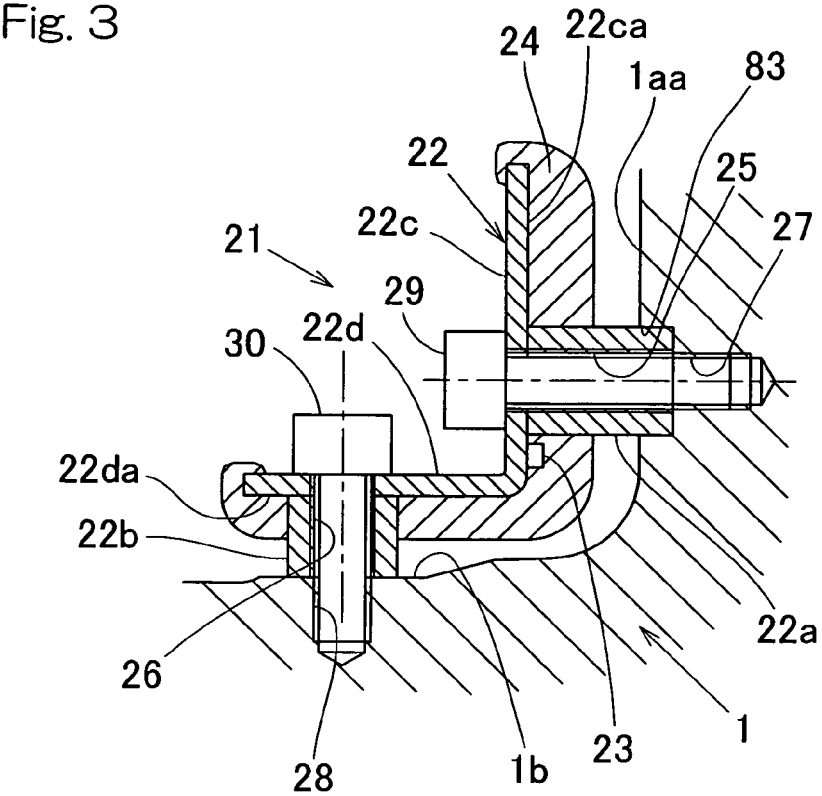
FIG. 3 is an enlarged sectional view showing a mounting structure of a strain sensor unit in the wheel support bearing assembly.

The outer member 1 has an outer peripheral portion mounted with a strain sensor unit 21 shown in FIG. 3. This strain sensor unit 21 is of a type including a strain generating member 22, on which a sensor element 23 for detecting a strain induced in such strain generating member 22 is mounted. The strain generating member 22 includes a first contact fixing element 22a adapted to be fixed to a portion in the vicinity of a bolt hole 14 defined in an outboard oriented flange surface 1aa of the vehicle body fitting flange 1a in the outer member 1 in contact therewith, and a second contact fixing element 22b adapted to be fixed to an outer peripheral surface 1b of the outer member 1 in contact therewith. The first contact fixing element 22a is fitted to a mounting recess 83 formed in the flange surface 1aa, but may be fitted to the flange surface 1aa directly in contact therewith no mounting recess 83 formed therein. The strain generating member 22 is of an L-shaped configuration having a radially oriented portion 22c, extending in a radial direction and provided with the first contact fixing element 22a, and an axially oriented portion 22d extending in an axial direction and provided with the second contact fixing element 22b. An intermediate area of the radially oriented portion 22c is provided with the first contact fixing element 22a while a foremost end portion of the axially oriented portion 22d is provided with the second contact fixing element 22b. In the illustrated embodiment, the radially oriented portion 22c and the axially oriented portion 22d of the strain generating member 22 are in the form of one piece component, while the first and second contact fixing elements 22a and 22b are in the form of separate members from the one piece component, which are fixed to such one piece component. However, the strain generating member 22 as a whole may be of one piece construction.

The sensor element 23 is arranged at a location radially inwardly of the first contact fixing element 22a on a sensor mounting surface 22ca, which is an inboard side surface of the radially oriented portion 22c of the strain generating member 22. This sensor element 23 is fixed in position to the radially oriented portion 22c by a deposit of, for example, a bonding agent. The radially oriented portion 22c, where the sensor element 23 is arranged, is preferably reduced in wall thickness to reduce the rigidity thereof as compared with that of the axially oriented portion 22d.

The strain generating member 22 is provided with a covering member 24 that covers at least the sensor element 23 in a sealing fashion, which member 22 extends from the sensor mounting surface 22ca thereof to a surface 22da of the axially oriented portion 22d thereof that is opposed to the outer peripheral surface 1b of the outer member 1. It is to be noted that the covering member 24 may be of a type capable of covering the entire surface of the strain generating member 22. This covering member 24 is made of a resinous material that is over-molded on that surface region discussed above or made of an elastomer (NBR, H-NBR, acrylic resin and so on) that is bonded by vulcanization. The over-molded resinous material may be suitably employed in the form of any one of the following materials:

Resins of the polyamide system: 66 Nylon, PPA (polyphthalamide) or the like.

Synthetic resin of the special ether system: PPS or the like.

The above listed materials added with glass fibers.

Figure 2:
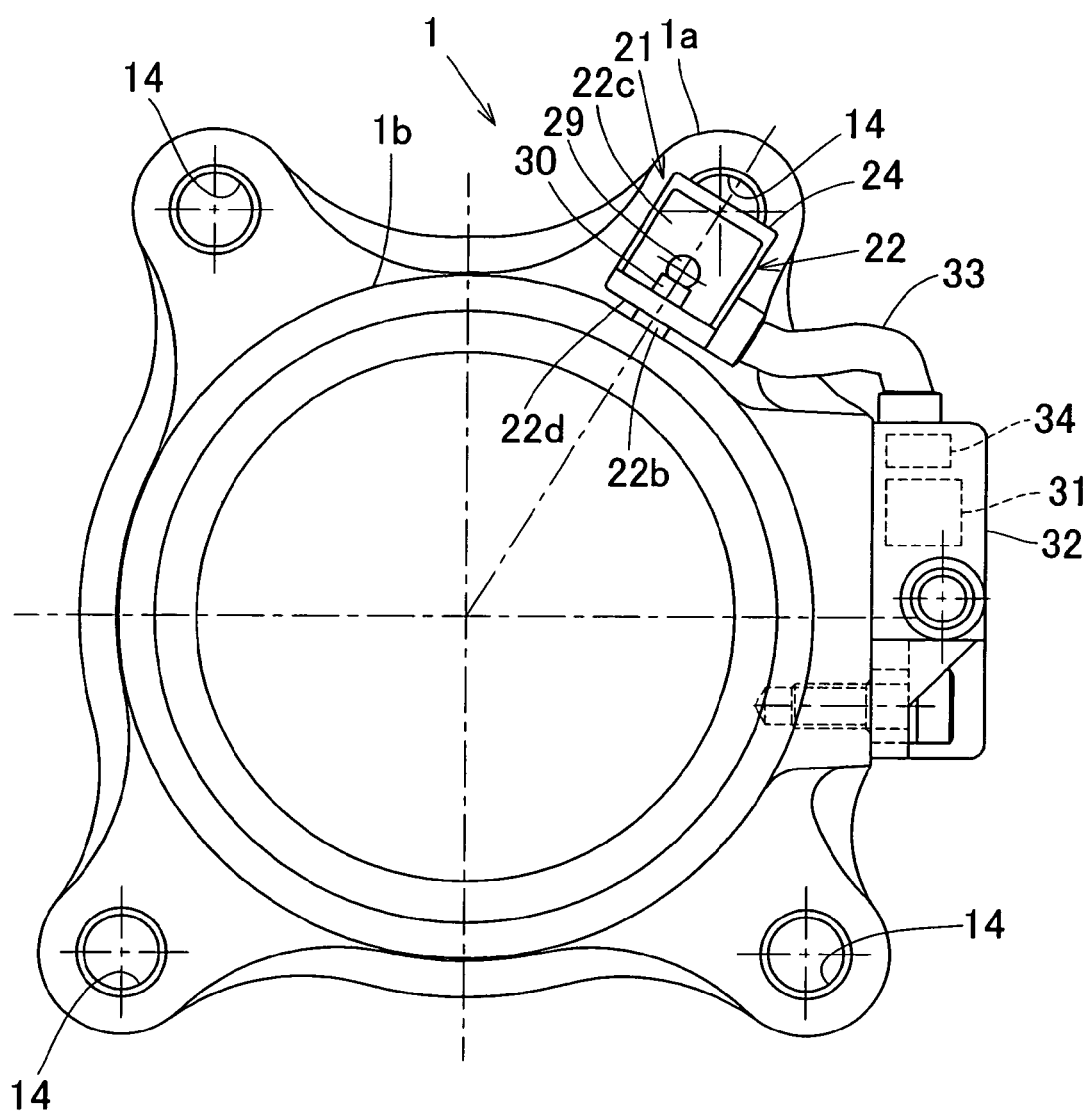
FIG. 2 is a front elevational view showing an outer member of the wheel support bearing assembly as viewed from an outboard side.

The strain sensor unit 21 referred to above is, as best shown in FIGS. 1 and 2, secured to an outer peripheral portion of the outer member 1 through the first and second contact fixing elements 22a and 22b of the strain generating member 22 so that the first and second contact fixing elements 22a and 22b can be held in the same phase relative to each other with respect to the direction circumferentially of the outer member 1. By positioning the first and second contact fixing elements 22a and 22b in the same phase relative to each other, the length of the strain generating member 22 can be reduced and, therefore, the strain sensor unit 21 can easily be installed.

The strain sensor unit 21 is fitted to the outer member 1 in a fashion as described below: As best shown in FIG. 3, the first and second contact fixing elements 22a and 22b of the strain generating member 22 is formed with respective bolt insertion holes 25 and 26 extending completely in an axial direction and in a radial direction, respectively. On the other hand, the flange surface 1aa and the outer peripheral surface 1b of the outer member 1 are formed with bolt holes 27 and 28 at positions alignable with the bolt insertion holes 25 and 26, respectively. When a bolt 29 inserted from the outboard side into the bolt insertion hole 25 in the first contact fixing element 22a is threaded into the bolt hole 27 in the flange surface 1aa of the outer member 1 and a bolt 30 inserted from an outer peripheral side into the bolt insertion hole 26 of the second contact fixing element 22b is threaded into the bolt hole 28 in the outer peripheral surface 1b of the outer member 1, the strain sensor unit 21 is fixed to the outer member 1.

The strain generating member 22 is made of such a material and formed to have such a shape that will not undergo any plastic deformation when it is fixed to the outer member 1. Also, the strain generating member 22 must be of such a shape that it does not undergo a plastic deformation even when the maximum load expected on the wheel support bearing assembly is imposed thereon. The maximum expected force referred to above means the maximum force expected during the travel of the automotive vehicle that does not lead to any automotive accident. That is because once the plastic deformation occurs in the strain generating member 22, the deformation occurring in the outer member 1 will not be transferred accurately to the strain generating member 22 and whereby therefore, because the strain measurement will be affected.

For the sensor element 23, various types may be employed. The sensor element 23 may be employed in the form of a metallic foil strain gauge, a semiconductor strain gauge or a thick film type sensor. By way of example, where the sensor element 23 is employed in the form of the metallic foil strain gauge, considering the durability of this metallic foil strain gauge, it is preferred that the amount of strain occurring in the strain sensor mounting area in the strain generating member 22 is 1500 microstrain or lower even when the maximum expected load is imposed on the wheel support bearing assembly. By the same token, where the sensor element 23 is structured by the semiconductor strain gauge, the amount of the strain is preferably microstrain or lower. Also, where the sensor element 23 is structured by the thick film sensor, the amount of the strain is preferably 1500 microstrain or lower.

As best shown in FIG. 1, the sensor element 23 of the strain sensor unit 21 is connected to an acting force calculating section 31. The acting force calculating section 31 calculates a force acting between a tire of the vehicle wheel and a road surface in response to an output signal of the sensor element 23. This acting force calculating section 31 includes a relation setting segment (not shown), in which the relation between the force acting between the wheel tire and the road surface and the output signal of the sensor element 23 is set in the form of a computing equation or a table, and is operable in response to the output signal inputted thereinto to output a working force using the relation setting segment referred to above. The contents set in the relation setting segment referred to above is set by determining through a series of tests and/or simulations.

Referring now to FIG. 2, a circuit box 32 including the acting force calculating section 31 and others is fitted to the outer peripheral surface 1b of the outer member 1. A cable 33 is drawn from the sensor element 23 of the strain sensor unit 21 and wired along the flange 1a of the outer member 1, to extend into the circuit box 32 and is then connected with the acting force calculating section 31 through a ferrite core 34. By inputting the output signal from the sensor element 23 to the acting force calculating section 31 through the ferrite core 34, influences caused by electromagnetic noises on the output signal of the sensor element 23 can be avoided.

Although the circuit box 32 accommodating therein circuit components for processing outputs from the strain sensor unit 21 provided in the wheel support bearing assembly is typically provided in an electronic control unit (ECU) of the automotive vehicle, the provision of the circuit box 32 in the vicinity of the strain sensor unit 21 in the wheel support bearing assembly such as that in the illustrated embodiment is effective to simplify labors required in wiring the strain sensor unit 21 to the circuit box 32 and the circuit box 32 can be installed compactly as compared with the case in which the circuit box 32 is installed at a location other then the wheel support bearing assembly.

The operation of the sensor equipped wheel support bearing assembly of the structure hereinabove described will now be described. When during the travel of the automotive vehicle the load is imposed on the hub unit 9, the outer member 1 undergoes a deformation through the rolling elements 5 and such deformation is transferred to the strain generating member 22 fitted to the outer member 1, accompanied by deformation of the strain generating member 22. The strain induced in the strain generating member 22 is measured by the sensor element 23. At this time, the radially oriented portion 22c of the strain generating member 22 deforms in accord with deformation of the flange 1a of the outer member 1. In the case of the illustrated embodiment now under discussion, since the strain generating member 22 is so structured that the radially oriented portion 22c has a lower rigidity as compared with that of the outer member 1 and that such strain generating member 22 may represent an L-shaped configuration including the radially oriented portion 22c and the axially oriented portion 22d having a rigidity higher than that of the radially oriented portion 22c, strains concentrate on a portion proximate to a corner area lying between the radially oriented portion 22c and the axially oriented portion 22d and on the side of the radially oriented portion 22c and, accordingly, the strain larger than that in the outer member 1 develops there. In other words, the strain developed between the radially oriented portion 22c and the axially oriented portion 22d represents a transferred and expanded form of the strain at an R portion in the base end of the flange 1a. Since this strain is measured by the sensor element 23, the strain occurring in the outer member 1 can be detected with a high sensitivity and the strain measuring accuracy can be increased.

Since change in strain varies depending on the direction and the magnitude of the load, by determining the relation between the strain and the load beforehand by means of a series of experiments and/or simulations, the external force acting on the wheel support bearing assembly or the force acting between the wheel tire and the road surface can be calculated. The acting force calculating section 31 referred to previously is operable to refer to the relation between the strain and the load, preset by means of the experiments and/or simulations as hereinabove described, to calculate the external force acting on the wheel support bearing assembly or the force acting between the wheel tire and the road surface in response to the output of the sensor element 23. Also, by outputting the output indicative of the external force acting on the wheel support bearing assembly or the force acting between the wheel tire and the road surface, a meticulous vehicle control can be achieved.

In particular, in this first embodiment of the present invention described hereinabove, since the sensor mounting surface 22*ca* of the strain generating member 22 in the strain sensor unit 21 is provided with the covering member 24, made of the over-molded resin or the elastomer bonded by vulcanization, to thereby cover at least the sensor element 23 in a sealing fashion with this covering member 24, it is possible to avoid any possible damage and/or malfunction of the sensor element 23 which would result from external environments (ingress of muddy water, collision with foreign matter or the like). As a result, it is possible to detect the strain with a high accuracy for a prolonged period of time. Also, since it is possible to avoid the sensor element 23 from being affected by influences of external electromagnetic noises, a further highly accurate strain measurement can be accomplished.

Figure 4:
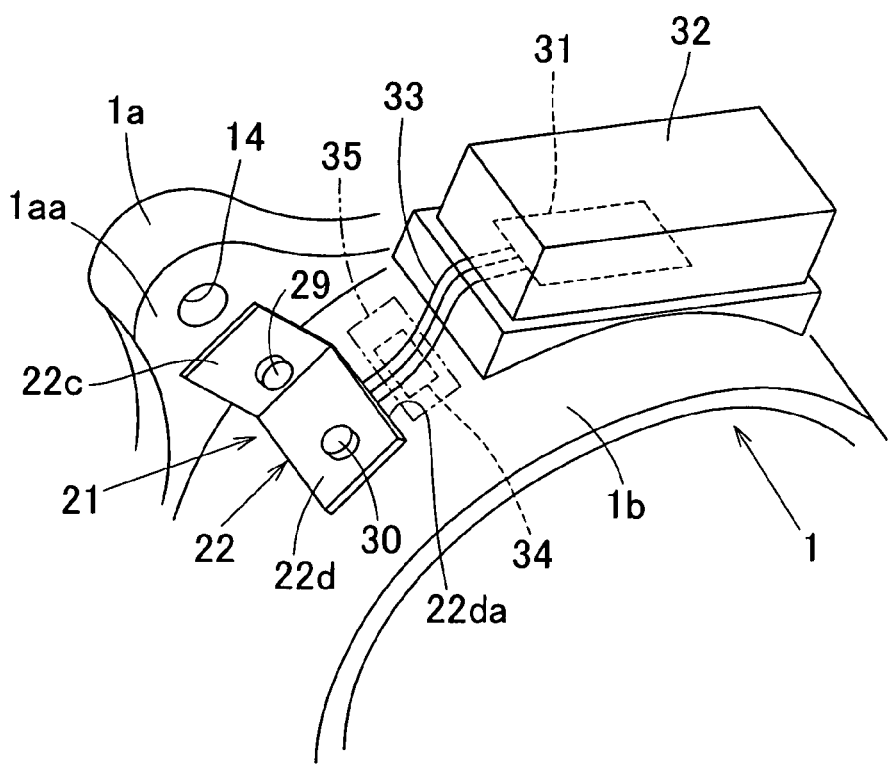
FIG. 4 is a perspective view showing a modified form of a cable wiring structure employed in the wheel support bearing assembly.

FIG. 4 illustrates a modification of the cable 33 drawn outwardly from the sensor element 23 in the strain sensor unit 21 employed in the practice of the first embodiment of the present invention described hereinabove. In this modification, the cable 33 of the sensor element 23 is drawn from a bottom surface of the axially oriented portion 22*d* of the strain generating member 22, that is, a portion of the surface 22*da* opposed to the outer peripheral surface 1*b* of the outer member 1 and proximate to the second contact fixing element 22*b* in a peripheral direction along the outer peripheral surface 1*b* of the outer member 1. The cable 33 is then connected with the calculating means 31 within the circuit box 32. In this case, a portion of the cable 33 extending along the outer peripheral surface 1*b* of the outer member 1 is fixed to the outer peripheral surface 1*b* of the outer member 1 by means of a clamp member 35 equipped with a ferrite core 34.

Figure 5A:
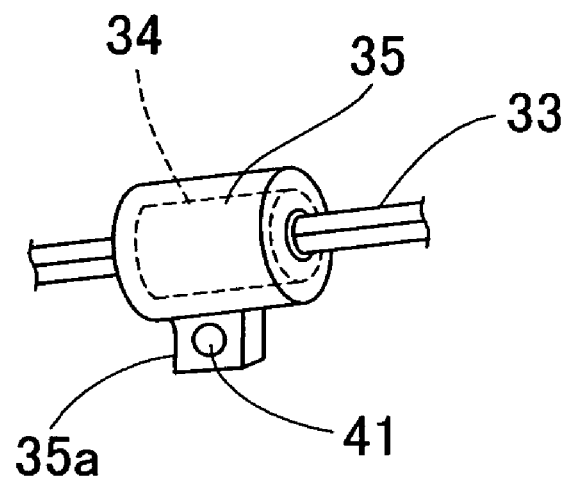
FIGS. 5A and 5B are perspective view showing different examples of a clamping member, respectively.

The clamp member 35 equipped with the ferrite core 34 is, as shown in FIG. 5A, of, for example, a thick walled cylindrical shape and has a securing flange 35*a* protruding outwardly therefrom. It is fixed to the outer member 1 by means of a bolt inserted through a hole 41 defined in the securing flange 35*a*. It is to be noted that the clamp member 35 may be of a type overlapped with two semi-cylindrical pieces having flange members 35*a* overlapping one above the other.

In the case of this modification, since the cable 33 of the sensor element 23 may be wired along the outer peripheral surface 1*b* of the outer member 1, the cable 33 will not constitute any obstruction as compared with the wiring thereof along the flange 1*a* and the influences of the electromagnetic noises on the output signal of the sensor element 23 can also be reduced.

Also, since the cable 33 is fixed to the outer peripheral surface 1*b* of the outer member 1 by means of the clamp member 35 equipped with the ferrite core 34, the resistance to noises of the signal path extending from the sensor element 23 to the acting force calculating section 31 within the circuit box 32 can be increased. Moreover, when the ferrite core 34 having a function of effectively attenuating high frequency components such as electromagnetic noises is added to the clamp member 35, no extra space is required for installation of the ferrite core 34 and fixing of the ferrite core 34 can be accomplished easily.

Figure 5B:
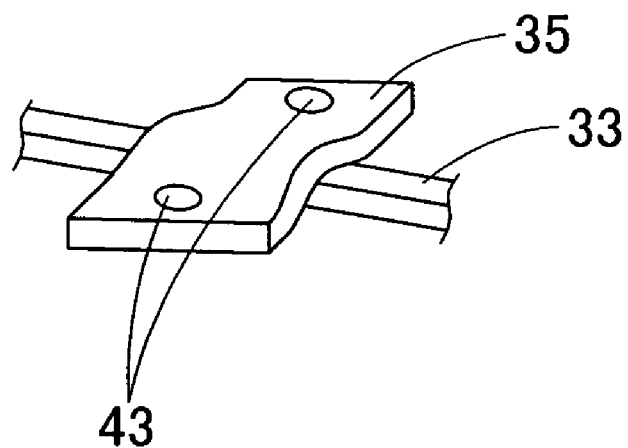

It is to be noted that the clamp member 35 may, as shown in FIG. 5B, be in the form of a saddle shaped element made of a sheeting capable of absorbing electromagnetic waves or having the electromagnetic wave absorbing sheeting applied to a surface thereof. In such case, the clamp member 35 is fixed to a surface of the outer member 1 by means of bolts inserted into holes defined at opposite ends of the clamp member 35 located in the vicinity of the cable 33 so as to extend completely therethrough, with the cable 33 held in a fashion urged against the surface of the outer member 1.

It is to be noted that although the strain sensor unit 21 employed in the practice of this first embodiment has been shown and described as employing only one sensor element 23 fitted to the strain generating member 22, a plurality of sensor elements 23 may be fitted to the strain generating member 22. When the plurality of the sensor elements 23 are fitted to the strain generating member 22, a further highly accurate load detection can be accomplished.

Also, in the first embodiment described hereinabove, the strain sensor unit 21 has been shown and described as fitted to only one location of the outer member, but the strain sensor unit 21 may be fitted to two or more locations. When the strain sensor unit 21 is fitted to two or more locations, a further highly accurate load detection can be accomplished.

In the modification shown in and described with particular reference to FIG. 4, the covering member 24 can be dispensed with, and a first modified form in such case is as follows.

[First Modified Form]

The sensor equipped wheel support bearing assembly according to this first modified form of the present invention is a wheel support bearing assembly for supporting a vehicle wheel rotatably relative to a vehicle body, including: an outer member having an inner periphery formed with a plurality of rolling surfaces; an inner member having rolling surfaces defined therein in face-to-face relation with the respective rolling surfaces in the outer member; a plurality of rows of rolling elements interposed between those rolling surfaces; and a strain sensor unit, made up of a strain generating member and a sensor element fitted to the strain generating member for detecting strains induced in the strain generating member, is fitted to one of the outer and inner members, that serves as a stationary member; in which the strain generating member includes first and second contact fixing elements fixed to respective locations of the stationary member, the first contact fixing element being fixed to a flange surface provided in the stationary member and the second contact fixing element being fixed to a peripheral surface of the stationary member, and in which the sensor element in the strain sensor unit is provided with a cable drawn outwardly from a location proximate to the second contact fixing element in the strain generating member fixed to the peripheral surface of the stationary member in a direction circumferentially of the stationary member.

According to this construction, since the cable of the sensor element can be wired along the peripheral surface of the stationary member, the cable will not constitute any obstruction as compared with the wiring of the cable along the flange of the stationary member and influences brought about by the electromagnetic noises on the output signal of the sensor element can also be reduced.

Hereinafter, a second embodiment of the present invention will be described in detail with particular reference to FIGS. 6 to 11. Even in this second embodiment, like parts similar to those referred to in connection with the first embodiment are designated by like reference numerals and, therefore, the details thereof are not reiterated for the sake of brevity.

Figure 6:
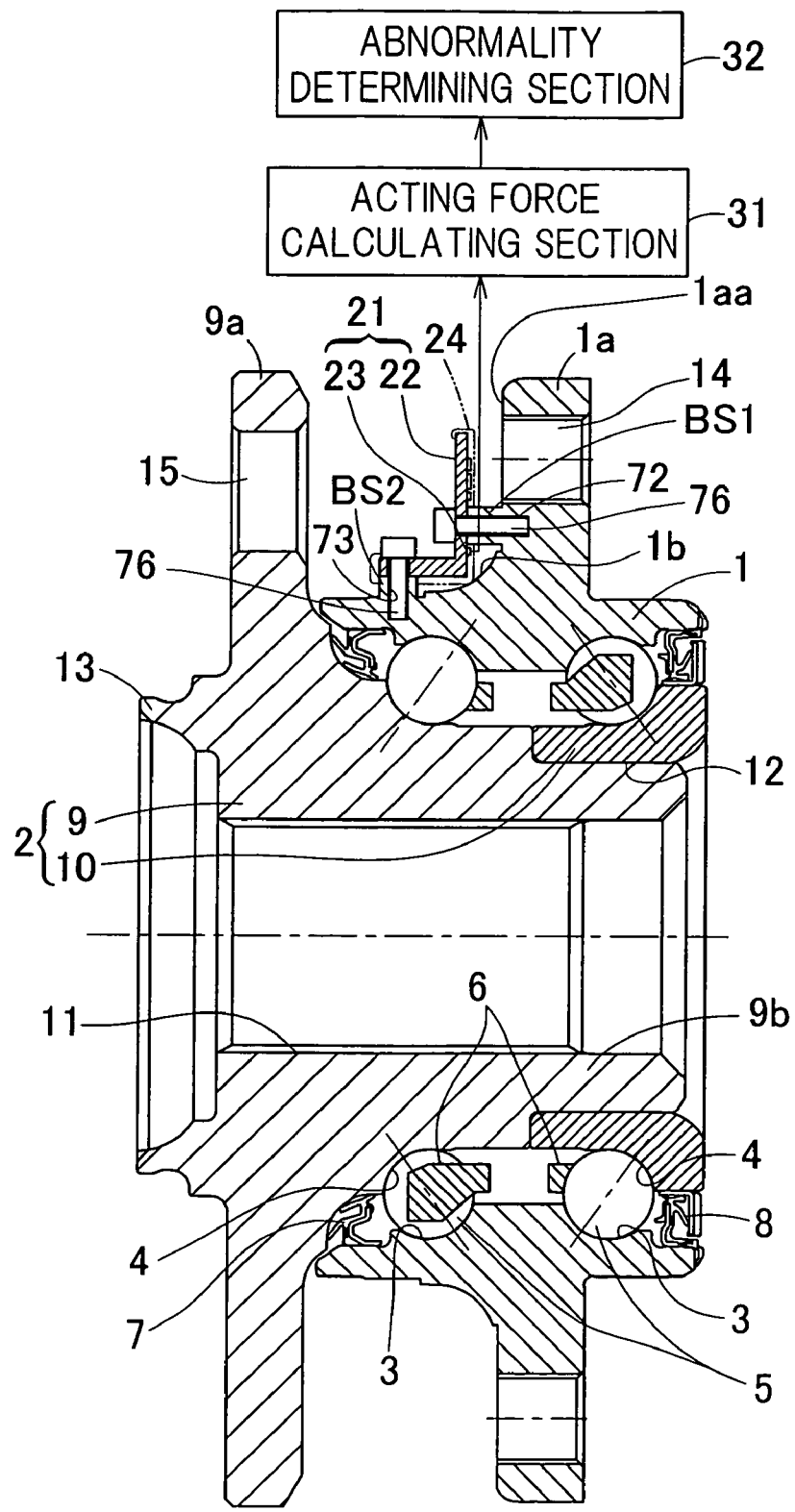
FIG. 6 is a diagram showing a sectional view of the wheel support bearing assembly according to a second embodiment of the present invention, shown together with a block diagram of a conceptual construction of a detecting system therefor.

As shown in FIG. 6, the outer member 1 serves as the stationary member and has an outer periphery formed with a flange 1a adapted to be secured to a knuckle of a suspension system of the automotive vehicle, and is of one piece construction including a first boss BS1 formed integrally with this flange surface 1aa and a second boss BS2 formed integrally with a peripheral surface of this outer member 1. The flange 1a is provided with a vehicle body fitting hole 14 at a plurality of locations in the circumferential direction thereof.

Figure 8:
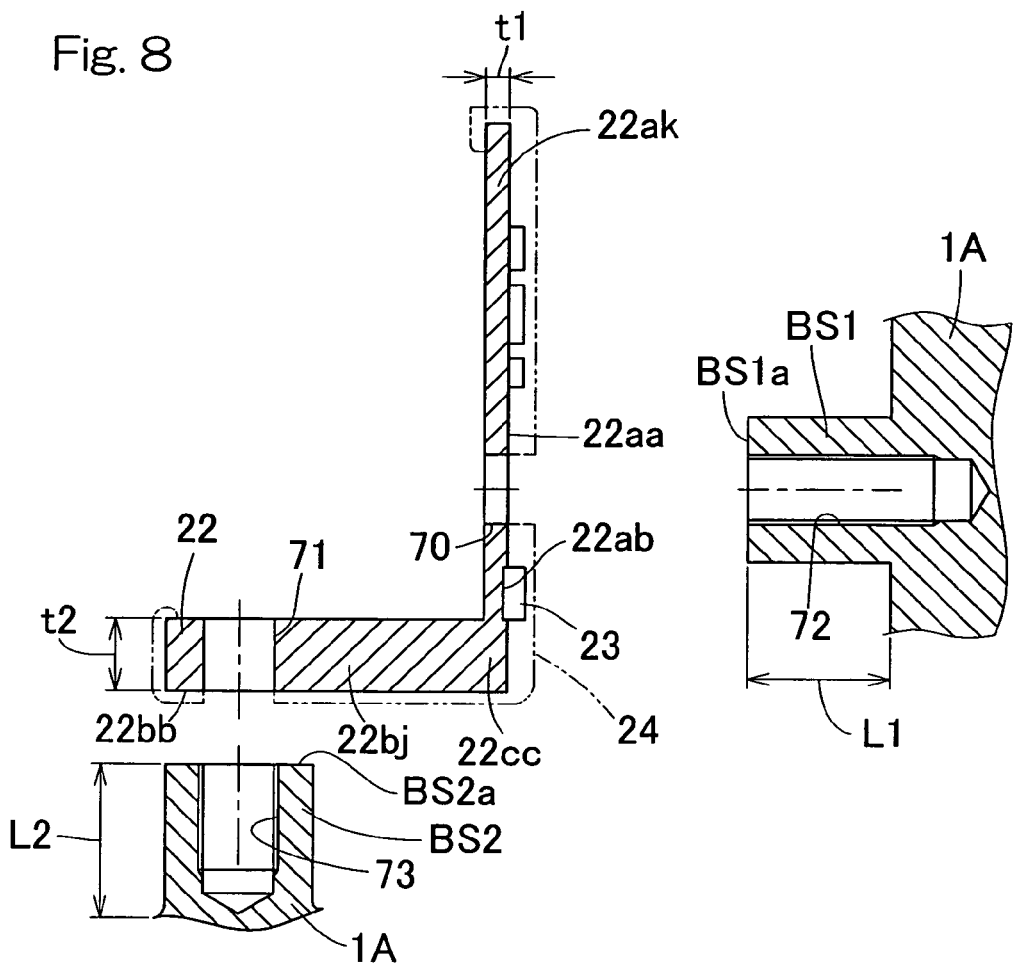
FIG. 8 is a broken side view showing the strain sensor unit separated relative to first and second bosses of the outer member.
Figure 9:
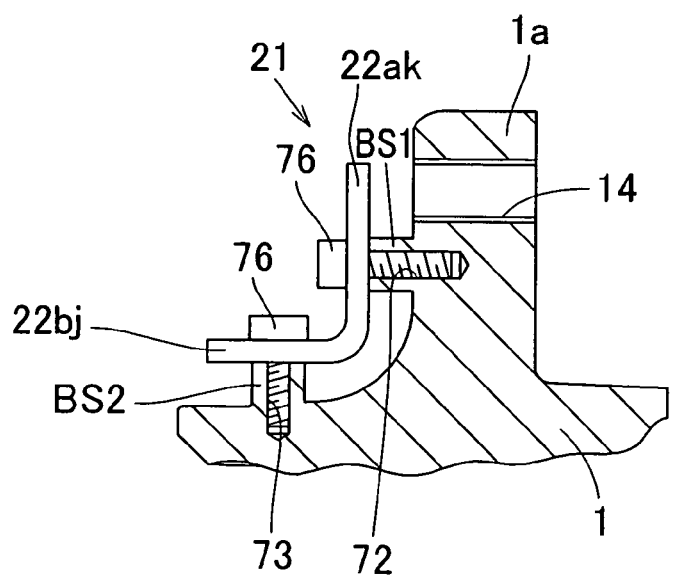
FIG. 9 is a broken sectional view showing the strain sensor unit fixed to the first and second bosses of the outer member.

A strain sensor unit 21 shown in FIG. 8 is provided in an outer peripheral portion of the outer member 1. The strain sensor unit 21 is made up of a strain generating member 22 and a sensor element 23 fitted to this strain generating member 22 for measuring the strain induced in this strain generating member 22. The strain generating member 22 includes a first fixing surface 22aa and a second fixing surface 22bb both defined therein. The first boss BS1 is formed integrally with a portion in the vicinity of the vehicle body fitting hole 14 in the outer member 1, and the first fixing surface 22aa referred to above is fixed to a foremost end face BS1a of this first boss BS1 in contact therewith. The foremost end face BS1a of the first boss BS1 is formed in a round shape when viewed from an axial direction. The geometrical tolerance of the flatness of this foremost end face BS1a, which decreases a variation in outer dimension of the foremost end face BS1a, that is, the length L1 of axial projection from a outer member body 1A, is reduced. Accordingly, it is possible to fix a sensor deforming fulcrum.

The second boss BS2 is formed integrally with the outer peripheral surface of the outer member 1, and the second fixing surface 22bb is fixed to a foremost end face BS2a of this second boss BS2 in contact therewith. The foremost end face BS2a of the second boss BS2 is formed in a round shape when viewed from a radial direction. The geometrical tolerance of the flatness of this foremost end face BS2a, which decreases a variation in outer dimension of the foremost end face BS2a, that is, the length L2 of radial projection from a outer member body 1A, is reduced. Accordingly, it is possible to fix a sensor deforming fulcrum. It is to be noted that the shape of each of the first and second bosses BS1 and BS2 may not be always limited to the round shape such as shown and described, but may be of, for example, a rectangular shape.

A female screw member 72 is formed in part in the first boss BS1 and in part in the outer member body 1A so as to extend in the axial direction. This female screw member 72 confronts outwardly at a foremost end face BS1a of the first boss BS1. With the first fixing surface 22aa held in contact with the foremost end face BS1a, a fixing element in the form of a bolt 76 is threaded into the female screw member 72 through a bolt insertion hole 70 formed in the first fixing surface 22aa to thereby fix. Also, a female screw member 73 is formed in part in the second boss BS2 and in part in the outer member body 1A so as to extend in the radial direction. This female screw member 73 confronts outwardly at a foremost end face BS2a of the second boss BS2, and with the second fixing surface 22bb held in contact with the foremost end face BS2a, a fixing element in the form of a bolt 76 is threaded into the female screw member 73 through a bolt insertion hole 71 formed in the second fixing surface 22bb to thereby fix. The outer member body 1A referred to above is analogous to a body portion of the outer member 1 excluding the first and second bosses BS1 and BS2.

Also, the strain generating member 22 is of an L-shaped configuration including a radially oriented portion 22ak extending in a radial direction and having the first fixing surface 22aa, and an axially oriented portion 22bj including the second fixing surface 22bb. Of the radially oriented portion 22ak and the axially oriented portion 22bj, the wall thickness t1 is, for example, formed to have a value smaller than the wall thickness t2 as shown in FIG. 8 so that the radially oriented portion 22ak may have a rigidity lower than that of the axially oriented portion 22bj. Also, the radial length of the radially oriented portion 22ak and the axial length of the axially oriented portion are so formed as to be the same or so that the radial length may be longer than the axial length. The sensor element 23 is fitted to the radially oriented portion 22ak.

The strain generating member 22 referred to above is made of such a material and formed to have such a shape that it will not undergo any plastic deformation when fitted to the outer member 1. Also, the strain generating member 22 is of such a shape that it does not undergo a plastic deformation even when the maximum load expected on the wheel support bearing assembly is imposed thereon. The maximum expected force referred to above means the maximum force expected during the travel of the automotive vehicle that does not lead to any automotive accident. That is because once the plastic deformation occurs in the strain generating member 22, the deformation occurring in the outer member 1 will not be transferred accurately to the strain generating member 22 and whereby the strain measurement will be affected.

The strain generating member 22 may be prepared by means of, for example, a press work. In such case, it is possible to reduce the cost as compared with the case in which the strain generating member is prepared by means of a mechanical processing such as, for example, a cutting process. Also, the strain generating member 22 may be a sintered metallic product formed by the use of a metal injection molding. The metal injection molding is one of molding techniques used in molding metals and inter-metal compounds, which includes a step of kneading a metal powder with a binder, a step of injection molding with the use of the resultant kneaded mixture, a step of degreasing the molded product, and a step of sintering the molded product. According to this metal injection molding, as compared with the standard powdery metallurgy, such advantages can be obtained that a sintered product having a high sintering density can be obtained, that the sintered metallic product can be manufactured to a highly accurate dimension and that the mechanical strength is also high. Also, the radially oriented portion 22ak and the axially oriented portion 22bj may have substantially the same wall thickness and a part of the radially oriented portion 22ak may be formed with a fragile area (not shown). In this way, the radially oriented portion 22ak can have a rigidity lower than that of the axially oriented portion 22bj.

The strain generating member 22 is, in a manner similar to that according to the previously described first embodiment, provided with a covering member 24, shown by the double dotted chain line, that covers at least the sensor element 23 in a sealing fashion, which member 22 extends from the first fixing surface 22aa, which is a sensor mounting surface, to the second fixing surface 22bb, which is a surface of the axially oriented portion 22bj, which is opposed to the outer peripheral surface 1b of the outer member (FIG. 6). It is to be noted that the covering member 24 may be of a type capable of covering the entire surface of the strain generating member 22. This covering member 24 is made of a resinous material that is over-molded on that surface region discussed above or an elastomer (NBR, H-NBR, acrylic resin and so on) that is bonded by vulcanization. The over-molded resinous material may be suitably employed in the form of any one of the following materials:

Resins of the polyamide system: 66 Nylon, PPA (polyphthalamide) or the like.

Synthetic resin of the special ether system: PPS or the like.

The above-listed materials added with glass fibers.

The covering member 24 shown in FIG. 8 may not be always essential and may be dispensed with.

Figure 7:
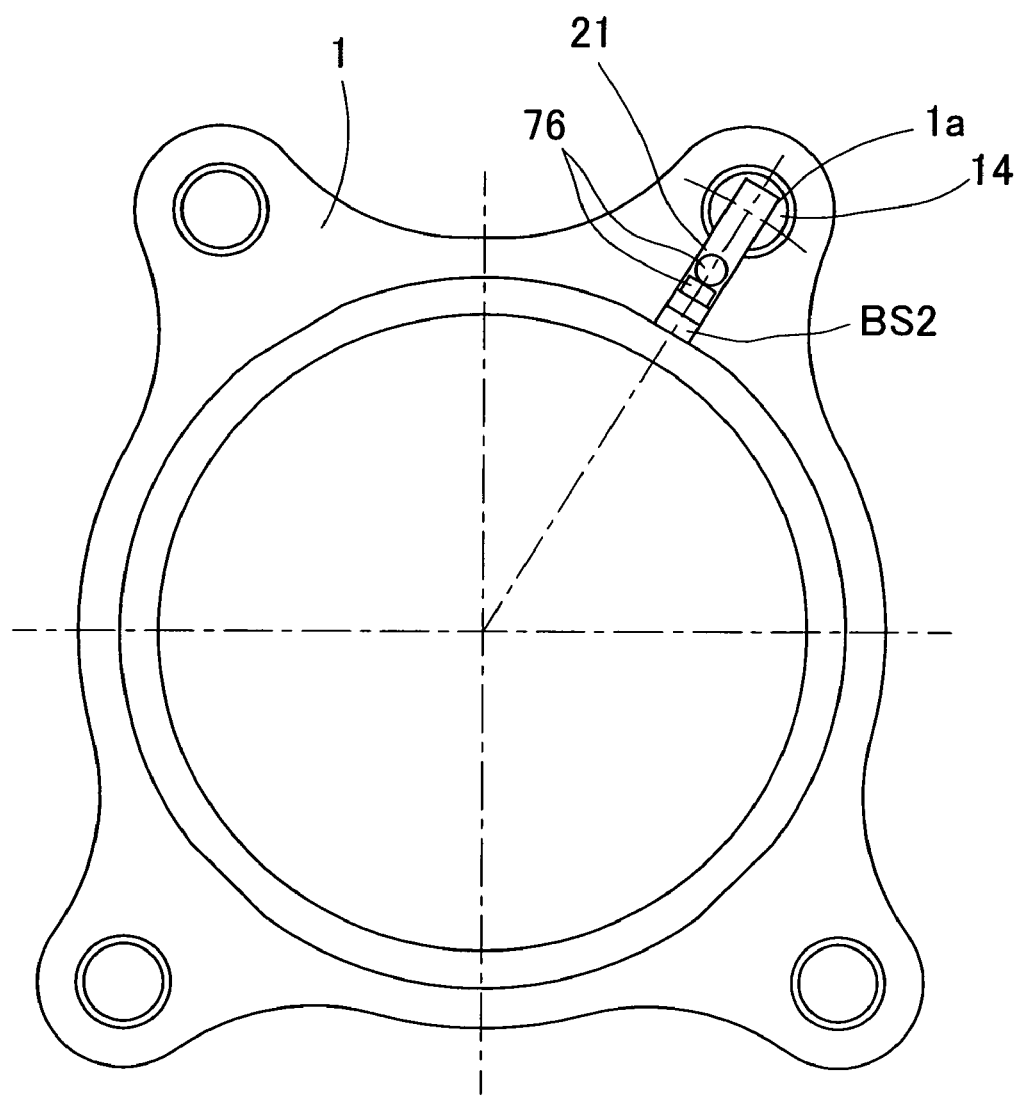
FIG. 7 is a front elevational view showing the outer member and the strain sensor unit employed in the sensor equipped wheel support bearing assembly.
Figure 11:
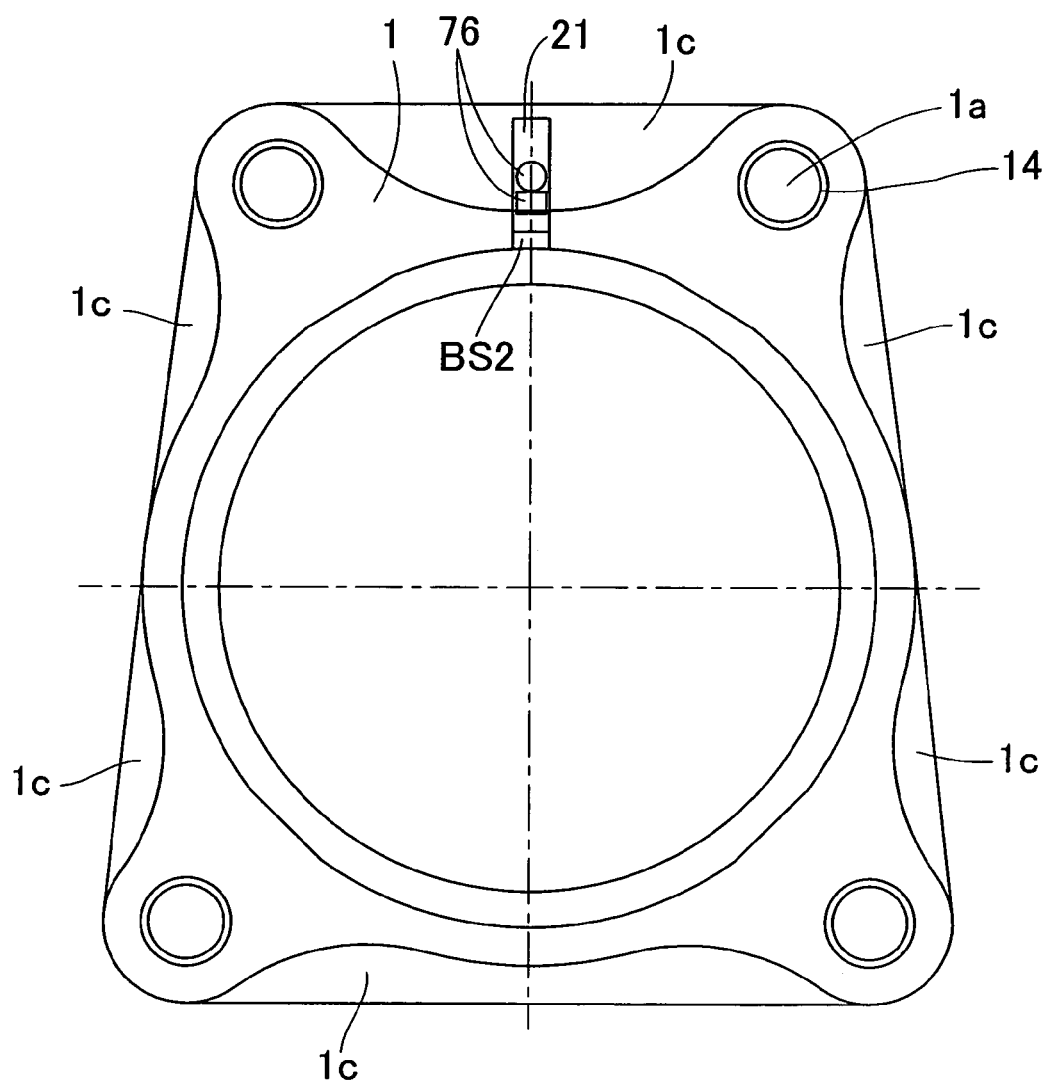
FIG. 11 is a front elevational view showing the outer member and the strain sensor unit employed in the sensor equipped wheel support bearing assembly.

The strain sensor unit 21 referred to above is fixed to the outer peripheral portion of the outer member 1 through the first and second contact fixing surface 22aa and 22bb of the strain generating member 22 so that, as best shown in FIG. 7, the first and second contact fixing surface 22aa and 22bb are held in the same phase relative to each other with respect to the circumferential direction of the outer member 1. Also, as best shown in FIG. 11, the strain sensor unit 21 may be fixed to a flange 1c provided between neighboring flanges 1a in the outer member 1. When the first and second contact fixing surface 22aa and 22bb are held in the same phase relative to each other, the length of the strain generating member 22 can be reduced and, therefore, the strain sensor unit 21 can easily be installed. In the case of this embodiment, the sensor element 23 is fixed within a recessed portion 22ab, formed in the first fixing surface 22aa of the strain generating member 22 by the use of, for example, a bonding agent. The recessed portion 22ab referred to above is processed in conformity with the shape of the sensor element 23 and, accordingly, it is possible to secure the adhesion between the strain generating member 22 and the sensor element 23. Also, the positioning accuracy of the sensor element 23 relative to the strain generating member 22 can be increased.

As shown in FIG. 6, for processing an output from the sensor element 23, there are provided an acting force calculating section 31 and an abnormality determining section 32. The acting force calculating section 31 and the abnormality determining section 32 may be provided in an electronic circuit device (not shown) such as, for example, a circuit substrate fitted to the outer member 1 or the like of the wheel support bearing assembly or in an electric control unit (ECU) of the automotive vehicle.

The operation of the sensor equipped wheel support bearing assembly of the construction hereinabove described will now be described. When during the travel of the automotive vehicle the load is imposed on the hub unit 9 shown in FIG. 6, the outer member 1 undergoes a deformation through the rolling elements 5 and such deformation is transferred to the strain generating member 22 fitted to the outer member 1, accompanied by deformation of the strain generating member 22. The strain induced in the strain generating member 22 is measured by the sensor element 23. At this time, the radially oriented portion 22ak of the strain generating member 22 deforms in accord with deformation of the flange 1a of the outer member 1.

In the case of this second embodiment now under discussion, since the strain generating member 22 is so structured that the radially oriented portion 22ak has a lower rigidity as compared with that of the outer member 1 and that such strain generating member 22 may represent an L-shaped configuration including the radially oriented portion 22ak having a relatively low rigidity and the axially oriented portion 22bj having a high rigidity, strains concentrate on a portion proximate to a corner area 22cc lying between the radially oriented portion 22ak and the axially oriented portion 22bj and on the side of the radially oriented portion 22ak and, accordingly, the strain larger than that in the outer member 1 develops there. In other words, the strain developed between the radially oriented portion 22ak and the axially oriented portion 22bj represents a transferred and expanded form of the strain at an R portion 1b in the base end of the flange 1a. Since this strain is measured by the sensor element 23, the strain occurring in the outer member 1 can be detected with a high sensitivity and the strain measuring accuracy can be increased.

Although the strain sensor unit 21 employed in the practice of the second embodiment has been shown and described as being of the structure, in which only one sensor element 23 is fitted to the strain generating member 22, it may be of a structure, in which a plurality of sensor elements 23 are fitted to the strain generating member 22. In such case, the strain can be measured at a plurality of locations of the strain generating members 22 and, therefore, a further highly accurate load detection can be accomplished. Also, even when a trouble occurs in one of the strain sensor units, the load can be detected by the other surviving strain sensor units.

Figure 10:
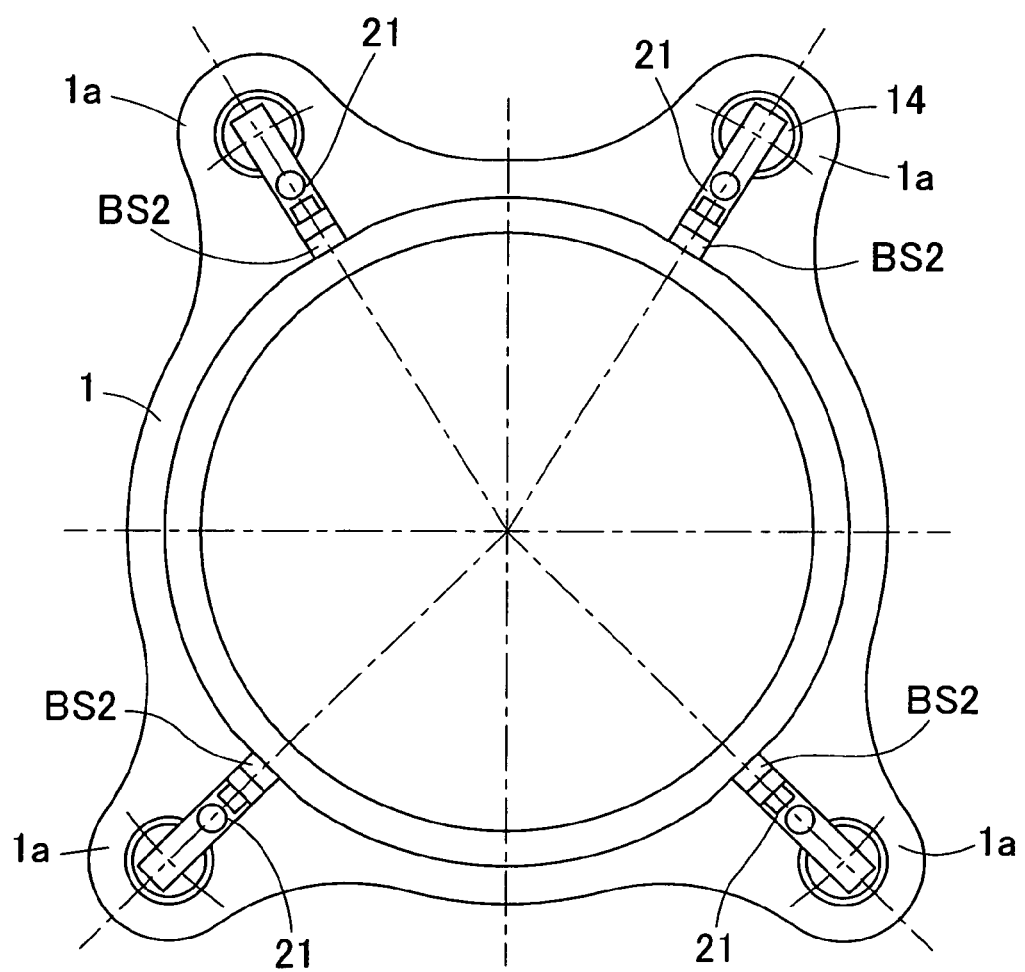
FIG. 10 is a front elevational view showing the outer member and the strain sensor unit in a different sensor equipped wheel support bearing assembly.

Also, although in this second embodiment the strain sensor unit 21 has been shown and described as provided at one location in the circumferential direction of the outer member 1, it may not be always limited thereto. For example, as shown in FIG. 10, the strain sensor unit 21 may be provided at two or more locations in the circumferential direction of the outer member 1. Those plural strain sensor units 21 may be arranged having been spaced from each other at intervals of a suitable random distance or equidistantly in the circumferential direction. Thus, when the strain sensor units 21 are provided at two or more locations in the circumferential direction of the outer member 1, a further highly accurate load detection can be accomplished.

Since the sensor equipped wheel support bearing assembly of the construction hereinabove described is such that the strain sensor unit 21 made up of the strain generating member 22 and the sensor element 23 is fitted to the outer member 1 which serves as the stationary member, the load detecting sensor can be installed compactly in the automotive vehicle. Since the strain generating member 22 is a simple component part that is fitted to one of the outer member 1 and the inner member 2 that serves as the stationary member, it can be excellent in mass productivity and the cost can be reduced by fitting the sensor element 23 to this strain generating member 22.

Also, since the strain sensor unit 21 is fitted to the outer member 1 through the sensor fixing bosses BS1 and BS2 that are formed in the outer member 1, the following functions and effects can be obtained. Displacement of the sensor fixing bosses BS1 and BS2 relative to the outer member body 1A is prevented. Accordingly, an undesirable movement of the sensor deforming fulcrum can be avoided assuredly and, hence, variation of the sensor strain sensitivity can be reduced.

Since the strain generating member 22 includes the first fixing surface 22aa adapted to be fixed to the foremost end face BS1a of the first boss BS1 in contact therewith and the second fixing surface 22bb adapted to be fixed to the foremost end face BS2a of the second boss BS2, where the first and second bosses BS1 and BS2 have substantially the same projecting length, the first and second fixing surfaces 22aa and 22bb differ in position in the radial direction from each other. Accordingly, the strain occurring in the outer member 1 can be made easy to be transferred to and expanded in the strain generating member 22. Since the transferred and expanded strain is measured by the sensor element 23, the strain occurring in the outer member 1 can be detected with a high sensitivity and the accuracy of measurement of the load can be increased.

Since the first and second fixing surfaces 22aa and 22bb of the strain generating member 22 are fixed to the outer member 1 through the first and second bosses BS1 and BS2 by means of the respective fixing members bolts 76, as compared with fixing of the strain generating member by means of a bonding agent or welding, the quality of work can be uniformed to reduce the number of work steps and the cost of manufacturing can also be reduced. It is to be noted that in addition to fixing of the strain generating member 22 with the use of the bolts, at least one of the bonding agent and the welding may be employed. In such case, the strain generating member 22 can be firmly secured to the outer member 1. Also, as an alternative ways in place of the bolt fixing, pin fixing or welding may be employed.

In the practice of the second embodiment shown in and described with particular reference to FIGS. 6 to 11, the use of the covering member 24 may be dispensed with, in which case a first aspect of application is as follows:

[First Aspect of First Mode]

The sensor equipped wheel support bearing assembly according to the first aspect of the first mode is a wheel support bearing assembly for supporting a vehicle wheel rotatably relative to a vehicle body; including an outer member having an inner periphery formed with a plurality of rolling surfaces, an inner member having rolling surfaces defined therein in face-to-face relation with the respective rolling surfaces in the outer member, a plurality of rows of rolling elements interposed between those rolling surfaces, a sealing device for sealing an end portion of a space defined between the outer member and the inner member, a sensor fixing boss formed in one of the outer member and the inner member, that serves as a stationary member, and a strain sensor unit, made up of a strain generating member and at least one or more sensor elements fitted to this strain generating member for detecting strains induced in the strain generating member, the strain sensor unit being fitted to the stationary member through the sensor fixing boss.

[Second Aspect of First Mode]

In the first aspect of the first mode, the sensor fixing boss may include a first boss formed with the flange surface provided in the stationary member and a second boss formed with the peripheral surface of the stationary member, and wherein the strain generating member includes a first contact fixing element adapted to be fixed to a foremost end face of the first boss in contact therewith and a second contact fixing element adapted to be fixed to a foremost end face of the second boss in contact therewith

[Third Aspect of First Mode]

In the first aspect of the first mode, the stationary member may be the outer member. In such case, the sensor unit is fitted to the outer peripheral surface of the outer member.

[Fourth Aspect of First Mode]

In the first aspect of the first mode, the sensor fixing boss is preferably formed integrally with the stationary member. In such case, the number of component parts used can be reduced, the structure can be simplified, and the cost during the mass production can be assuredly reduced.

[Fifth Aspect of First Mode]

In the first aspect of the first mode, an acting force calculating section may be provided for calculating a force acting between the wheel tire and the road surface or an external force acting on the wheel support bearing assembly in response to an output of the strain sensor unit.

[Sixth Aspect of First Mode]

In the first aspect of the first mode, fixing of the strain generating member to the stationary member may be carried out either by the use of at least one of a bolt or a pin (both being referred to as a fixing element) and a bonding agent, by means of the use of both of the fixing element and the bonding agent, or by the use of a welding technique. Where the strain generating member and the stationary member are fixed together by the use of the fixing element, both of the fixing element and the bonding agent or the welding technique, as compared with the fixing by the use of the welding technique or the like, the quality of work can be uniformed to reduce the number of work steps and the cost of manufacturing can also be reduced. Where the fixing is carried out by the use of both of the fixing element and the bonding agent, the strain generating member can be firmly fixed to the stationary member.

[Seventh Aspect of First Mode]

In the first aspect of the first mode, the strain generating member may be of an L-shaped configuration including a radially oriented member extending in the radial direction and an axially oriented member extending in the axial direction.

In the next place, some examples of application, in which the use of the covering member shown and described in connection with the first embodiment is not required, will be described. In the first place, the first example of application is shown in FIGS. 12 to 15.

This first applied example is similar to the first embodiment in that it is applied to a third generation model of the wheel support bearing assembly of the inner ring rotating type for the support of a vehicle drive wheel. In this first applied example, like parts similar to those employed in the first embodiment are shown by like reference numerals and, therefore, the details thereof are not reiterated.

As shown in FIGS. 12 to 15, an outer peripheral portion of the outer member 1 is provided with a strain sensor unit 21. This strain sensor unit 21 is made up of a strain generating member 22 and a sensor element 23 provided in the strain generating member 22 for measuring the strain and is fitted to the outer member 1 through first and second contact fixing elements 22a and 22b, which are spacer members.

Figure 15:
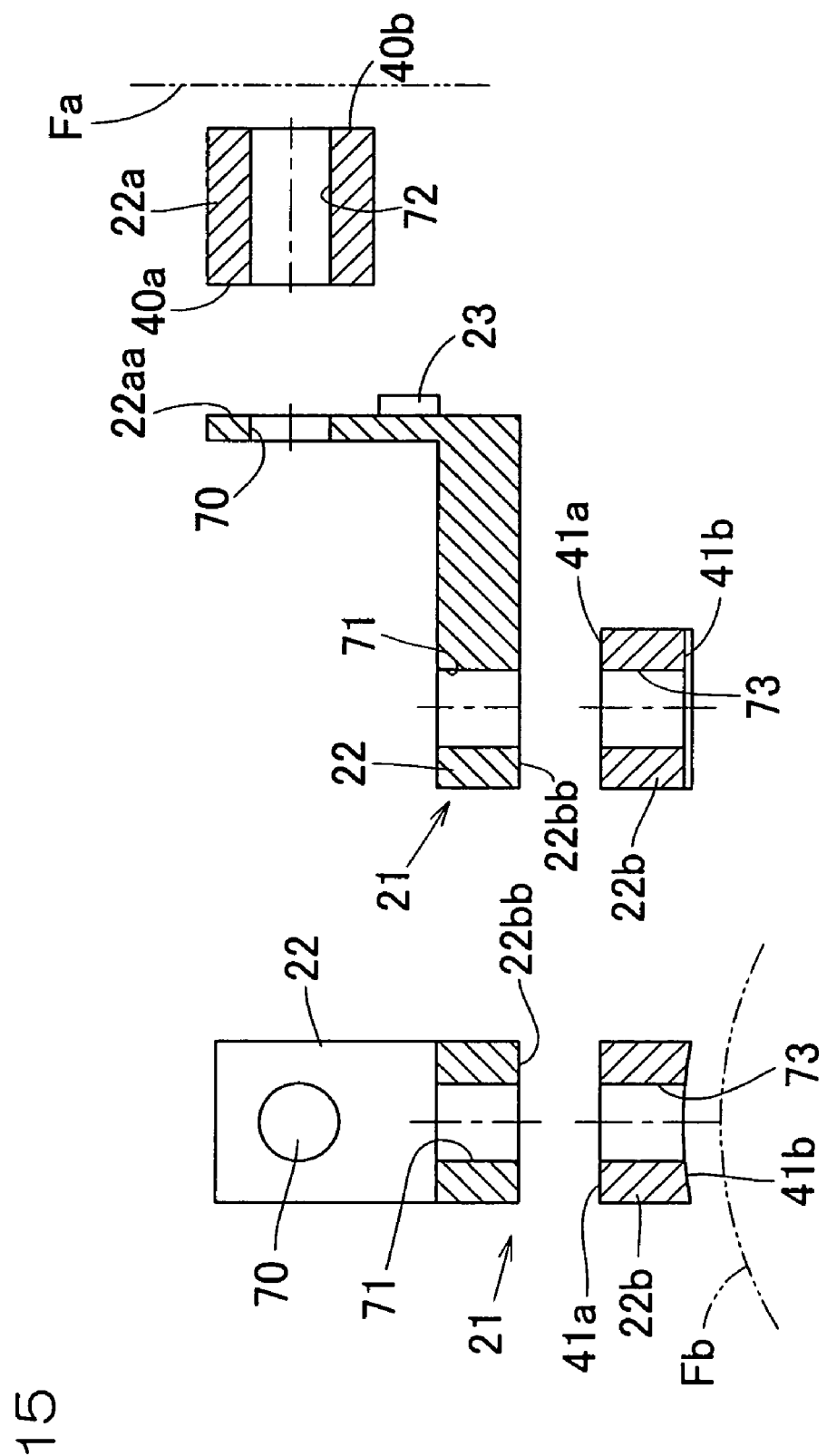
FIG. 15A is a broken front elevational view showing the strain sensor unit and first and second spacer members shown as separated from each other.
FIG. 15B is a broken side view thereof.

As best shown in FIG. 15, the strain generating member 22 includes a first fixing surface 22a adapted to be fixed to a fixing target surface Fa that is represented by a side face of the flange 1a of the outer member 1, and a second fixing surface 22bb adapted to be fixed to a fixing target surface Fb that is represented by an outer peripheral surface of the outer member 1. The strain generating member 22 is of an L-shaped configuration including a radially oriented portion 22c extending in the radial direction and an axially oriented portion 22d extending in the axial direction, with an inboard side face foremost end portion of the radially oriented portion 22b being rendered to be the first fixing surface 22aa and an inner diametric side face foremost end portion of the axially oriented portion 22d is rendered to be the second fixing surface 22bb. The radially oriented portion 22c has a wall thickness reduced so that the rigidity thereof is lower than that of the axially oriented portion 22d. The sensor element 23 is fitted to the radially oriented portion 22c that is low in rigidity.

For the sensor element 23, any of various types may be employed. For example, the sensor element may be structured with a metallic foil strain gauge. In such case, it is typically fixed to the strain generating member 22 by means of bonding.

Figure 16:
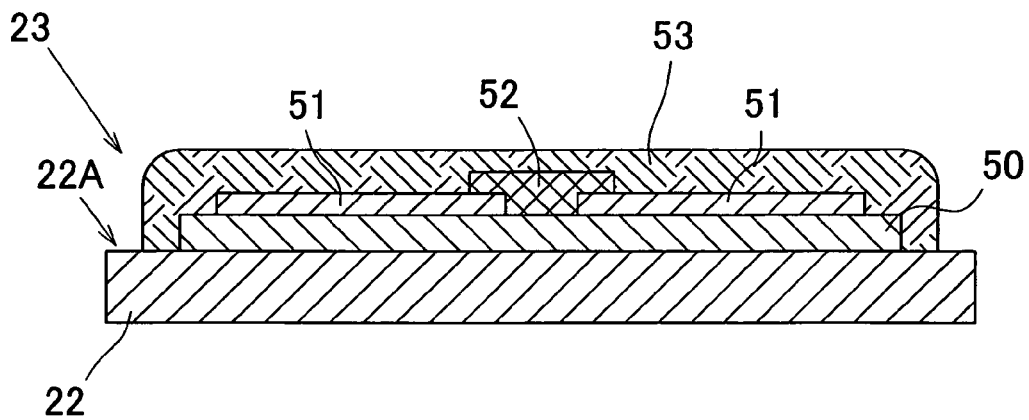
FIG. 16 is a diagram showing a sectional structure of a sensor element.

Also, the sensor element 23 may be employed in the form of a thick film resistance element on a surface of the strain generating member 22. The structure of the sensor element 23 employed in such case is shown in FIG. 16. This sensor element 23 is of a structure in which an insulating layer 50 is formed on the surface 22A of the strain generating member 22, electrodes 51 and 51 forming a pair are formed on respective opposite sides of a surface of this insulating layer 50, a strain measuring resistance element 52 in the form of a thick film resistance element is formed on the insulating layer 50 at a location intermediate between those electrodes 51 and 51, and a protective film 53 is formed over the electrodes 51 and 51 and the strain measuring resistance element 52.

A method of making this sensor element 23 will now be shown as follows. At the outset, an insulating material such as, for example, glass is printed on a surface 22A of the strain generating member 22, which has been prepared from a metallic material such as, for example, stainless steel, and is subsequently sintered to form the insulating layer 50. Then, on a surface of the insulating layer 50, an electroconductive material is printed and sintered to form the electrodes 51 and 51. Further, between the pair of the electrodes 51 and 51, a material which eventually forms the resistance element is printed and sintered to form the strain measuring resistance element 52. Yet, for protecting those electrodes 51 and 51 and the strain measuring resistance element 52, the protective layer 53 is formed.

The first contact fixing element 22a is interposed between the first fixing surface 22aa of the strain generating member 22 and the side face of the flange 1a of the outer member 1 serving as the fixing target surface Fa, in which an end face 40a oriented towards the first fixing surface 22aa has a plan shape conforming with that of the first fixing surface 22aa and an end face 40b oriented towards the fixing target surface Fa has a plan shape conforming with that of the fixing target surface Fa (FIG. 15). On the other hand, the second contact fixing element 22b is interposed between the second fixing surface 22bb of the strain generating member 22 and the outer peripheral surface of the outer member 1 serving as the fixing target surface Fb, in which an end face 41a oriented towards the second fixing surface 22b has the plan shape conforming with that of the second fixing surface 22bb and an end face 41b oriented towards the fixing target surface Fb has the plan shape conforming with that of the fixing target surface Fb (FIG. 15).

Each of the first and second contact fixing elements 22a and 22b is prepared by performing a mechanical processing on a corrosion resistant steel such as, for example, a stainless steel of the austenite system (for example, SUS304 according to the JIS), a stainless steel of the ferrite system (for example, SUS430 according to the JIS) or a rust proofed steel material. In particular, the use of the stainless steel of the austenite system having a high rust proofing property is desirable.

Figure 13:
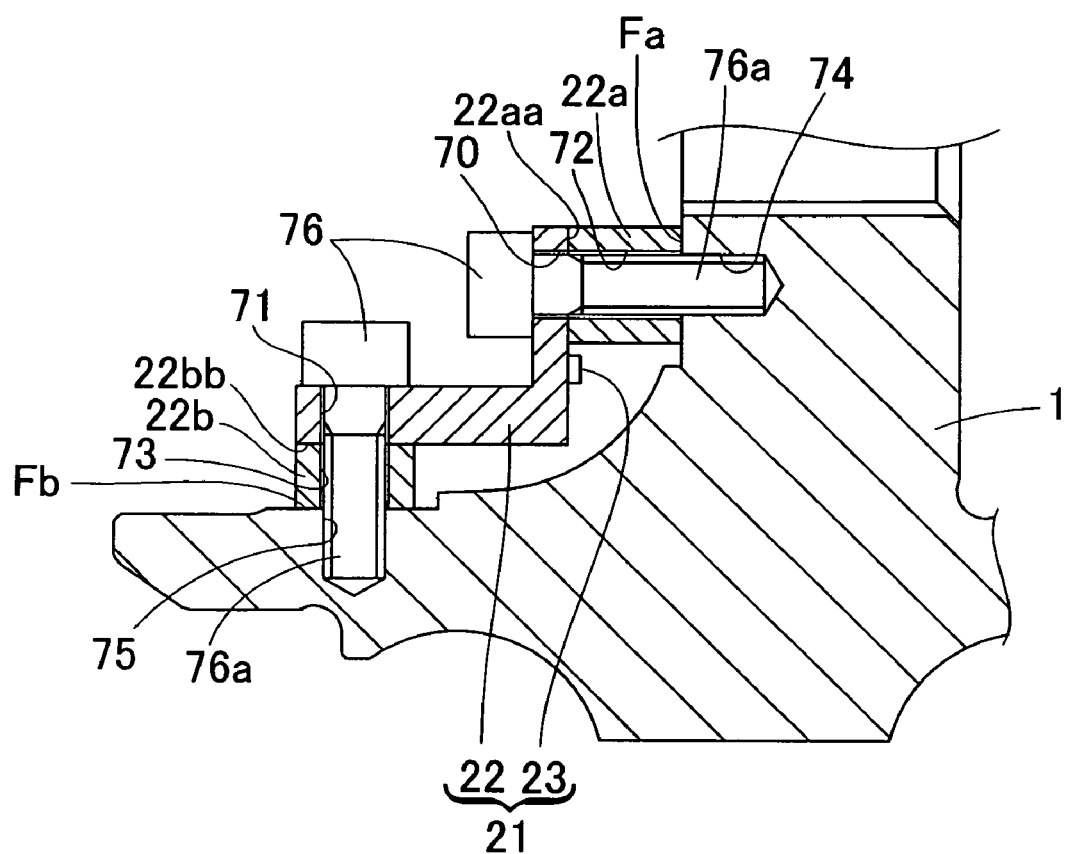
FIG. 13 is a fragmentary enlarged diagram of FIG. 12.

The structure of a fitting portion at which the strain sensor unit 21 is fitted to the outer member 1 will now be described (FIG. 13 and FIG. 15). The stain generating member 22 is formed with an axially extending bolt insertion hole 70 extending through the first fixing surface 22aa and a radially extending bolt insertion hole 71 extending through the second fixing element 22b. Also, the first contact fixing element 22a is formed with a bolt insertion hole 72 alignable with the bolt insertion hole 70, while the second contact fixing element 22b is formed with a bolt insertion hole 73 alignable with the bolt insertion hole 71. Further, the outer member 1 is formed with bolt threading holes 74 and 75, each having an inner peripheral surface formed with a female thread, which holes 74 and 75 are positioned at respective locations alignable with the bolt insertion holes 70 and 72 and also alignable with the bolt insertion holes 71 and 73. The bolt threading hole 74 is positioned in the vicinity of the vehicle body fitting hole 14 and the bolt threading hole 75 is positioned on the outer peripheral surface of the outer member 1. Also, the bolt threading holes 74 and 75 are held in respective positions that are in the same phase relative to the circumferential direction of the outer member 1.

As best shown in FIG. 13, the strain sensor unit 21 is fixed to the outer member 1 by passing a bolt 76 from the outboard side into the bolt insertion hole 70 in the strain generating member 22 and the bolt insertion hole 72 in the first contact fixing element 22a and then threading a male thread portion 76a of the bolt 76 into the bolt threading hole 74 in the outer member 1, and, on the other hand, by passing a bolt 76 from an outer peripheral side into the bolt insertion hole 71 in the strain generating member 22 and the bolt insertion hole 73 in the second fixing contact portion 22b and then threading a male thread portion 76a of the bolt 76 into the bolt threading hole 75 in the outer member 1.

Figure 12:
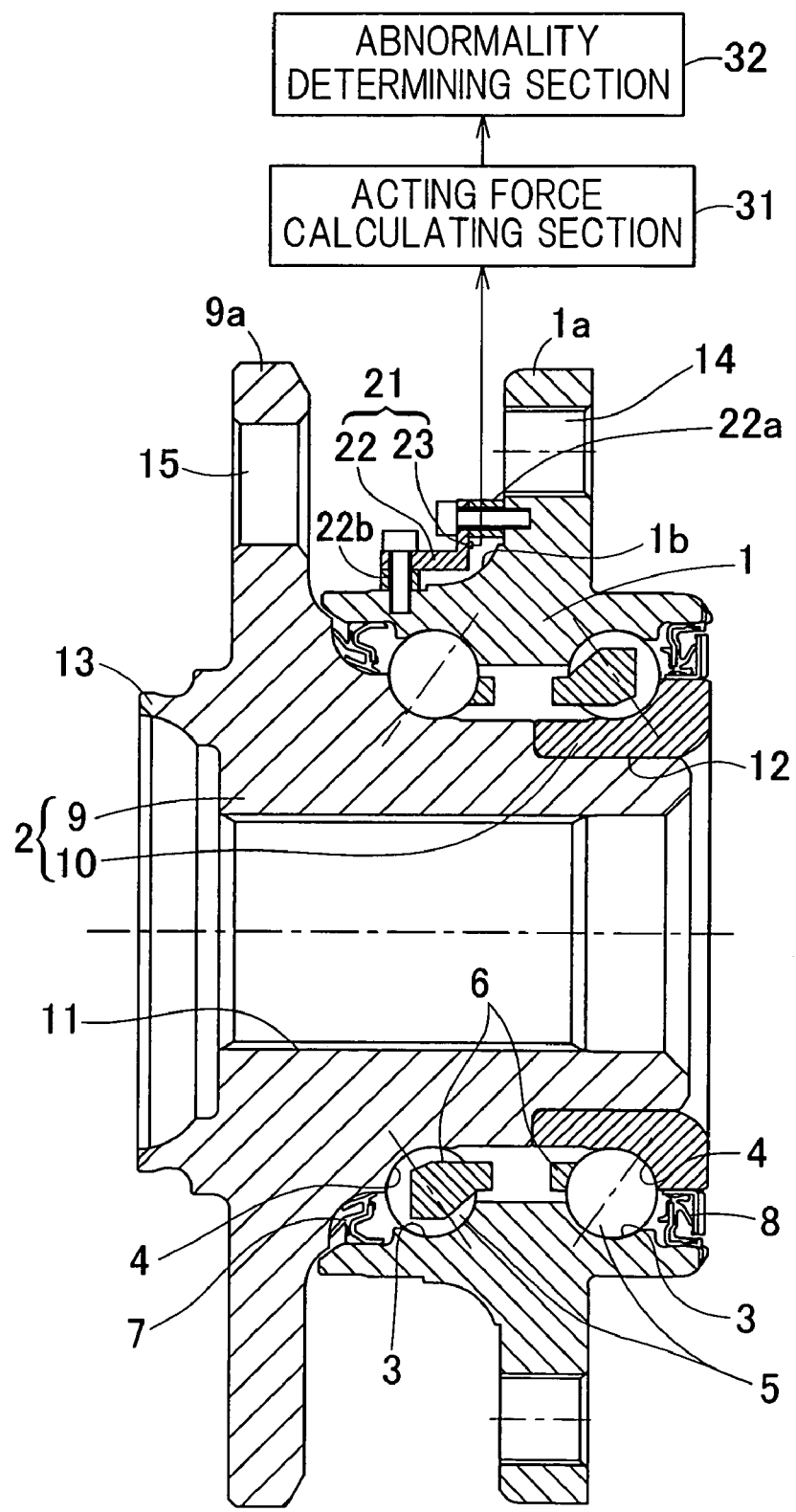
FIG. 12 is a diagram showing a sectional view of the sensor equipped wheel support bearing assembly according to a first applied example, shown together with a block diagram of a conceptual construction of the detecting system.
Figure 14:
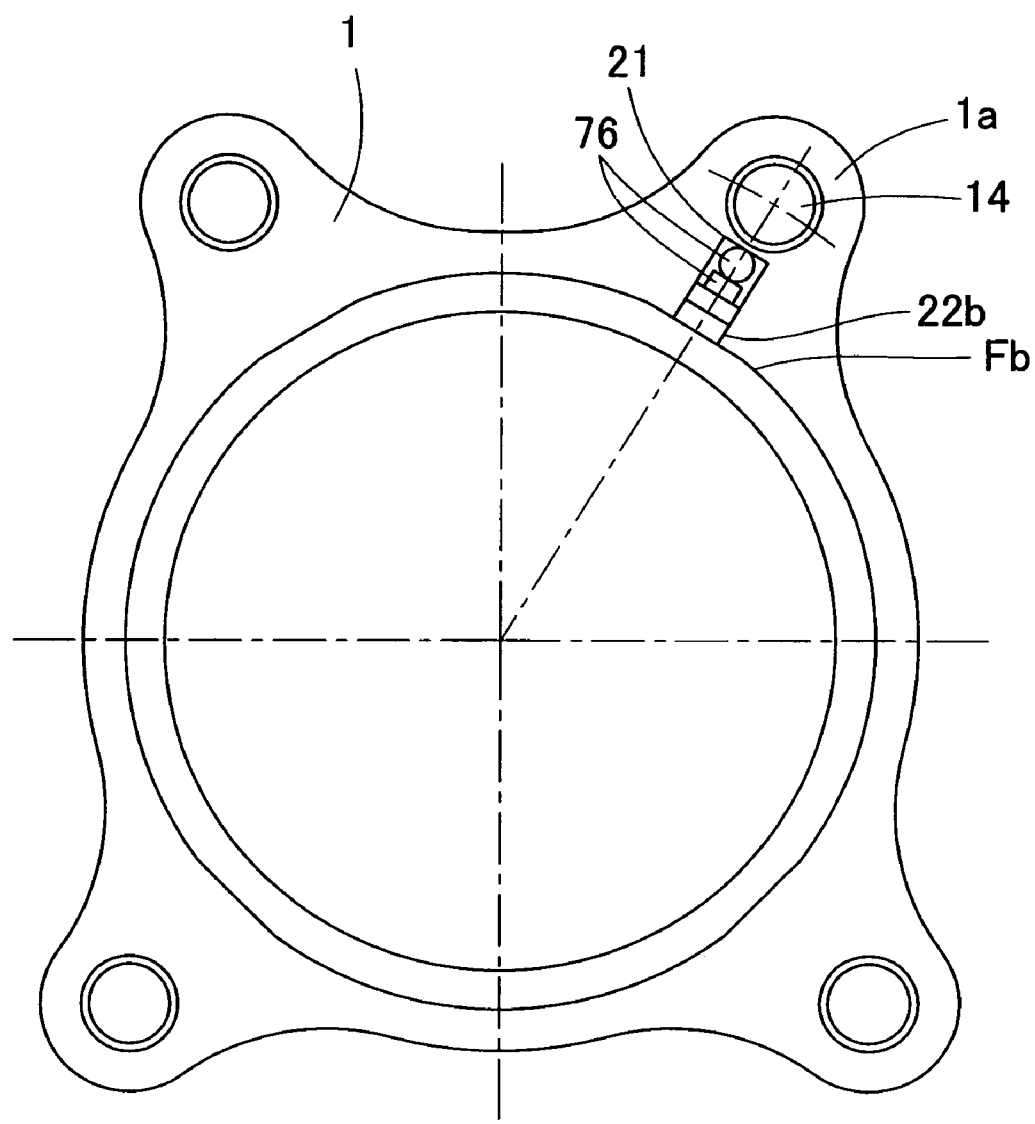
FIG. 14 is a front elevational view showing the outer member and the strain sensor unit employed in the sensor equipped wheel support bearing assembly.

In a condition in which the strain sensor unit 21 is fixed, as best shown in FIGS. 12 to 14, the first fixing surface 22aa of the strain generating member 22 is fixed to the side face of the flange 1a in the vicinity of the vehicle body fitting hole 14 in the outer member 1 through the first contact fixing element 22a, while the second fixing surface 22bb is fixed to the outer peripheral surface of the outer member 1 through the second contact fixing element 22b. The first and second contact fixing elements 22a and 22b have respective end faces 40a and 41a, oriented respectively towards the fixing surfaces 22aa and 22bb of the strain generating member 22, of the same shape as those of the fixing surfaces 22aa and 22bb and respective end faces 40b and 41b, oriented respectively towards the fixing target surfaces Fa and Fb of the outer member 1 are of the same shape as those of the fixing target surfaces Fa and Fb. Accordingly, the contact fixing elements 22a and 22b are held in tight contact with the strain generating member 22 and the outer member 1, respectively, to allow the strain generating member 22 to be fixed to the outer member 1 in a stabilized posture. Also, since the first and second fixing surfaces 22aa and 22bb are fixed so that they assume the respective position that are in the same phase relative to the circumferential direction of the outer member 1, the length of the strain generating member 22 can be reduced and the strain sensor unit 21 can be installed easily.

As best shown in FIG. 12, for processing an output from the sensor element 23, there are provided an acting force calculating section 31 and an abnormality determining section 32. The acting force calculating section 31 is operable to calculate an external force acting on the wheel support bearing assembly or a force acting between a wheel tire and a road surface in response to the output from the sensor element 23 in a manner similar to that shown and described in connection with the first embodiment. The acting force calculating section 31 includes a relation setting segment (not shown), in which the relation between the force acting between the wheel tire and the road surface and the output signal of the sensor element 23 is set in the form of a computing equation or a table, and is operable in response to the inputted output signal to output a working force using the relation setting segment referred to above. The contents set in the relation setting segment referred to above is set by determining through a series of tests and/or simulations. The abnormality determining section 32 is operable to output an abnormality signal to the outside in the event that the external force or the working force calculated by the calculating means 31 is determined as exceeding a tolerance value. Those sections may be provided either in an electronic circuit device (not shown) such as, for example, a circuit substrate mounted on the wheel support bearing assembly or an electric control circuit (ECU) of the automotive vehicle.

The operation of the sensor equipped wheel support bearing assembly of the construction hereinabove described will now be described. Even in the case of this first applied example, the operation thereof is substantially identical with that shown and described in connection with the previously described first embodiment, and particularly in the case of this first applied example, deformation of the outer member 1 is transferred to the strain generating member 22 through the first and second contact fixing elements 22a and 22b, resulting in deformation of the strain generating member 22. Since as hereinbefore described, when the first and second contact fixing elements 22a and 22b are employed, the strain generating member 22 can be fixed to the outer member 1 in the stabilized posture, the strain occurring in the outer member 1 is accurately transferred to the strain generating member 22. At this time, the radially oriented portion 22c of the strain generating member 22 deforms in accord with deformation of the flange 1a of the outer member 1. In the case of this embodiment, since the radially oriented portion 22c has a low rigidity as compared with that of the outer member 1, and the strain generating member 22 is of the L-shaped configuration having the radially oriented portion 22c of a low rigidity and the axially oriented portion 22d of a high rigidity, strains tend to concentrate in the vicinity of a corner portion on the side of the radially oriented portion 22c, which lies between the radially oriented portion 22c and the axially oriented portion 22d, and, therefore, show up as a larger strain than that in the outer member 1. In other words, the strain developed between the radially oriented portion 22c and the axially oriented portion 22d represents a transferred and expanded form of the strain at an R portion 1b in the base end of the flange 1a. Since this strain is measured by the sensor element 23, the strain occurring in the outer member 1 can be detected with a high sensitivity and the strain measuring accuracy can be increased.

The abnormality determining section 32 is operable to output an abnormality signal to the outside in the event that the external force acting on the wheel support bearing assembly or the force acting between the wheel tire and the road surface calculated by the calculating means 31 is determined as exceeding a tolerance value. This abnormality signal can be used in a vehicle control of the automotive vehicle. Also, by outputting the external force acting on the wheel support bearing assembly or the force acting between the wheel tire and the road surface on a real time, a meticulous vehicle control can be accomplished.

Since this wheel support bearing assembly is such that the strain sensor unit 21 made up of the strain generating member 22 and the sensor element 23 is fitted to the outer member 1, the load detecting sensor can be installed compactly in the automotive vehicle. The processing of the wheel support bearing assembly can be minimized and the bearing rigidity will not be lowered. Also, since the strain sensor unit 21 is so structured as to be fitted to the outer member 1 through the first and second contact fixing elements 22a and 22b, not directly to the outer member 1, the strain generating member 22 can have a simplified shape such as the L-shaped configuration. Where the strain generating member 22 is of the simplified shape, processing of the strain generating member 22 can be facilitated and the cost can be reduced. Also, where the strain generating member 22 is of the simplified shape, positioning of the sensor element 23 at the fixed position can be carried out precisely. In the case of this first applied example, since the surface of the strain generating member 22 where the sensor element 23 is provided is a plan surface, fitting of the sensor element 23 to the strain generating member 22 is easy to achieve. By way of example, the sensor element 23 can be relatively easily formed into a thick film resistance element.

When the sensor element 23 is structured in the form of a metallic foil strain gauge or the like, it is generally fixed to the strain generating member 22 by means of bonding. However, fixing by means of bonding involves the possibility that reduction in bonding strength resulting from aging will affect the detection by the sensor element 23. Also, since a bonding works requires a substantial amount of time, it will constitute a cause of increase of the cost. In contrast thereto, as shown in FIG. 16, by forming the sensor element 23 as a thick film resistance element on the surface 22A of the strain generating member 22, reduction in bonding strength resulting from the aging will not occur substantially and, accordingly, the reliability of the sensor element 23 can be increased. Also, since no bonding work for the sensor element 23 is required, the assemblability can be increased to lower the cost.

Figure 17:
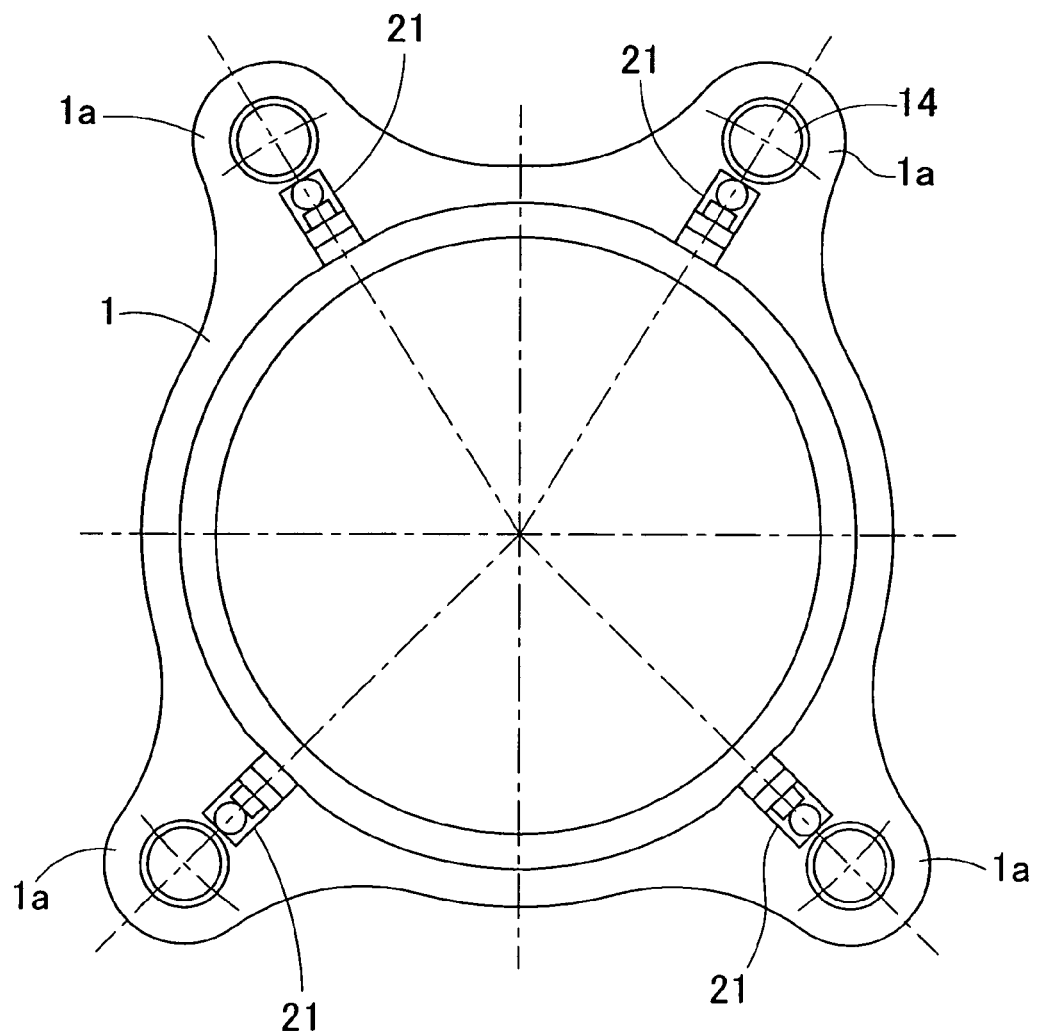
FIG. 17 is a front elevational view showing the outer member and the strain sensor unit employed in a different sensor equipped wheel support bearing assembly.
Figure 18:
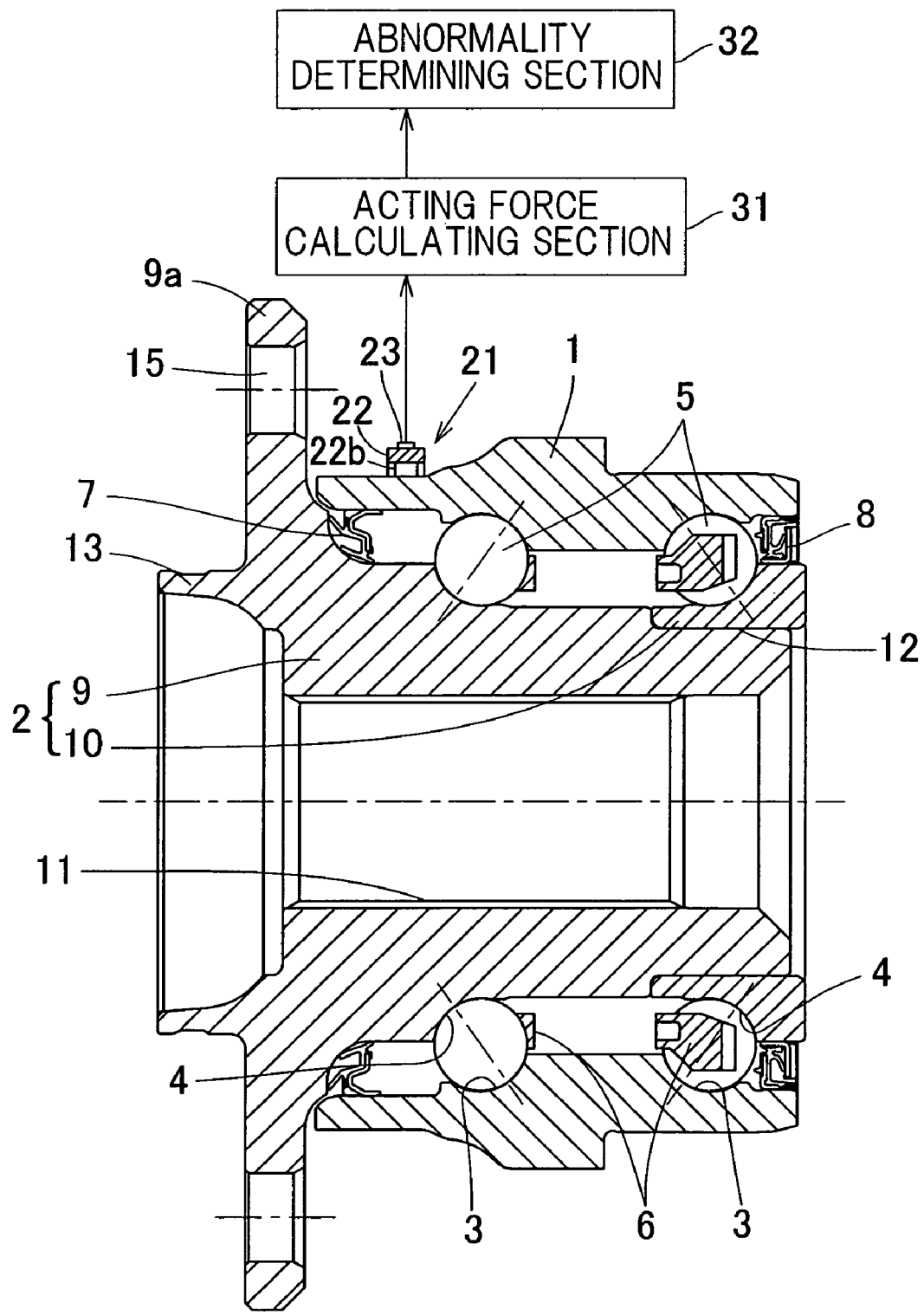
FIG. 18 is a diagram showing a sectional view of the sensor equipped wheel support bearing assembly according to a second applied example, shown together with a block diagram of a conceptual construction of the detecting system.

Although in the first applied example, the strain sensor unit 21 has been shown and described as provided only at one location, but as shown in FIG. 17, the strain sensor unit 21 may be provided at two or more locations. When the strain sensor unit 21 is provided at two or more locations, a further highly accurate load detection can be accomplished.

Although the first applied example is such that the strain generating member 22, the first and second contact fixing elements 22a and 22b and the outer member 1 are fixed in position with the use of the bolts 76, they may be fixed in position with the use of a bonding agent. Also, both of the bolts and bonding agent may be employed. In addition, without using any bonding agent and bolts, the strain generating member 22, the contact fixing elements 22a and 22b and the outer member 1 may be fixed in position by means of welding. The employment of any of those fixing structures is effective to firmly fix the strain generating member 22, the contact fixing elements 22a and 22b and the outer member 1. Also, since the first and second contact fixing elements 22a and 22b are made of a stainless steel excellent in corrosion resistance, they will not substantially be corroded even when they are used under the environment in which they are exposed to an external air and/or water. For this reason, displacement of the strain generating member 22 relative to the outer member 1 is prevented, and deformation occurring in the outer member 1 can be accurately transferred to the strain generating member 22.

FIGS. 18 to 20A and 20B illustrate a second example of application. This second applied example differs from the previously described first applied example in that the fixing surfaces 22e and 22f provided at the two locations in the strain generating member 22 of the strain sensor unit 21 are both fixed to the outer peripheral surface of the outer member 1. The axial position of the strain sensor unit 21 is on the outboard side of the outboard rolling surface 3 and, more specifically, at a position substantially axially intermediate between the outboard side rolling surface 3 and the outboard end of the outer member 1. Other than the strain sensor unit 21, they are similar to those shown and described in connection with the first applied example.

Figure 19:
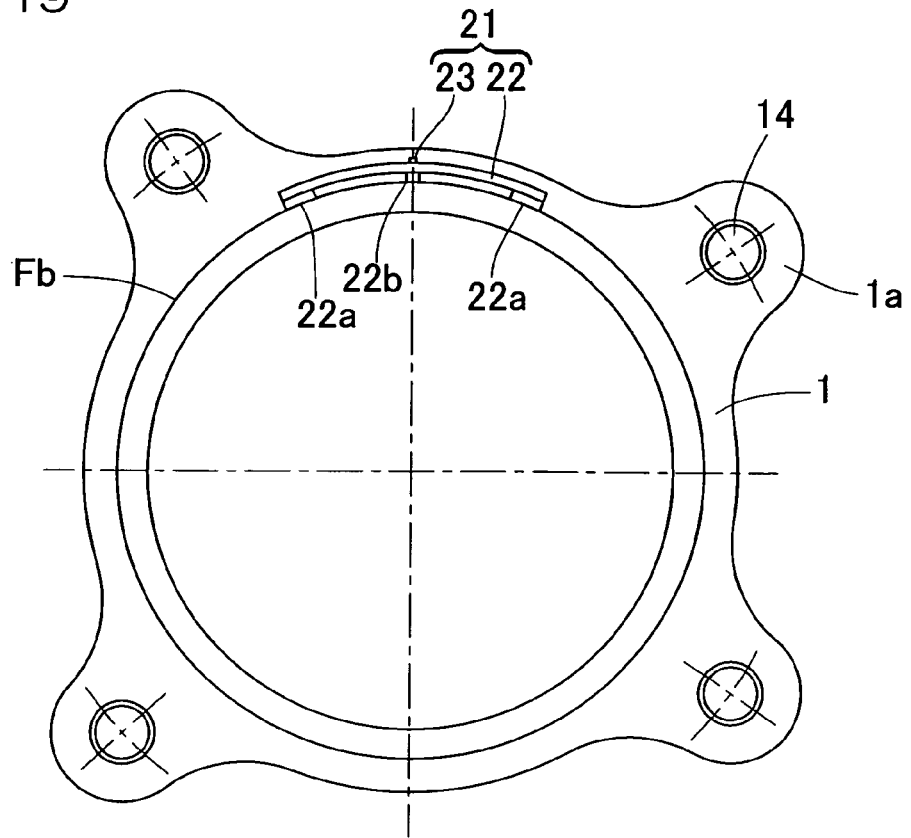
FIG. 19 is a front elevational view showing the outer member and the strain sensor unit employed in the sensor equipped wheel support bearing assembly.
Figure 20A:
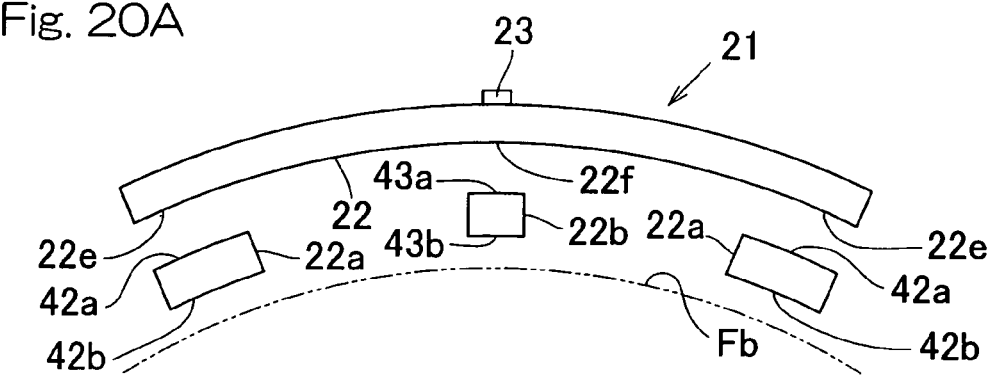
FIG. 20A is a front elevational view showing the strain sensor unit and the first and second spacer members shown as separated from each other.
Figure 20B:
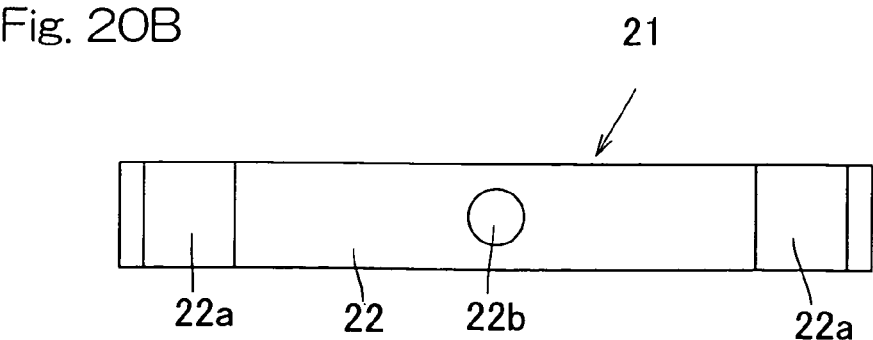
FIG. 20B is a bottom plan view showing the strain sensor unit and the first and second spacer members connected with each other.

As shown in FIG. 19 and FIGS. 20A and 20B, the strain generating member 22 of the strain sensor unit 21 is of an elongated arcuate shape extending in the circumferential direction along the outer periphery of the outer member 1, having portions of its inner surface, which correspond to its opposite ends and an intermediate portion thereof, rendered to be fixing surfaces 22e and 22f, respectively. The strain generating member 22 has a sectional shape which is rendered to be, for example, rectangular, but it may have any suitable sectional shape. The sensor element 23 is fitted to a front surface at a center portion of this strain generating member 22. In the case of this applied example, the sensor element 23 is bonded by the use of a bonding agent.

Between the fixing surfaces 22e and 22f of the strain generating member 22 and the outer peripheral surface of the outer member 1, which is a fixing target surface Fb therefor, contact fixing elements 22a and 22b are intervened. End faces 42a and 43a of the contact fixing elements 22a and 22b, which are oriented towards the fixing surfaces 22e and 22f are rendered to be cylindrical surfaces, which conform with those of the fixing surfaces 22e and 22f, while end faces 42b and 43b oriented towards the outer peripheral surface side of the outer member 1 are rendered to be cylindrical surfaces, which conform with the outer peripheral surface of the outer member 1. The contact fixing element 22a at each of opposite ends has a sectional shape, which is rectangular, and also has a large sectional surface area, but the contact fixing element 22b at a center portion has a round sectional shape and also has a small sectional surface area.

This strain sensor unit 21 is fixed to the outer peripheral surface of the outer member 1 by means of the fixing surfaces 22e and 22f of the strain generating member 22 through the contact fixing elements 22a and 22b so that a lengthwise direction of the strain generating member 22 may be oriented in a direction circumferentially of the outer member 1. Fixing of the strain generating member 22 and the contact fixing elements 22a and 22b and fixing of the contact fixing elements 22a and 22b and the outer member 1 are carried out by means of bonding with the use of, for example, a bonding agent. The fixing may be with the use of bolts. Since the contact fixing elements 22a and 22b are such that that end faces 42a and 43a oriented respectively towards the fixing surfaces 22e and 22f of the strain generating member 22 are of the shape conforming with those of the fixing surfaces 22e and 22f and end faces 42b and 43b oriented respectively towards the fixing target surface Fb of the outer member 1 are of the shape conforming with that of the fixing target surface Fb, the contact fixing elements 22a and 22b are held in tight contact with the strain generating member 22 and the outer member 1, respectively, to allow the strain generating member 22 to be fixed to the outer member 1 in a stabilized posture.

The strain sensor unit 21 is to be fixed to the outer member 1 in such a manner that the central fixing surface 22f may assume a top position in the entire circumference of the outer member 1 (a position on a counter-road surface side) and the fixing surfaces 22e at the opposite ends may assume respective positions a few tens degree directly below the top position. The top position referred to above is a circumferential location, where the outer member 1 undergoes the most considerable deformation in the radial direction under the influence of the load acting on the outer member 1, while the position spaced some tens degrees from the top position is where the outer member 1 does not almost deform under the influence of the load referred to above. This has been ascertained from results of FEM (Finite Elemental Method) analysis. It is to be noted that in the condition, in which the strain sensor unit 21 is fitted to the outer member 1, at portions of the strain generating member 22 other than the fixing surfaces 22e and 22f thereof, a gap is defined between each of them and the outer peripheral surface of the outer member 1.

Even in this second applied example, in a manner similar to that in the previously described first applied example, when the load acts on the hub unit 9, the outer member 1 is deformed through the rolling elements 5 and the deformation of the outer member 1 is transferred to the strain generating member 22 fixed to the outer member 1, accompanied by deformation of the strain generating member 22. As hereinbefore described, the use of the contact fixing elements 22a and 22b is effective to fix the strain generating member 22 to the outer member 1 in a stabilized posture and, therefore, the strain occurring in the outer member 1 can be accurately transferred to the strain generating member 22.

The strain generating member 22 undergoes deformation according to the deformation of the portion of the outer member 1, where the strain generating member 22 is fixed, in the radial direction. The top position of the outer member 1, where the central fixing surface 22f of the strain generating member 22 is fixed, is the circumferential location where the outer member 1 undergoes the most considerable deformation in the radial direction as a result of the load while the position at each of the opposite fixing surface 22e is fixed is the circumferential location where the outer member 1 does not almost undergo the deformation as a result of the load. For this reason, the strain generating member 22 is such that the central portion thereof having the fixing surface 22f, in which the deformation in the radial direction is considerable, is deformed further considerably about a fulcrum that is then defined at each of the opposite end portions having the fixing surface 22e where the deformation in the radial direction is small. Also, since the central contact fixing element 22b has a rigidity lower than that of the contact fixing element 22a at each of the opposite ends, more considerable deformation occurs at the center portion of the strain generating member 22 than that at any other portions. When this considerable strain appearing at the center portion of the strain generating member 22 is measured by means of the sensor element 23, the strain occurring in the outer member 1 can be detected with a high sensitivity.

The axial position, at which the strain sensor unit 21 is fitted to the outer member 1, is preferably so chosen as to be a position on the outboard side of the outboard rolling surface 3 in the outer member 1 as is the case with that in the applied example. This is because, in the case of the position on the outboard side of the outboard rolling surface 3, the directionality of positive and negative signs will occur in the strain depending on the direction of the load and, therefore, the positive or negative sign direction of the load can be detected.

According to the FEM analysis and results of experiments, with respect to both of the radially induced strain and the circumferentially induced strain of the outer member 1, the strain could have a directionality in a positive sign and a negative sign in response to the positive sign or negative sign of the load such as, for example, the external force or the acting force, both referred to previously, occurs merely in a portion on the outboard side in the outer member 1. Accordingly, in order to detect the positive or negative direction of the load, the strain sensor unit 21 may be mounted on the outboard position in the outer member 1.

Each of the first applied example and the second applied example includes the following second aspects.

[First Aspect of Second Mode]

The sensor equipped wheel support bearing assembly according to this first aspect of the second mode is a wheel support bearing assembly for supporting a vehicle wheel rotatably relative to a vehicle body, including an outer member having an inner periphery formed with a plurality of rolling surfaces, an inner member having rolling surfaces defined therein in face-to-face relation with the respective rolling surfaces in the outer member, a plurality of rows of rolling elements interposed between those rolling surfaces, a strain sensor unit, made up of a strain generating member and at least one sensor element fitted to this strain generating member for detecting strains induced in the strain generating member, the strain generating member of the strain sensor unit having two or more fixing surfaces adapted to be fixed to two locations of the outer member that are spaced a distance from each other, and a spacer member intervened between each of the fixing surface and a fixing target surface of the outer member at which the strain sensor unit is to be fixed, and having an end face oriented towards the side of the fixing face, which end face is of the shape conforming with that of the fixing face, and also having an end face oriented towards the side of the fixing target surface, which end face is of the shape conforming with that of the fixing target surface.

When during the travel of the automotive vehicle a load acts on one of the outer member and the inner member, which serves as a rotating member, the rotating member deforms. Also, the deformation of the rotating member is transferred to the stationary member through the rolling elements, resulting in deformation of the stationary member. Accordingly, regardless of whether the outer member is the rotating member or the stationary member, the outer member deforms. The deformation of the outer member brings about strain in the strain generating member through the spacer member. Since the strain generating member is fixed relative to the outer member at least two locations spaced a distance from each other and since two or more deformations of different degrees are transferred from the outer member, the strain generating member undergoes a considerable deformation depending on the difference between those deformations. The strain so induced in the strain generating member is detected by the sensor element fitted to such strain generating member. By determining the relation between the strain and the load beforehand by means of a series of experiments and/or simulations, the load imposed on the vehicle wheel can be detected from the output of the sensor element. The load so detected can be used in a vehicle control of the automotive vehicle.

Since between each of the fixing surfaces of the strain generating member and the fixing target surface of the outer member, the spacer member, in which the end face oriented towards the fixing surface has the shape conforming with that of the fixing surface and the end face oriented towards the side of the fixing target surface has the shape conforming with that of the fixing target surface, is interposed, the strain generating member can be fixed to the outer member in a stabilized posture. For this reason, the strain occurring in the outer member can be accurately transferred to the strain generating member and the strain induced in the outer member can be detected with a high precision accordingly.

The wheel support bearing assembly according to the first aspect of the second mode is such that the strain sensor unit made up of the strain generating member and the sensor element fitted to this strain generating member is so structured as to be fixed to the outer member through the spacer member, the sensor for the detection of the load can be installed compactly in the automotive vehicle. The interposition of the spacer member between the strain generating member and the outer member makes it possible to simplify the shape of the strain generating member. Hence, when the sensor element is fitted to this strain generating member of the simplified shape, the mass production will become excellent and the cost can be reduced. Also, since the processing of the wheel support bearing assembly can be minimized, the bearing rigidity will not be lowered.

[Second Aspect of Second Mode]

In the first aspect, of the two or more spacer member, at least one spacer member may have that end face oriented towards the fixing surface, which is a plain surface and, also, that end face oriented towards the side of the fixing target surface, which is a cylindrical surface.

[Third Aspect of Second Mode]

In the first aspect of the second mode, of the fixing surface of the strain generating member at the at least two locations, the fixing target surface of the first fixing surface may be a side surface of a flange provided in the outer member, and the fixing target surface of the second fixing surface may be a peripheral surface of the outer member.

If a contact target surface of the first fixing surface of the strain generating member is the side surface of the flange provided in the outer member and if a contact target surface of the second fixing surface is the outer peripheral surface of the outer member, the first and second fixing surface differ from each other in respect of their position in the radial direction and, therefore, the strain occurring in the outer member comes to be apt to be transferred to and expanded in the strain generating member. The strain so transferred and expanded is measured by the sensor element and, therefore, the strain occurring in the outer member can be detected with a high sensitivity, accompanied in increase of the load measuring accuracy.

[Fourth Aspect of Second Mode]

In the first aspect of the second mode, the spacer member referred to above may be formed of a stainless steel.

Since the spacer member is used under environments in which it tends to be exposed to an external atmosphere and/or water, the corrosive resistance is required. For this reason, the stainless steel excellent in corrosive resistance is suited.

[Fifth Aspect of Second Mode]

Also, in the first aspect of the first mode, the fixing target surface of the fixing surface of the strain generating member at each of the at least two locations may be an outer peripheral surface of the outer member.

The degree of deformation in the radial direction of the outer member effected by the load imposed on the vehicle wheel varies depending on various portions in the circumferential direction thereof. According to the result of analysis, the deformation of the outer member in the radial direction resulting from the axial force acting at the point of contact between the wheel tire and the road surface becomes maximum at the top position, which is on the side of the counter-road surface, and also at the bottom position, which is on the side adjacent the road surface. For this reason, if the fixing surface of a sensor fitting member is positioned at the at least two locations spaced from each other in the circumferential direction of the outer member, deformation in the radial direction, which is of a different degree, is brought on those fixing surfaces. In the strain generating member, the area thereof having the fixing surface at which a considerable deformation occurs in the radial direction undergoes a considerable deformation about the fulcrum that is defined by an area having the fixing surface at which a deformation in the radial direction is small. Accordingly, by fitting the sensor element to the area having the fixing surface, at which the considerable deformation in the radial direction occurs, the strain occurring in the outer member can be detected by this strain sensor unit with a high sensitivity.

[Sixth Aspect of Second Mode]

In the first aspect of the second mode, it is recommended to employ an acting force calculating section for calculating an external force acting on the wheel support bearing assembly or a force acting between the wheel tire and the road surface, in response to an output from the sensor element.

Figure 21:
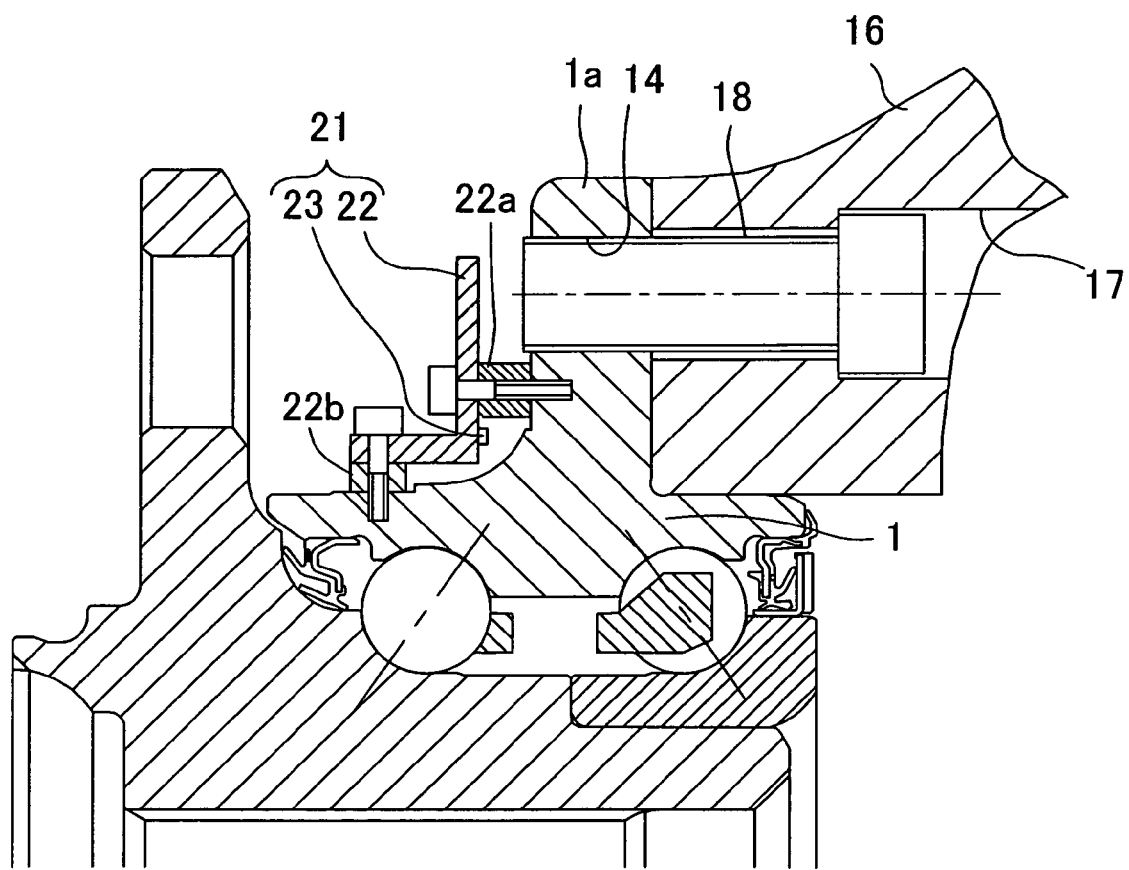
FIG. 21 is a sectional view showing the sensor equipped wheel support bearing assembly according to a suggested example.

A sectional view of the sensor equipped wheel support bearing assembly according to a suggested example of the present invention is shown in FIG. 21.

As discussed in the "SUMMARY OF THE INVENTION" in connection with the Patent Documents 3 and 4, the inventors of the present invention has attempted to construct the load sensor unit with a strain generating member and a strain measuring sensor element fitted to this strain generating member and to fix the strain generating member of this load sensor unit to a peripheral surface of an outer ring. In such case, it has been ascertained from a series of experiments that in order to allow the strain occurring in the outer ring to appear considerably, as shown in FIG. 21, the strain generating member 22 of the load sensor unit (the strain sensor unit) 21 has contact fixing elements 22a and 22b fixed to two locations of the outer ring (outer member) 1 and, of them, the first contact fixing element 21a may be fixed to a side face of a knuckle coupling flange 1a, provided in the outer ring 1 and the second contact fixing element 22b may be fixed to the outer peripheral surface of the outer ring 1.

In the meantime, a knuckle 16 forming a part of a suspension system for the automotive vehicle body is coupled in the following manner to the knuckle coupling flange 1a. Specifically, in a condition, in which an end face of the knuckle 16 is held in contact with the side face of the flange 1a, a fastening bolt 18 inserted into a fastening bolt insertion hole 17 in the knuckle 16 is threaded into a vehicle body fitting hole 14 defined in the flange 1a. With this coupling structure, respective contact surfaces of the flange 1a and the knuckle 16 will occasionally separate from each other when the load acts on the wheel support bearing assembly in such a direction as to separate the flange 1a and the knuckle 16 from each other. Once the contact surfaces separate from each other, the load concentrates on a threaded surface of the vehicle body fitting hole 14 and, therefore, the linearity between the load and the strain detected by the sensor element 23 will be impaired, posing such a problem that it becomes difficult to accurately detect the load, acting on the wheel support bearing assembly, from the output signal of the sensor element 23.

It is to be noted that where the load acting in such a direction as to urge the flange 1a towards the knuckle 16 acts on the wheel support bearing assembly, this load is supported by the entire contact surfaces of the flanges 1a and the knuckle 16 and, therefore, the linearity between the load and the strain detected by the sensor element 23 can be maintained, making it possible to detect the load, acting on the wheel support bearing assembly, from the output signal of the sensor element 23.

A third applied example for resolving the above discussed problems will be described with particular reference to FIGS. 22 to 28. Even in this third applied example, like parts similar to those employed in the first embodiment are shown by like reference numerals and, therefore, the details thereof are not reiterated.

Figure 22:
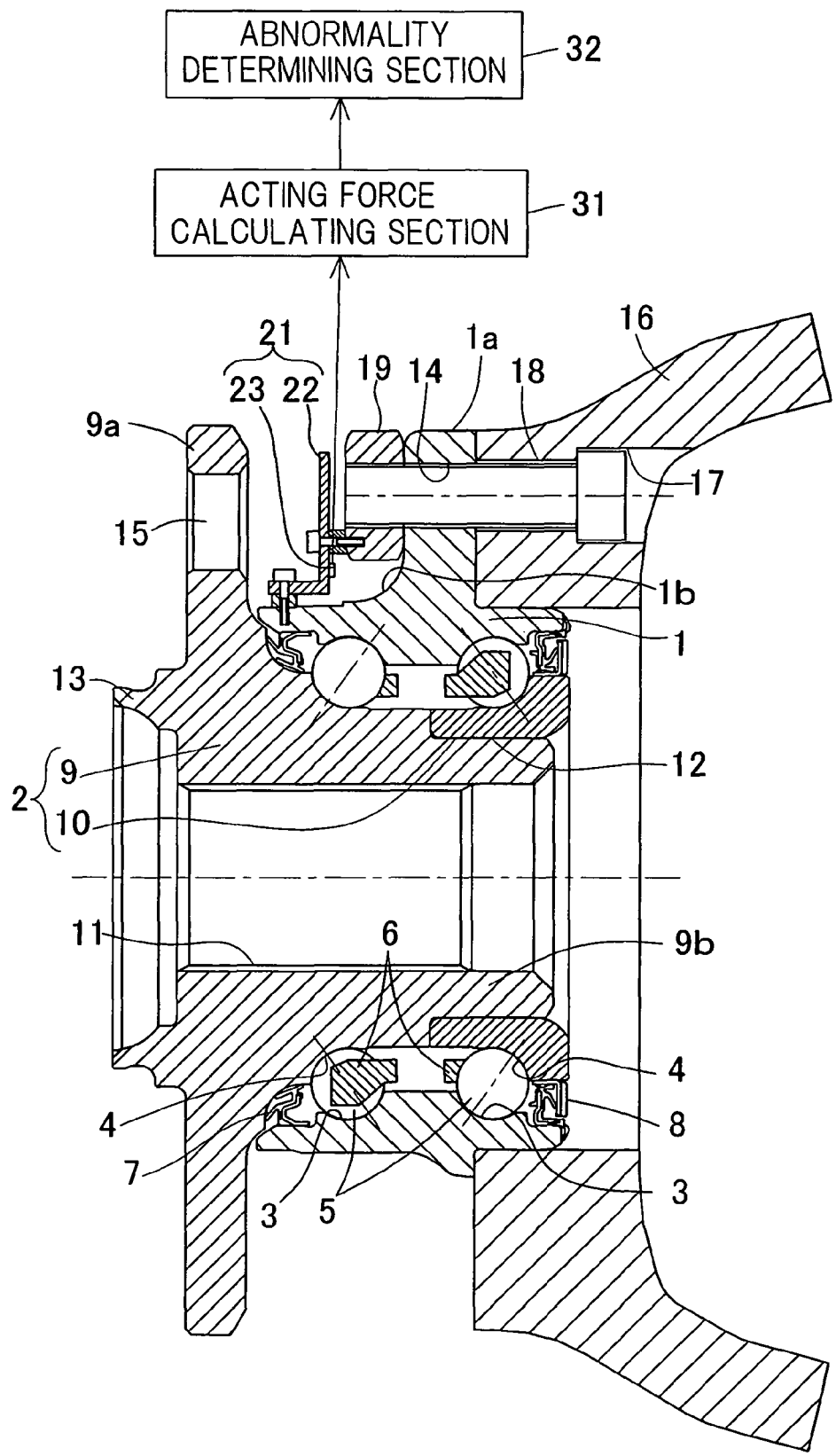
FIG. 22 is a diagram showing a sectional view of the sensor equipped wheel support bearing assembly according to a third applied example, shown together with a block diagram of the conceptual construction of the detecting system.

As shown in FIG. 22, the outer member 1 serves as the stationary member and is constructed in a unit of one piece construction. The outer member 1 has an outer periphery formed with a flange 1a adapted to be fitted to a knuckle 16 of a suspension system (not shown) of the automotive vehicle, and a vehicle body fitting hole 14 having an inner periphery formed with a female thread and extending through the flange 1a in an axial direction is provided at a plurality of circumferential locations of the flange 1a.

The knuckle 16 is provided with a stepped fastening bolt insertion hole 17 defined at a location corresponding to the vehicle body fitting hole 14 and, by threading a fastening bolt 18 inserted from the inboard side into the fastening bolt insertion hole 17 into the vehicle body fitting hole 14, the knuckle 16 is coupled with the flange 1a held in contact with the inboard side face of such flange 1a. Also, with a nut-like member 19 provided in contact with an outboard side face of the flange 1a, a portion of the fastening bolt 18 protruding outwardly on the outboard side from the vehicle body fitting hole 14 is threaded into a threaded hole 19a defined in the nut-like member 19.

The inner member 2 serves as a rotating member and is made up of a hub unit 9 having a hub flange 9a for the support of a vehicle wheel and an inner ring 10 mounted on an outer periphery of the inboard end of a cylindrical portion 9b of the hub unit 9. The hub unit 9 and the inner ring 10 are formed with respective rolling surfaces 4. An inner ring mounting face 12 of a configuration stepped radially inwardly to have a reduced diameter is provided in the outer periphery of the inboard end of the hub unit 9, and the inner ring 10 referred to above is mounted on this inner ring mounting face 12. The hub unit 9 has a center portion provided with a throughhole 11. The hub flange 9a is provided with a press fitting hole 15 defined at a plurality of circumferential locations for receiving corresponding hub bolts (not shown). In the vicinity of a root portion of the hub flange 9a of the hub unit 9, a cylindrical pilot portion 13 for guiding a vehicle wheel and a brake component part (not shown) protrudes towards the outboard side.

Figure 25A:
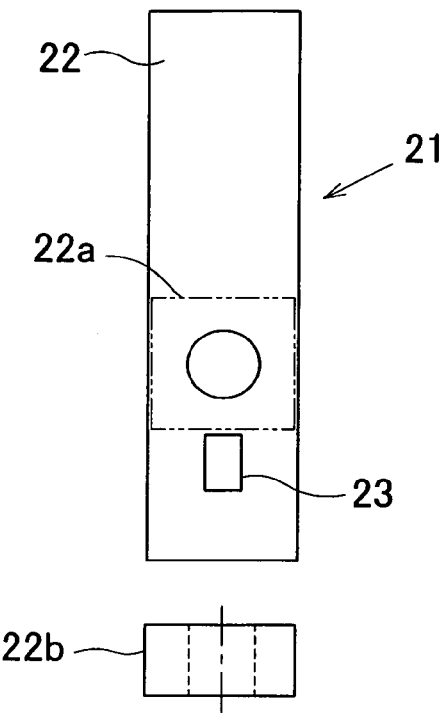
FIG. 25A is a rear view showing the strain sensor unit and first and second fitting members shown as separated from each other.

The outer member 1 has an outer peripheral portion provided with a strain sensor unit 21 shown in FIG. 25A. This strain sensor unit 21 is of a type, in which a sensor element 23 for measuring a strain generating member 22 is fitted to the strain generating member 22. The strain generating member 22 may have various component parts (not shown) for processing an output signal from the sensor element 23 fitted thereto. The strain sensor unit 21 is fitted to the outer member 1 through fitting members in the form of first and second contact fixing elements 22a and 22b.

The strain generating member 22 includes a first fixing surface 22aa adapted to be fixed to the nut-like member 19 and a second fixing surface 22bb adapted to be fixed to an outer peripheral surface of the outer member 1. The first fixing surface 22aa is fixed to the nut-like member 19 through a first contact fixing element 22a. On the other hand, the second fixing surface 22bb is fixed to the outer peripheral surface of the outer member 1 through a second contact fixing element 22b.

Figure 25B:
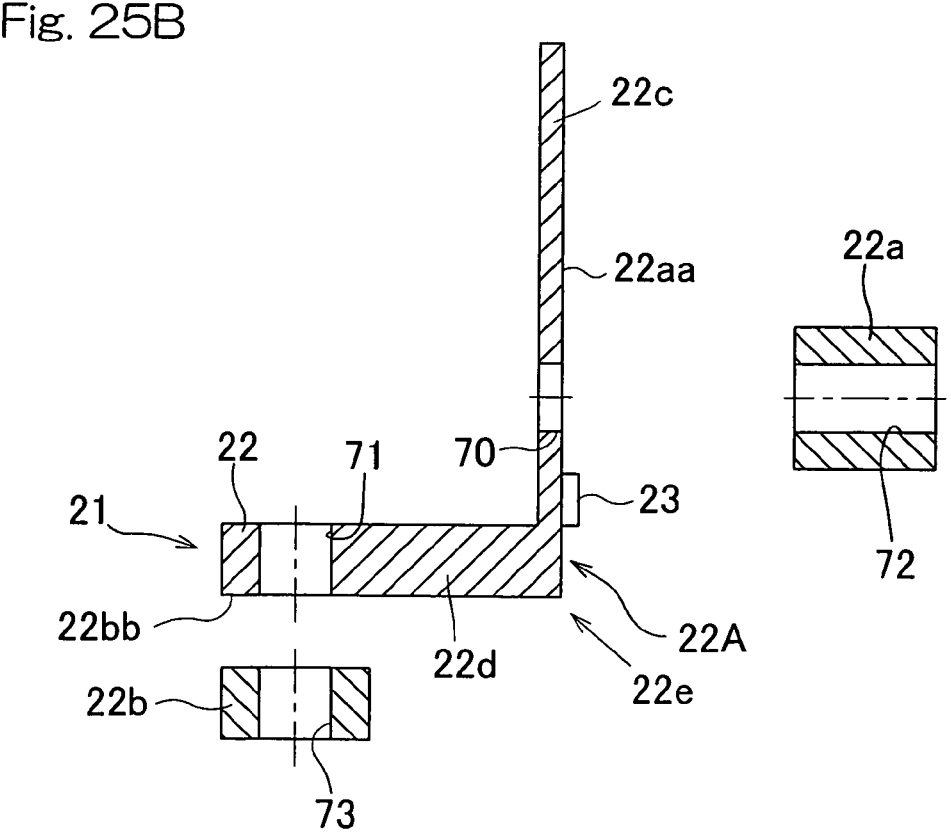
FIG. 25B is a broken side view thereof.

As best shown in FIG. 25B, the strain generating member 22 is of an L-shaped configuration including a radially oriented portion 22c extending in a radial direction and an axially oriented portion 22d extending in an axial direction, and a center area of the radially oriented portion 22b is rendered to be the first fixing surface 22aa and a foremost end area of the axially oriented portion 22d is rendered to be the second fixing surface 22bb. The radially oriented portion 22c has a wall thickness reduced so that the rigidity thereof is lower than that of the axially oriented portion 22d. The sensor element 23 is fitted to a portion of a sensor mounting surface 22A, which is an inboard surface of the radially oriented portion 22c, on a radially inward side of the first fixing surface 22aa.

Figure 23:
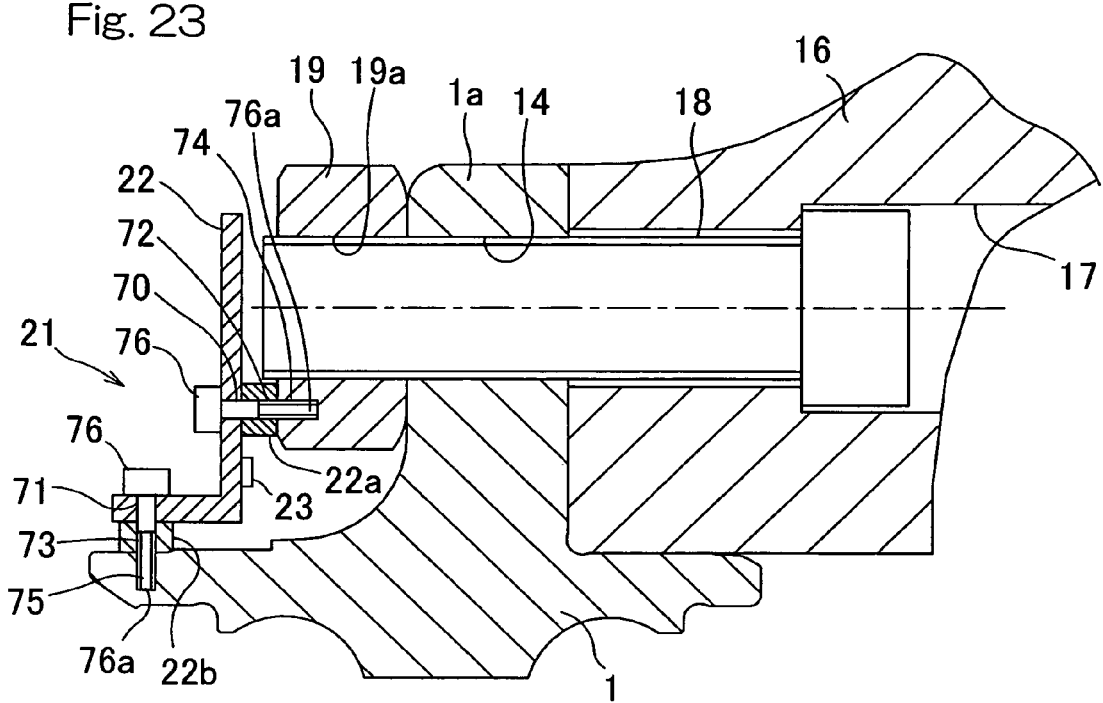
FIG. 23 is a fragmentary enlarged sectional view showing the sensor equipped wheel support bearing assembly.

The strain sensor unit 21 is, as best shown in FIG. 23, fixed to the nut-like member 19 and the outer member 1 with the use of a bolt 76. The first fixing surface 22aa of the strain generating member 22 is formed with an axially extending bolt insertion hole 70 and the second fixing surface 22bb is formed with a radially extending bolt insertion hole 71. The first contact fixing element 22a is formed with a bolt insertion hole 72 alignable with the bolt insertion hole 70 and the second contact fixing element 22b is formed with a bolt insertion hole 73 alignable with the bolt insertion hole 71. The nut-like member 19 is formed with a bolt threading hole 74, having its inner peripheral surface formed with a female thread, at a position alignable with the bolt insertion holes 70 and 71. Also, the outer member 1 is formed with a bolt threading hole 75, having an inner peripheral surface formed with a female thread, at a position alignable with the bolt insertion holes 71 and 73. The bolt threading holes 74 and 75 are held at respective positions that are in the same phase with respect to the circumferential direction of the outer member 1.

As best shown in FIG. 23, the strain sensor unit 21 is fixed to the outer member 1 by passing a bolt 76 from the outboard side into the bolt insertion hole 70 in the strain generating member 22 and the bolt insertion hole 72 in the first contact fixing element 22*a*, with a male threaded portion 76*a* of the bolt 76 engaged into the bolt threading hole 74 in the nut-like member 19, and, also, by passing a bolt 76 from the outer peripheral side into the bolt insertion hole 71 in the strain generating member 22 and the bolt insertion hole 73 in the second contact fixing element 22*b*, with a male threaded portion 76*a* of the bolt 76 engaged into the bolt threading hole 75 in the outer member 1.

Figure 24:
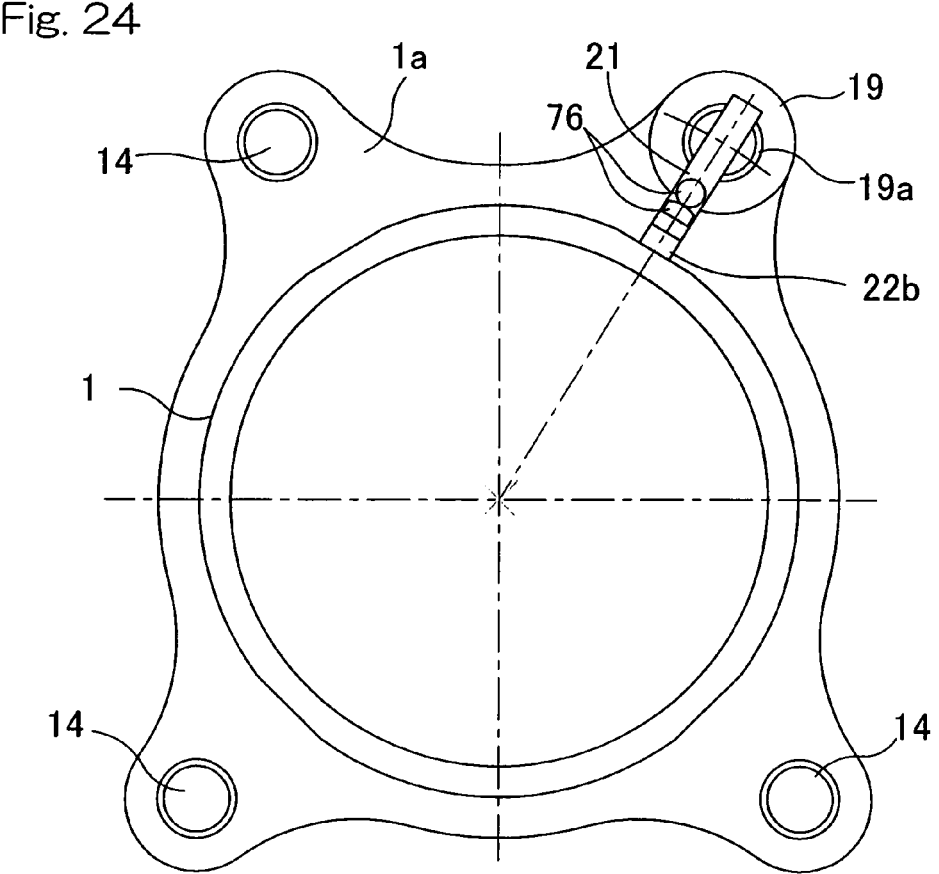
FIG. 24 is a front elevational view showing the outer member and the strain sensor unit employed in the sensor equipped wheel support bearing assembly.

In a condition in which the strain sensor unit 21 is fixed, as shown in FIGS. 22 to 24, the first fixing surface 22*aa* of the strain generating member 22 is fixed to the nut-like member 19 in contact therewith through the first contact fixing element 22*a*, and the second fixing surface 22*bb* thereof is fixed to the outer peripheral surface of the outer member 1 in contact therewith through the second contact fixing element 22*b*. Also, the first and second fixing surfaces 22*aa* and 22*bb* are so fixed as to assume the same phase in the circumferential direction of the outer member 1. Thus, if the first and second fixing surfaces 22*aa* and 22*bb* are held in the same phase in the circumferential direction, the length of the strain generating member 22 can be reduced, thus facilitating installation of the strain sensor unit 21.

As shown in FIG. 22, for processing an output from the sensor element 23, there are provided an acting force calculating section 31 and an abnormality determining section 32 as is the case with the previously described second embodiment. The acting force calculating section 31 and the abnormality determining section 32 may be those provided in a sensor signal processing circuit employed in the wheel support bearing assembly or in an electric control unit (ECU) of the automotive vehicle.

The operation of the sensor equipped wheel support bearing assembly of the construction hereinabove described will now be described. When the load is imposed on the hub unit 9 in a manner similar to that in any one of the foregoing embodiments, the outer member 1 undergoes a deformation through the rolling elements 5. Such deformation of the outer member 1 is transferred to the strain generating member 22 through the first and second contact fixing elements 22*a* and 22*b*, accompanied by deformation of the strain generating member 22. The strain induced in the strain generating member 22 is measured by the sensor element 23. At this time, the radially oriented portion 22*c* of the strain generating member 22 deforms in accord with deformation of the flange 1*a* of the outer member 1. In the case of this first applied mode, since the rigidity of the radially oriented portion 22*c* is lower as compared with that of the outer member 1 and since the strain generating member 22 is of the L-shaped configuration including the radially oriented portion 22*c* having a low rigidity and the axially oriented portion 22*d* having a high rigidity, the strain concentrates in the vicinity of a corner area 22*d* between the radially oriented portion 22*c* and the axially oriented portion 22*d* and on one side adjacent the radially oriented portion 22*c* and, hence, appears as a more considerable strain than that in the outer member 1. In other words, the strain developed between the radially oriented portion 22*c* and the axially oriented portion 22*d* represents a transferred and expanded form of the strain at an R portion 1*b* (FIG. 22) at the base end of the flange 1*a*. Since this strain is measured by the sensor element 23, the strain occurring in the outer member 1 can be detected with a high sensitivity and the strain measuring accuracy can be increased.

Since the structure is employed, in which the knuckle 16 and the nut-like member 19 are provided at the opposite side faces of the flange 1*a* in the outer member 1, respectively, and the both knuckle 16 and nut-like member 19 are fastened together by the bolt 18, the flange 1*a* and the knuckle 16 can be maintained in contact with each other. For this reason, regardless of whether the load acts on the wheel support bearing assembly so as to urge the flange 1*a* towards the knuckle 16, or whether the load acts on the wheel support bearing assembly so as to separate the flange 1*a* and the knuckle 16 in a direction away from each other, a linearity of an output signal of the sensor element 23 relative to the load can be obtained with the range of the linear characteristic expanded. For this reason, from the output signal of the sensor element 23, the load acting on the wheel support bearing assembly can be detected without any correction process being effected, or with a simple correction process being effected.

Since in this wheel support bearing assembly, the structure is employed, in which the strain sensor unit 21 made up of the strain generating member 22 and the sensor element 23 fitted to this strain generating member 22 is fitted to the outer member 1, the load detecting sensor can be installed compactly in the automotive vehicle. Since the strain generating member 22 is a simple component part that is fitted to the outer member 1 and the nut-like member 19, fitting of the sensor element 23 thereto renders the mass productivity to be excellent and also makes it possible to reduce the cost.

Figure 26:
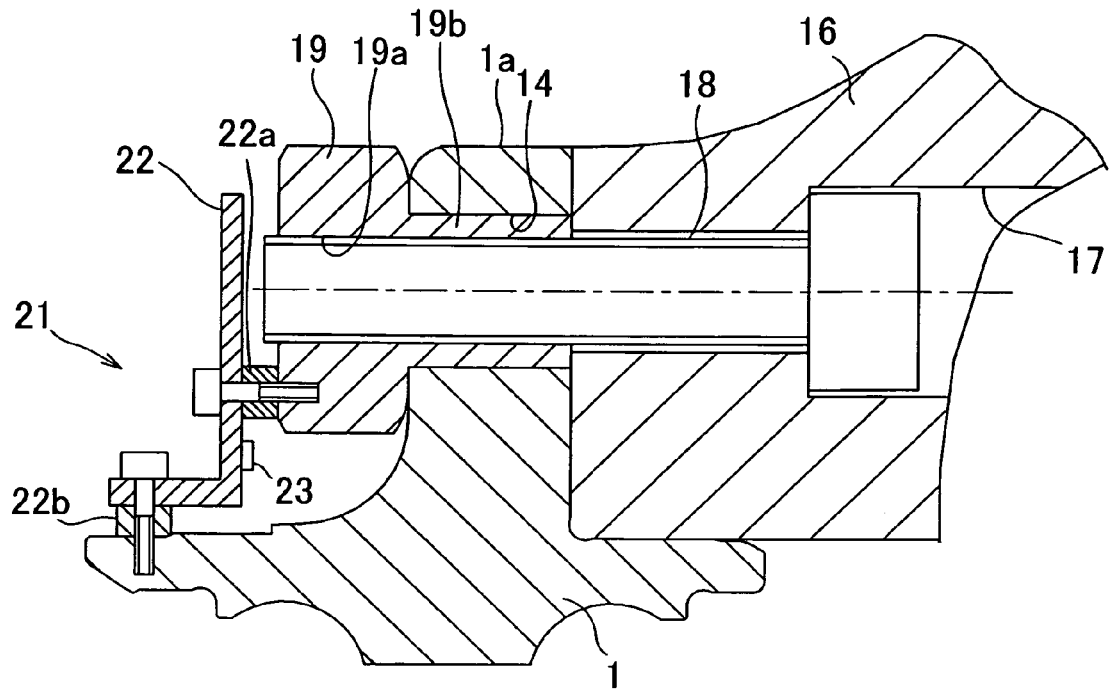
FIG. 26 is a fragmentary sectional view showing a different sensor equipped wheel support bearing assembly.
Figure 27:
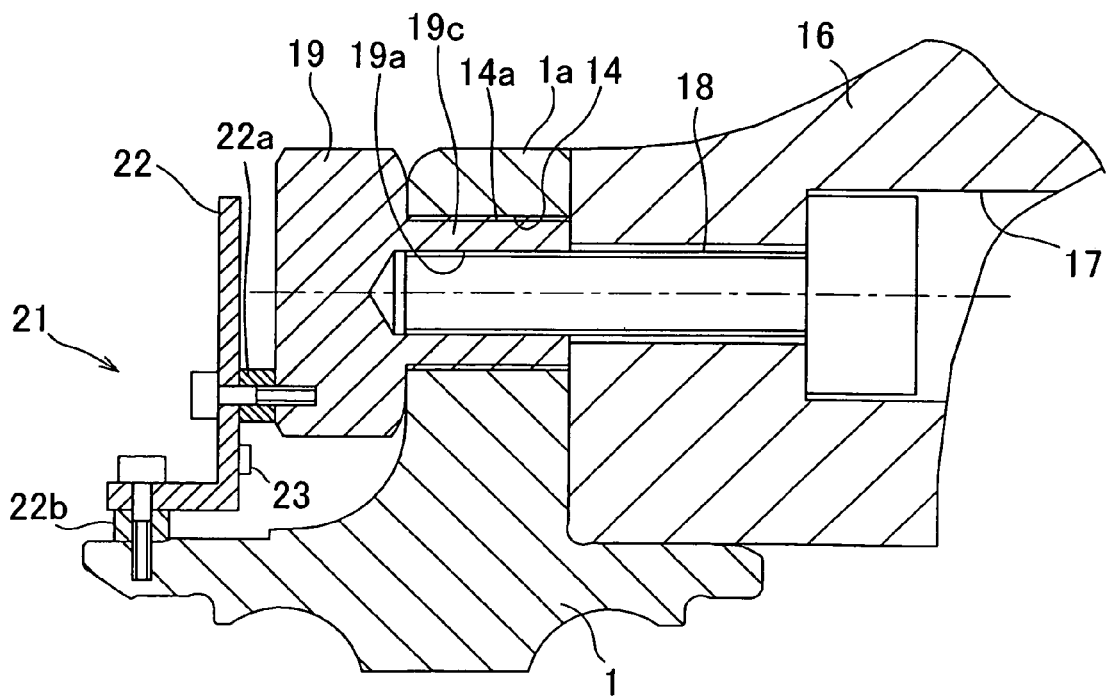
FIG. 27 is a fragmentary sectional view showing a further different sensor equipped wheel support bearing assembly.
Figure 28:
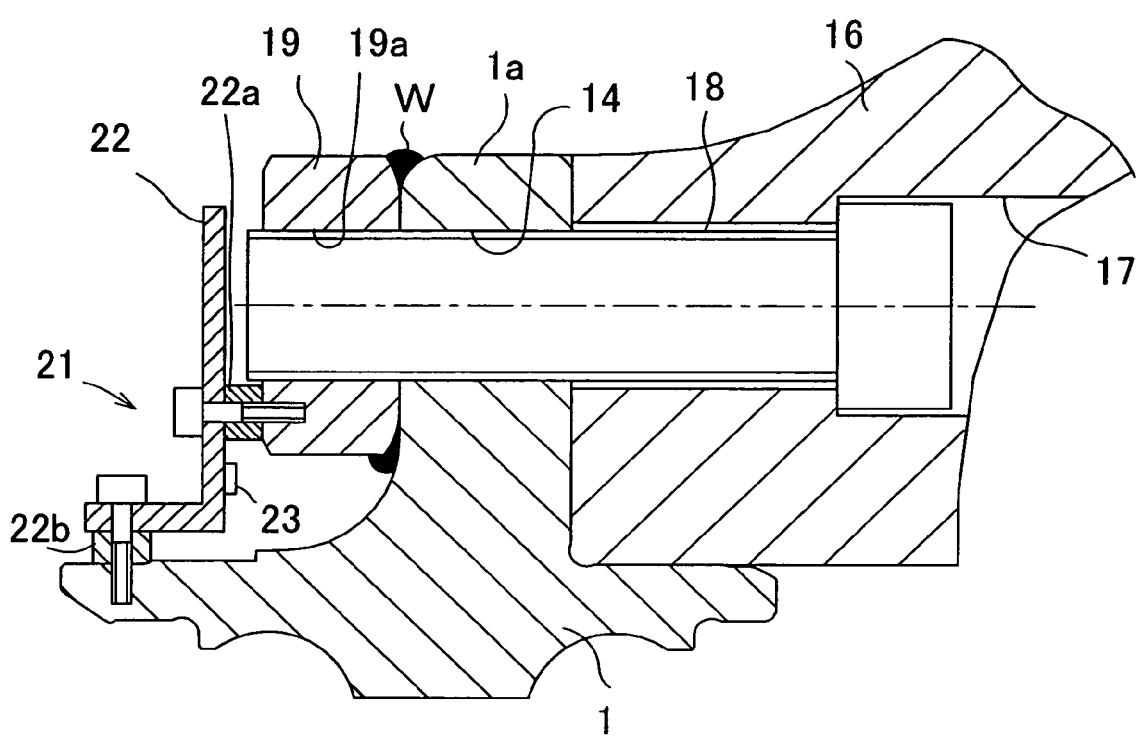
FIG. 28 is a fragmentary sectional view showing a yet further different sensor equipped wheel support bearing assembly.

Although the foregoing third applied example employs the structure, in which the flange 1*a* is held down by the nut-like member 19, the flange 1*a* and the nut-like member 19 may be fixed directly. As a method of achieving this direct fixing, such fixing methods as shown in FIGS. 26 to 28, respectively, are available. In FIG. 26, the nut-like member 19 is provided with a shank portion 19*b* and, by pressing this shank portion 19*b* under interference into the vehicle body fitting hole 14 having a smooth inner periphery, the nut-like member 19 is fixed to the flange 1*a*. In FIG. 27, the nut-like member 19 is provided with a shank portion and this shank portion is rendered to be a male threaded portion 19*c* having an outer periphery formed with a threaded groove and, by threading this male threaded portion 19*c* into a female threaded portion 14*a* defined in the vehicle body fitting hole 14, the nut-like member 19 is fixed to the flange 1*a*. Although the illustrated examples make use of the threaded hole 19*a* in the nut-like member 19 which is in the form of an internally threaded blind hole, it may extend completely in the axial direction. FIG. 28 illustrates the example, in which in the applied modes shown in and described with reference to FIGS. 22 to 25A and 25B, the nut-like member 19 is fixed to the flange 1*a* by means of a weld deposit W.

As hereinabove described, if the nut-like member 19 is fixed to the flange 1*a* of the outer member 1, a work to connect the flange 1*a* and the knuckle 16 by means of the fastening bolt 18 can be eased. Also, since the position of the nut-like member 19 relative to the flange 1*a* is stabilized, the detecting accuracy of the strain sensor unit 21 can be increased. In addition, by providing the nut-like member 19 in a fixed condition relative to the outer member 1, the nut-like member 19 will form a substantial part of the flange 1*a* and since the coupling length between the flange 1*a* and the fastening bolt 18 increases, the coupling can be made firm. In addition, by providing the nut-like member 19 in a fixed condition relative to the outer member 1, the nut-like member 19 will form a substantial part of the flange 1a and since the coupling length between the flange 1a and the fastening bolt 18 increases, the coupling can be made firm.

Although the third applied example is such that the strain generating member 22, the first and second contact fixing elements 22a and 22b and the outer member 1 are fixed in position with the use of the bolts 76, they may be fixed in position with the use of a bonding agent. Also, the both may be employed. In addition, without using any bonding agent and bolts, the strain generating member 22, the contact fixing elements 22a and 22b and the outer member may be fixed in position by means of welding. The employment of any of those fixing structures is effective to firmly fix the strain generating member 22, the contact fixing elements 22a and 22b and the outer member 1. For this reason, displacement of the strain generating member 22 relative to the outer member 1 is prevented, and deformation occurring in the outer member 1 can be accurately transferred to the strain generating member 22.

It is to be noted that although in describing the third applied example, reference has been made that the outer member 1 is the stationary member, it can be equally applied to the wheel support bearing assembly, in which the inner member serves as the stationary member, in which case the strain sensor unit 21 is provided on a peripheral surface which forms an inner periphery of the inner member.

This third applied example includes the following third modes of application.

[First Aspect of Third Mode]

The wheel support bearing assembly according to the first aspect of the third mode is a wheel support bearing assembly for supporting a vehicle wheel rotatably relative to a vehicle body, including an outer member having an inner periphery formed with a plurality of rolling surfaces, an inner member having rolling surfaces defined therein in face-to-face relation with the respective rolling surfaces in the outer member, a plurality of rows of rolling elements interposed between those rolling surfaces, a flange formed in a peripheral surface of one of the outer member and the inner member, that serves as a stationary member, a fastening bolt that connects the flange and a knuckle forming a part of a suspension system of the automotive vehicle, inserted through a vehicle body fitting hole defined in the flange, a nut-like member fitted to the flange for urging a portion of the flange around the vehicle body fitting hole against the knuckle, and a strain sensor unit, made up of a strain generating member fixed to the stationary member and a strain measuring sensor element fitted to the strain generating member is provided, the strain generating member of the strain sensor unit including two contact fixing elements at respective locations relative to the stationary member, in the form of a first contact fixing element adapted to be fixed to the nut-like member and a second contact fixing element adapted to be fixed to a peripheral surface of the stationary member.

When the load acts on the rotating member during the travel of the automotive vehicle, the stationary member undergoes deformation through the rolling elements and such deformation brings about a strain in the strain generating member. The sensor element fitted to the strain generating member outputs an output in response to the strain induced in the strain generating member. From this output, the strain occurring in the stationary member can be detected. By determining the relation between the strain and the load beforehand by means of a series of experiments and/or simulations, the load acting on the vehicle wheel can be detected from the output of the sensor element. Also, the load so detected can be used in a vehicle control of the automotive vehicle.

Since the nut-like member for urging that portion of the flange around the vehicle body fitting hole against the knuckle is fitted to the flange, the flange and the knuckle can be held at all times in a contacted fashion. For this reason, regardless of whether a force acts on the wheel support bearing assembly in such a direction as to urge the flange against the knuckle, or whether a force acts on the wheel support bearing assembly in such a direction as to separate the flange and the knuckle away from each other, the linearity of an output signal of the sensor element relative to the load can be maintained and, from the output signal of the sensor element, the load imposed on the wheel support bearing assembly can be detected with no correcting process being effected or with merely a simple correcting process being effected.

Since the strain generating member includes two contact fixing elements at respective locations relative to the stationary and since of those contact fixing elements the first contact fixing element is fixed to the nut-like member adapted to contact a flange surface provided in the stationary member while the second contact fixing element is fixed to a peripheral surface of the stationary member, respective radial positions of the first and second contact fixing elements differ from each other and the strain occurring in the stationary member comes to appear easily as transferred and expanded in the strain generating member. Since the sensor element outputs in response to the strain so transferred and expanded, the strain occurring in the stationary member can be detected with a high sensitivity and the load measuring accuracy will increase.

Since this wheel support bearing assembly is of such a construction in which the strain sensor unit made up of the strain generating member and the sensor element fitted to this strain generating member is fitted to the stationary member, the sensor for the detection of the load can be installed compactly in the automotive vehicle. Since the strain generating member is a simple component part that is fitted to the stationary member, fitting of the sensor element thereto makes the mass productivity to be excellent and makes it possible to reduce the cost.

[Second Aspect of Third Mode]

In the first aspect of the third mode, the stationary member may be represented by the outer member. In such case, the strain sensor unit is fitted to an outer peripheral surface of the outer member.

[Third Aspect of Third Mode]

In the first aspect of the third mode, the strain generating member may be of an L-shaped configuration including a radially oriented portion extending in a radial direction and an axially oriented portion extending in an axial direction, in which the sensor element is fitted at a location in the radially oriented portion in the vicinity of a point of intersection between the radially oriented portion and the axially oriented portion.

[Fourth Aspect of Third Mode]

In the first aspect of the third mode, the nut-like member may be fixed to the stationary member by press fitting it into the vehicle body fitting hole.

[Fifth Aspect of Third Mode]

In the first aspect of the third mode, the nut-like member may be fixed to the stationary member by threading a male threaded portion of the nut-like member into a female threaded portion of the vehicle body fitting hole.

[Sixth Aspect of Third Mode]

In the first aspect of the third mode, the nut-like member may be fixed to the stationary member by meals of welding.

By fixing the nut-member beforehand to the stationary member by means of the method according to any one of the fourth to sixth aspects of the third mode, the work to connect the flange of the stationary member and the knuckle together by means of the fastening bolt can be facilitated. Also, since the position of the nut-like member relative to the flange is stabilized, the detecting accuracy of the strain sensor unit increases. In addition, if the nut-like member is provided in a fixed fashion to the stationary member, the nut-like member will become a substantial part of the flange and the length of a coupling portion between the flange and the fastening member will increase and, therefore, the coupling will become firm. In order to increase the length of the coupling portion between the flange and the fastening bolt, a projection of the same shape as that of the nut-like member may be provided in the flange, but in the case of a bearing raceway ring formed by forging, processing of the projection is difficult, accompanied by reduction in yield.

A fourth example of application will now be described with particular reference to FIGS. 29 to 32A and 32B. Even in this fourth applied example, like parts similar to those employed in the first embodiment are shown by like reference numerals and, therefore, the details thereof are not reiterated.

Figure 29:
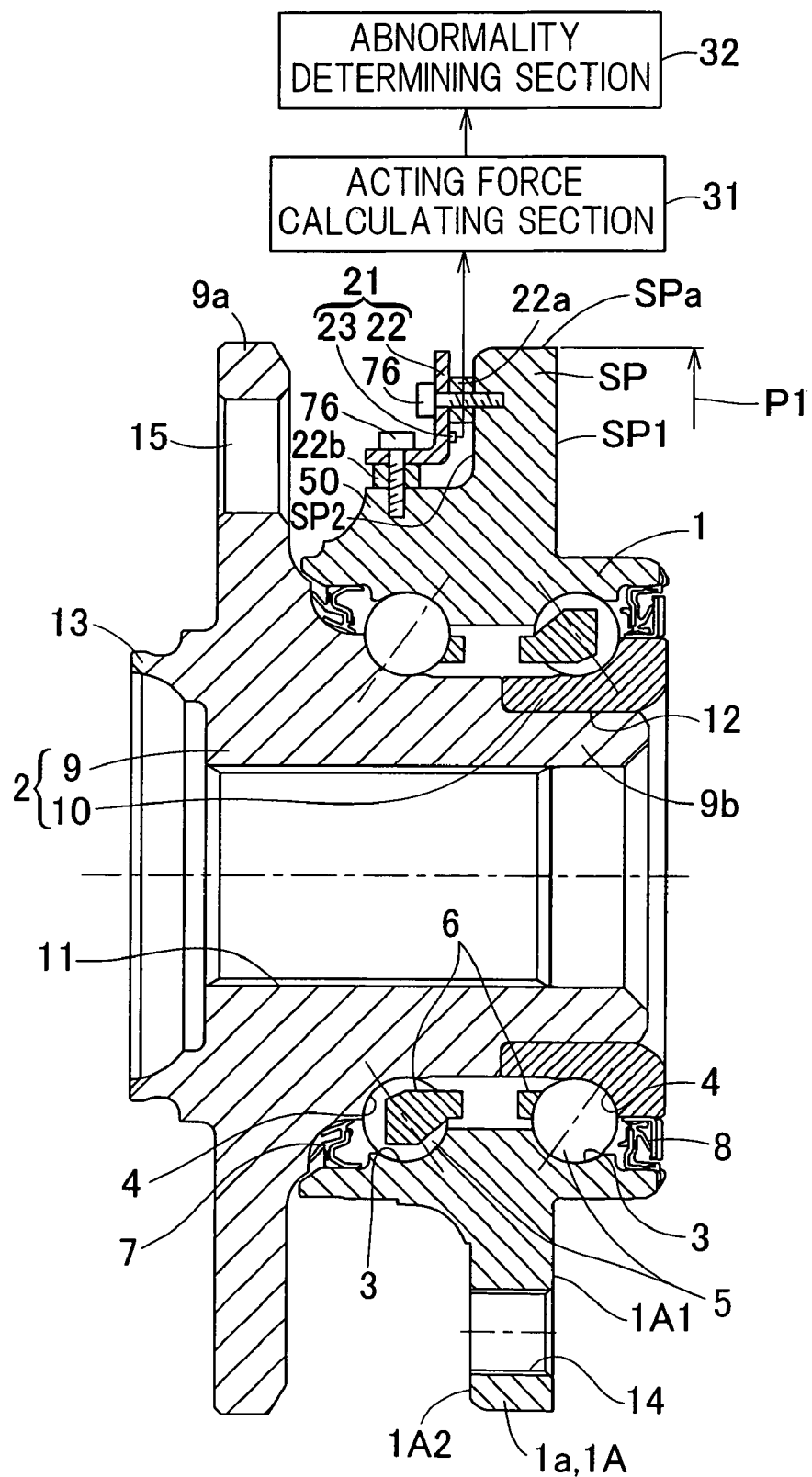
FIG. 29 is a diagram showing a sectional view of the sensor equipped wheel support bearing assembly according to a fourth applied example, shown together with a block diagram of the conceptual construction of the detecting system.
Figure 30:
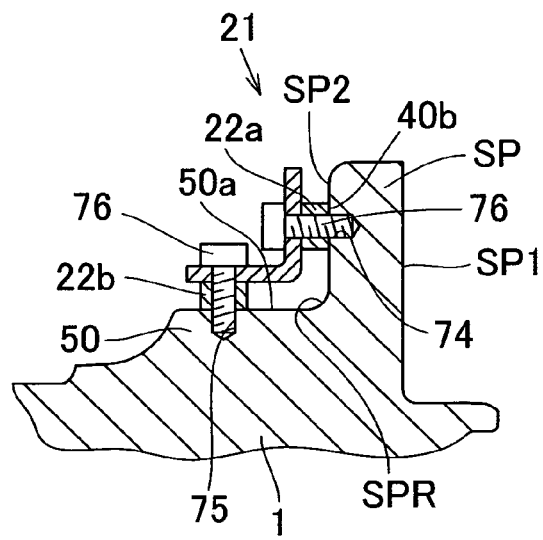
FIG. 30 is a broken sectional view showing an important portion of the sensor equipped wheel support bearing assembly on an enlarged scale.

As best shown in FIG. 29, the outer member 1 serves as a stationary member and has an outer periphery formed with a vehicle body fitting flange 1a adapted to be fitted to a knuckle of a suspension system (not shown) of an automotive vehicle body, with a bolt hole 14 defined in this flange 1a at a plurality of locations in a direction circumferentially thereof. The bolt holes 14 are processed either to have female threads or not to have them. The flange 1a referred to above has a circumferential portion 1aa, in which the bolt holes 14 are provided, which portion 1aa is rendered to be a bolt hole-provided projecting piece 1A protruding radially outwardly beyond the remaining portion thereof. In this illustrated embodiment, four bolt hole-provided projecting pieces 1A are provided and are spaced at intervals of a predetermined distance in the circumferential direction. It is, however, to be noted that the bolt hole-provided projecting piece 1A is not always limited to four such as shown and described. Between the neighboring bolt hole-provided projecting pieces 1A and 1A in an outer peripheral surface of the outer member 1, a sensor fixing projecting piece SP protruding radially outwardly, specifically in this fourth applied example now under discussion, one sensor fixing projecting piece SP is provided.

The outer peripheral surface of the outer member 1 is provided with a strain sensor unit 21. This strain sensor unit 21 is of a type, in which the sensor element 23 for detecting the strain induced in a strain generating member 22 and a sensor signal processing circuit 60 for processing an output signal of the sensor element 23 are provided in the strain generating member 22. The strain sensor unit 21 is fitted to the outer member 1 through first and second contact fixing elements 22a and 22b, which are fitting members.

The strain generating member 22 includes a first fixing surface 22aa adapted to be fixed directly to the first contact fixing element 22a in contact therewith and a second fixing surface 22bb adapted to be fixed directly to the second contact fixing element 22b in contact therewith. The strain generating member 22 is of an L-shaped configuration including a radially oriented portion 22c extending in a radial direction and an axially oriented portion 22d extending in an axial direction. An area of the radially oriented portion 22c proximate to an intermediate point thereof in a lengthwise direction is rendered to be the first fixing surface 22aa and an area of the axially oriented portion 22d proximate to a foremost end thereof is rendered to be the second contact fixing portion 22b. The radially oriented portion 22c has a wall thickness so reduced as to have a reduced rigidity as compared with that of the axially oriented portion 22d. The sensor element 23 is arranged at a location radially inwardly of the first fixing surface 22aa in a sensor mounting surface 22A, which is a surface on the inboard side of the radially oriented portion 22c.

The sensor element 23 referred to above is in the form of a thick film resistance element formed on the sensor mounting surface 22A of the strain generating member 22. In other words, an insulating layer is formed on the sensor mounting surface 22A; a pair of electrodes 51 and 51 are formed on respective sides of a surface of this insulating layer; a strain measuring resistance element comprised of a thick film resistance element, which eventually becomes a strain sensor, is formed on the insulating layer at a location between the electrodes 51 and 51; and a protecting film is formed on the strain measuring resistance element and the electrodes 51 and 51.

The sensor signal processing circuit 60 includes electric/electronic component parts 23 such as, for example, an operational amplifier for processing an output signal of the sensor element 23, resistors, a microcomputer and circuit elements such as, for example, an electric power source for driving the sensor element 23, all integrated on a semiconductor chip or the like, and a surface of the insulating layer is formed with an electrode 64 for electrically connecting the sensor element 23 and the electric/electronic component parts 63 with each other, an electrode 65, which forms a wiring between the various component of the electric/electronic component parts 63, and a pad 68 for connecting a cable 69, which forms a signal transmitting path from the sensor signal processing circuit 60 to an external device such as, for example, an electric control unit (ECU) of the automotive vehicle.

A fitting structure of the strain sensor 21 will now be described in detail.

Figure 31:
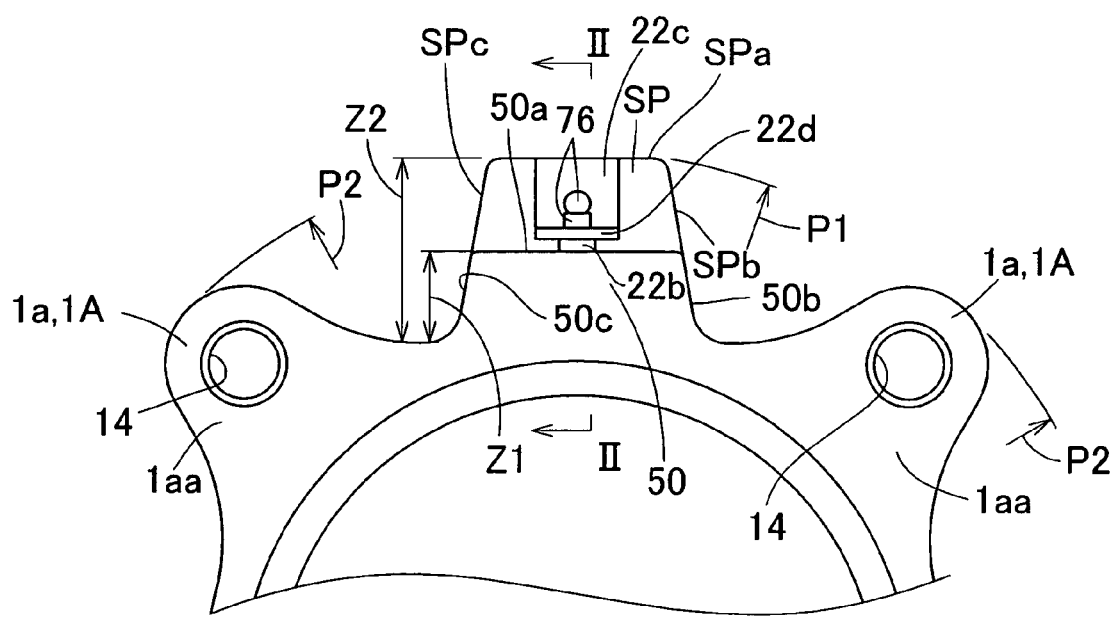
FIG. 31 is a broken front elevational view showing the outer member and the strain sensor unit employed in the sensor equipped wheel support bearing assembly.
Figure 32A:
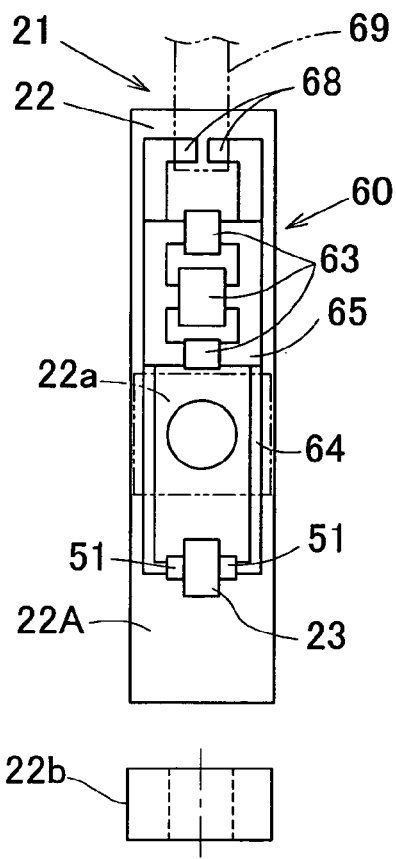
FIG. 32A is a rear view showing the strain sensor unit and the first and second fitting members shown as separated from each other.
Figure 32B:
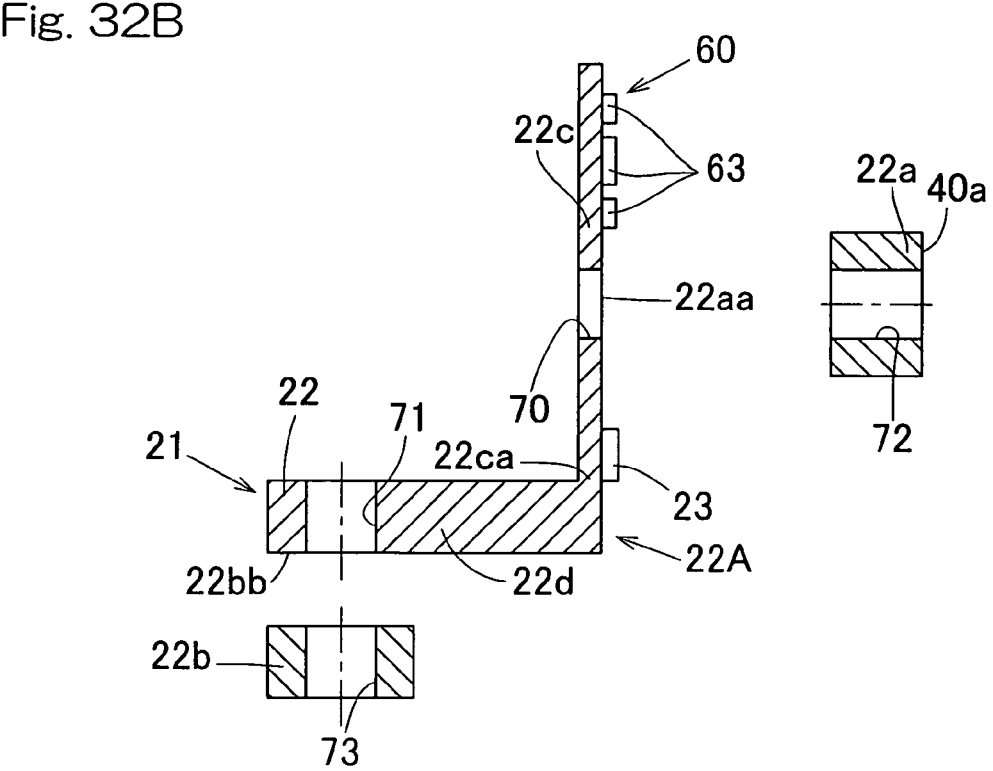
FIG. 32B is a broken side view thereof.

The outer peripheral surface of the outer member 1 is provided with a sensor fixing projecting piece SP protruding in a radially outward direction. This sensor fixing projecting piece SP is interposed between a bolt hole-provided projecting piece 1A in the outer peripheral surface of the outer member 1 and a bolt hole-provided projecting piece 1A neighboring the bolt hole-provided projecting piece 1A and is, as best shown in FIG. 31, formed in a generally rectangular shape when viewed from front. The term "when viewed from front" is analogous to a viewing of an object in an axial direction. A foremost end portion of this sensor fixing projecting piece SP, that is, a radial position P1 of a radially oriented outer edge portion SPa is provided at a position, which forms a portion of, for example, the same pit circle as a radial position P2 of a radially oriented outer peripheral edge portion of the bolt hole-provided projecting piece 1A. It is, however, to be noted that it is not always limited to the same pitch circle.

An inboard side surface SP1 of the sensor fixing projecting piece SP, that is, a right side end face shown in FIG. 29 and an inboard side surface 1A1 of the bolt hole-provided projecting piece 1A are so provided as to assume the same position in the axial direction. Thereby, the respective inboard side surfaces SP1 and 1A1 of the sensor fixing projecting piece SP and the bolt hole-provided projecting piece 1A may be arranged in a fashion urged against the knuckle. Also, an outboard side surface SP2 of the sensor fixing projecting piece SP that is, a left end face shown in FIG. 29 and an outboard side surface 1A2 of the bolt hole-provided projecting piece 1A are so provided as to assume the same position in the axial direction. It is, however, to be noted that it is not always limited to the same position. Also, the outboard side surface SP2 of the sensor fixing projecting piece SP is flattened and is so constructed as to have a capability of being fixed tightly to a surface 40a of the first contact fixing element 22a.

In the strain generating member 22, an axially extending bolt insertion hole 70 is formed in the first fixing surface 22aa of the radially oriented portion 22c and a radially extending bolt insertion hole 71 is formed in the second fixing surface 22bb of the axially oriented portion 22d.

In the outer peripheral surface of the outer member 1, at a position which lies in the same phase relative to a circumferential position of the sensor fixing projecting piece SP, a pedestal 50 projecting in a radially outward direction is provided. The radially projecting position of the pedestal 50 referred to above is so provided as to lie radially inwardly of the radially projecting position of the sensor fixing projecting piece SP. The amount of projection Z1 of the pedestal 50 from an outer peripheral surface base end portion of the outer member 1 is, for example, about ½ of the amount of projection Z2 of the sensor fixing projecting piece SP from the outer peripheral surface base end portion.

An upper surface of the pedestal 50 is flattened to form a flat area 50a and the axially oriented portion 22d of the strain generating member 22 is fixed to this flat area 50a. The flat area 50a of this pedestal 50 is so formed as to lie vertical relative to a radially extending axis passing through a center of the bearing assembly. One side surface 50b of the pedestal 50 forms, that is, laps, when viewed from front as shown in FIG. 31, along one side surface SPb of the sensor fixing projecting piece SP, while the opposite side surface 50c of the pedestal 50 laps, when viewed from front, along the opposite side surface SPc of the sensor fixing projecting piece SP. The distance between the side surface 50b and the opposite side surface 50c may be either narrow or parallel in a direction radially outwardly.

The first contact fixing element 22a is formed with an axially extending bolt insertion hole 72 and the sensor fixing projecting piece SP is formed with an axially extending bolt threading hole 74 having an inner peripheral surface thereof formed with a female thread defined at a location corresponding to the bolt insertion hole 70 in the first fixing surface 22aa and the bolt insertion hole 72 in the first contact fixing element 22a.

The second contact fixing element 22b is formed with a radially extending bolt insertion hole 73 and the pedestal 50 is formed with a radially extending bolt threading hole 75 defined at a location corresponding to the bolt insertion hole 71 in the second fixing surface 22bb and the bolt insertion hole 73 in the second contact fixing element 22b.

The bolt insertion hole 70 in the radially oriented portion 22c of the strain generating member 22 and the bolt insertion hole 72 in the first contact fixing element 22a are so arranged as to be coaxial relative to the bolt threading hole 74 in the sensor fixing projecting piece SP. Also, the bolt insertion hole 71 in the axially oriented portion 22d of the strain generating member 22 and the bolt insertion hole 73 in the second contact fixing element 22b are so arranged as to be coaxial relative to the bolt threading hole 75 in the pedestal 50. In this condition of arrangement, a bolt 76 is passed from the outboard side into the bolt insertion holes 70 and 72. Also, a bolt 76 is inserted from the outboard side into the bolt insertion holes 71 and 73. By threading the male threads of those bolts 76 and 76 into the bolt threading holes 74 and 75, respectively, the strain sensor unit 21 is fixed to the outer member 1.

In a condition in which the strain sensor unit 21 is fixed, the first fixing surface 22aa of the strain generating member 22 is fixed to a radially outward portion of the outboard side surface SP2 in the sensor fixing projecting piece SP in contact therewith through the first contact fixing element 22a. Also, the second fixing surface 22bb is fixed to the flat area 50a of the pedestal 50 through the second contact fixing element 22b in contact therewith. Further, the first and second fixing surfaces 22aa and 22bb are so fixed as to assume respective positions that lie in the same phase relative to the circumferential direction of the outer member 1. When the first and second fixing surfaces 22aa and 22bb are rendered to be in the same phase in the circumferential direction, the length of the strain generating member 22 can be reduced and, therefore, installation of the strain sensor unit 21 relative to the outer member 1 is facilitated.

As best shown in FIG. 29, for processing an output from the sensor element 23, there are provided an acting force calculating section 31 and an abnormality determining section 32. The acting force calculating section 31 and the abnormality determining section 32 may be provided either in a sensor signal processing circuit 60 mounted on the wheel support bearing assembly or in an electric control unit (ECU) of the automotive vehicle.

The operation of the sensor equipped wheel support bearing assembly of the above described construction will be hereinafter described. When the load is imposed on the hub unit 9, the outer member 1 undergoes a deformation through the rolling elements 5. Such deformation of the outer member 1 is transferred to the strain generating member 22 through the first and second contact fixing elements 22a and 22b, accompanied by deformation of the strain generating member 22. The strain induced in the strain generating member 22 is measured by the sensor element 23. At this time, the radially oriented portion 22c of the strain generating member 22 deforms in accord with deformation of the sensor fixing projecting piece SP of the outer member 1. In the case of this applied mode, since the strain generating member 22 is of the L-shaped configuration, the strain concentrates in the vicinity of a corner area between the radially oriented portion 22c and the axially oriented portion 22d and on one side adjacent the radially oriented portion 22c and, hence, the strain appears as a more considerable strain than that in the outer member 1. In other words, the strain developed at a bent area 22ca in the radially oriented portion 22c represents a transferred and expanded form of the strain at an R portion SPR at a base end of the sensor fixing projecting piece SP. Since this strain is measured by the sensor element 23, the strain occurring in the outer member 1 can be detected with a high sensitivity and the strain measuring accuracy can be increased.

Also, the inboard side surface SP1 of the sensor fixing projecting piece SP and the inboard side surface 1A1 of the bolt hole-provided projecting piece 1A are so provided as to assume the same position in the axial direction and those inboard side surfaces SP1 and 1A1 of the sensor fixing projecting piece SP and the bolt hole-provided projecting piece 1A, respectively, are disposed as urged against the knuckle. In addition, since the sensor fixing projecting piece SP is not formed with, for example, a bolt hole for securement to the vehicle body, it is possible for the first contact fixing element 22a to be fixed to an outer diametric portion of this sensor fixing projecting piece SP in contact therewith.

For this reason, as is the case in which the first fixing surface 22a is provided in the flange 1a surface for securement to the vehicle body, it is possible to increase the difference in radial position between the first and second fixing surfaces 22aa and 22bb as large as possible. Accordingly, the strain occurring in the outer member 1 can appear in the strain generating member 22 as transferred and expanded.

Since change of the strain differs depending on the direction and the magnitude of the load, by determining the relation between the strain and the load beforehand by means of a series of experiments and/or simulations, an external force acting on the wheel support bearing assembly or a force acting between a wheel tire and a road surface can be calculated. The acting force calculating section 31 referred to previously makes use of the relation between the strain and the load, preset by means of the experiments and/or simulations, to calculate the external force acting on the wheel support bearing assembly or the force acting between the wheel tire and the road surface from an output of the strain sensor unit 23. The abnormality determining section 32 referred to previously outputs an abnormality signal to the outside in the event that the external force acting on the wheel support bearing assembly or the force acting between the wheel tire and the road surface, which has been calculated by the acting force calculating section 31, exceeds a tolerance value. This abnormality signal can be used in a vehicle control of the automotive vehicle. Also, if the external force acting on the wheel support bearing assembly or the force acting between the wheel tire and the road surface is outputted on a real time, a meticulous vehicle control can be achieved.

In this sensor equipped wheel support bearing assembly, the first fixing surface 22aa of the strain sensor unit 21 is fixed to the radially outwardly protruding sensor fixing projecting piece SP provided between the neighboring bolt hole-provided projecting pieces 1A and 1A in the outer peripheral surface of the outer member 1, through the first contact fixing element 22a. Along therewith, since the second fixing surface 22bb of the strain sensor unit 21 is fixed to the pedestal 50 on the outer peripheral surface of the outer member 1 through the second contact fixing element 22b, the load detecting sensor can be installed compactly in the automotive vehicle.

In order to fix a portion of the strain sensor unit 21 to the sensor fixing projecting piece SP, which is a dedicated component part, a contact fixing portion of the sensor fixing projecting piece SP relative to the strain sensor unit 21 can be provided in tight contact in correspondence with the strain sensor unit 21 without any additional processing being effected. In this way, the strain generating member 22 can be fixed stably on the outer peripheral surface of the outer member 1 which is the stationary member. Accordingly, it is possible to suppress variation in sensor output from the sensor element 23 and to stabilize it. Also, since the strain generating member 22 is a simple component part that can be prepared by the use of, for example, any known press work, the strain sensor unit 23 can be provided in the strain generating member 22 and, as compared with the conventional art, in which a strain gauge is bonded to the outer member, it is possible to increase the mass productivity and to reduce the cost. However, the strain generating member 22 is not limited to a product prepared by the use of press work. In addition, as compared with a portion of a strain sensor being fixed to the bolt hole-provided projecting piece, interference of the strain sensor unit 21 with bolts or the like that are threadingly engaged in the bolt hole-provided projecting piece 1A is prevented, and the freedom of design can be increased correspondingly.

Also, in the outer peripheral surface of the outer member 1, the pedestal 50 projecting radially outwardly is provided at such a position that lies in the same phase as the peripheral position of the sensor fixing projecting piece SP; the upper surface of this pedestal 50 is flattened to provide the flat area 50a; and the second contact fixing element 22b of the strain sensor unit 21 is fixed to this flat area 50a. For this reason, the second contact fixing element 22b of the strain sensor unit 21 can be provided in tight contact in correspondence with the flattened surface of the flat area 50a. Accordingly, another portion of the strain sensor unit 21 can be stably and firmly fixed to the flat area 50a. The work of fixing such another portion of the strain sensor unit 21 is effective to reduce the length of time required to complete such fixing work and also to lessen the work load.

Figure 33:
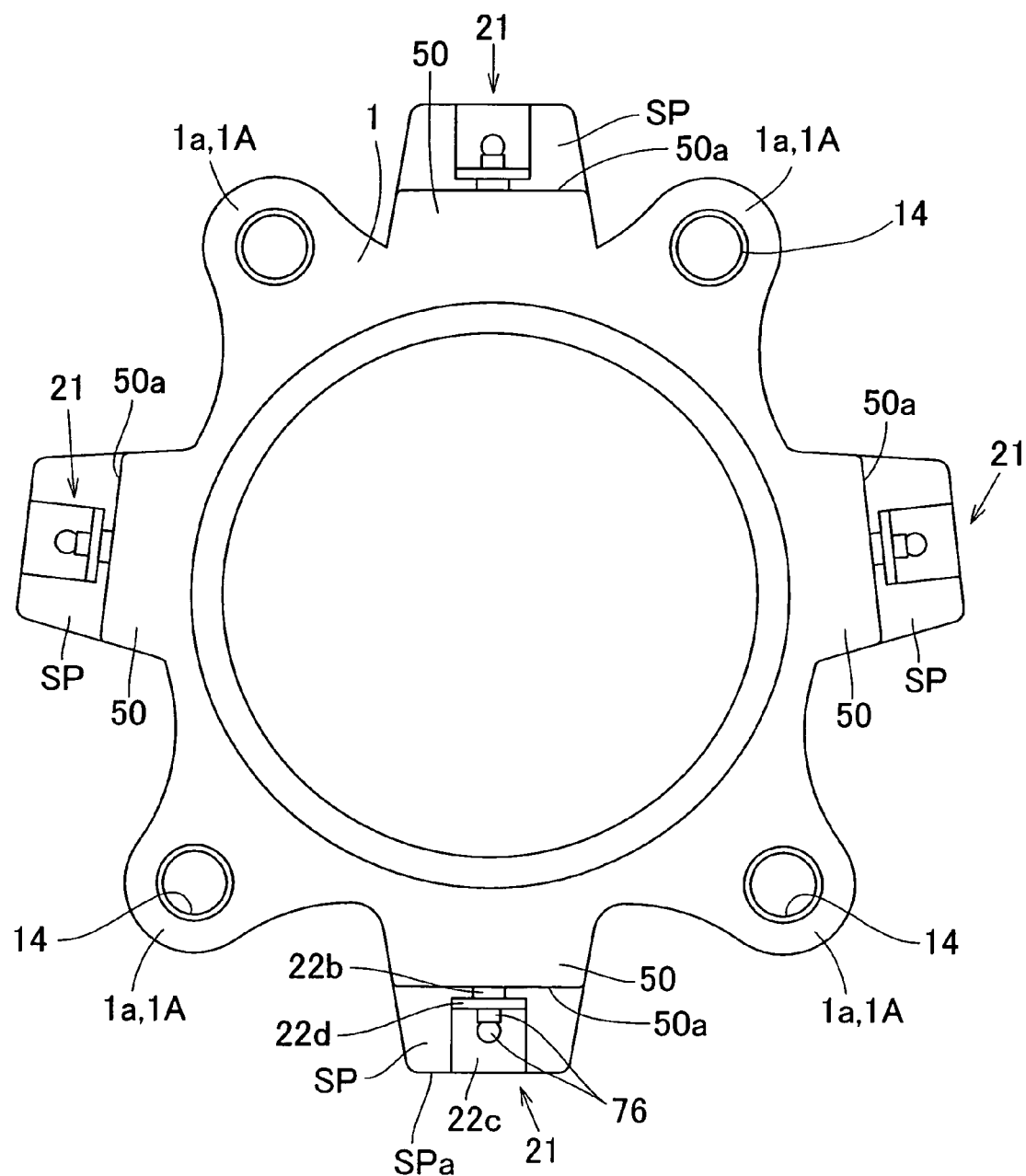
FIG. 33 is a front elevational view showing the outer member and the strain sensor unit employed in the sensor equipped wheel support bearing assembly according to a fifth example.

Although in this fourth applied example, the outer member 1 has been shown and described as provided with the single sensor fixing projecting piece SP and that portion of the strain sensor unit 21 has been shown and described as fixed to this sensor fixing projecting piece SP, it is not always limited to such mode. By way of example, as shown in FIG. 33, a plurality of sensor fixing projecting pieces SP may be provided in the outer member 1, in which case that portion of the strain sensor unit 21 is fixed to each of those sensor fixing projecting pieces SP. When the strain sensor unit 21 is provided at two or more locations, a further highly accurate load detection can be accomplished.

Although the previously described applied example is such that the strain generating member 22, the first and second contact fixing elements 22a and 22b and the outer member 1 are fixed by the use of the bolts 76, the fixing may be accomplished by the use of a bonding agent. Also, both of the bolts and the bonding agent may be concurrently employed. In addition, without using any bonding agent and bolts, the strain generating member 22, the first and second contact fixing elements 22a and 22b and the outer member 1 may be fixed in position by means of welding, or even pins. The employment of any of those fixing structures is effective to firmly fix the strain generating member 22, the first and second contact fixing elements 22a and 22b and the outer member 1. For this reason, displacement of the strain generating member 22 relative to the outer member 1 is prevented, and deformation occurring in the outer member 1 can be accurately transferred to the strain generating member 22.

The radially oriented portion 22c of the strain generating member 22 and the first contact fixing element 22a may be provided integrally and the axially oriented portion 22d and the second contact fixing portion 22b may be provided integrally. Also, the first and second contact fixing elements 22a and 22b may be dispensed with from the component elements of the strain sensor unit and the radially oriented and axially oriented portions of the strain generating member can be fixed directly to the sensor fixing projecting piece and the pedestal. In such case, the number of component parts used in the sensor equipped wheel support bearing assembly can be reduced to simplify the assemblage.

As a modified form of the strain sensor unit, a temperature sensor or the like may be provided in the radially oriented portion 22c of the strain generating member 22 as a component separate from the sensor element 23. For this temperature sensor, a platinum temperature measuring resistor or a thermocouple or a thermistor, for example, may be employed. In addition, a sensor capable of detecting a temperature other than that may be employed.

Even in the wheel support bearing assembly equipped with the strain sensor unit of the structure hereinbefore described, the sensor element 23 detects the strain induced in the strain generating member 22 so that the load acting on the vehicle can be measured from such strain. In the meantime, in the wheel support bearing assembly temperature tends to change during the use thereof and a change in temperature affects the strain induced in the strain generating member 22 or the operation of the sensor element 23. Accordingly, detecting the temperature of the strain generating member 22 with the temperature sensor, which is arranged in the strain generating member 22, and correcting an output of the sensor element 23 in response to the temperature so detected is effective to eliminate such influence as brought about by temperature. In this way, a highly accurate load detection can be accomplished.

In the next place, the fourth applied example includes the following fourth mode.

[First Aspect of Fourth Mode]

The sensor equipped wheel support bearing assembly according to the first aspect of the fourth mode is a wheel support bearing assembly including an outer member having an inner periphery formed with a plurality of rolling surfaces, an inner member having rolling surfaces defined therein in face-to-face relation with the respective rolling surfaces in the outer member, a plurality of rows of rolling elements interposed between those rolling surfaces, a vehicle body fitting flange formed in a peripheral surface of one of the outer member and the inner member, that serves as a stationary member, and adapted to be fitted to a knuckle, the flange being provided with a bolt hole that is defined at a plurality of locations in a direction circumferentially thereof, circumferential portions of the flange, where the corresponding bolt holes are defined, protruding in an outer diametric direction beyond any other portion thereof to render such flange to be a bolt hole-provided projecting piece, and a sensor fixing projecting piece protruding radially outwardly provided in an outer peripheral surface of the stationary member and between the neighboring bolt hole-provided projecting pieces, in which a portion of a sensor unit including a strain generating member and a sensor element fitted to the strain generating member is fixed to the sensor fixing projecting piece while another portion of the strain sensor unit is fixed to the outer peripheral surface of the stationary member.

When the load acts on the rotating member during the travel of the automotive vehicle, the stationary member undergoes deformation through the rolling elements and such deformation brings about a strain in the strain sensor. The strain sensor unit detects the strain induced in the strain generating member. By determining the relation between the strain and the load beforehand by means of a series of experiments and/or simulations, the load acting on the vehicle wheel can be detected from an output of the strain sensor unit. Also, the load so detected can be used in a vehicle control of the automotive vehicle.

The sensor equipped wheel support bearing assembly according to the first aspect of the fourth mode is such that the strain generating member and a portion of the strain sensor unit fitted to this strain generating member is fixed to the sensor fixing projecting piece protruding radially outwardly in the outer peripheral surface of the stationary member and between the neighboring bolt hole-provided projecting pieces. Along therewith, since that another portion of the strain sensor unit is fixed to the outer peripheral surface of the stationary member, the sensor unit for the load detection can be installed compactly in the automotive vehicle.

Since that portion of the strain sensor unit is fixed to the sensor fixing projecting piece, which is a dedicated component part, the strain generating member of the strain sensor unit can be stably fixed to the stationary member. Accordingly, it is possible to suppress variation of the sensor output from the strain sensor unit and to stabilize it. Also, since the strain generating member is a simple component part that is provided in the stationary member, fitting the strain sensor unit or the like thereto is effective to render the mass productivity to be excellent and to reduce the cost as compared with the conventional art, in which a strain gauge is bonded to an outer ring. Yet, as compared with the case in which that portion of the strain sensor is fixed to the bolt hole-provided projecting piece, there is no possibility of interference of the strain sensor unit with bolts or the like that are threadingly engaged in the bolt hole-provided projecting piece and the freedom of design can be increased correspondingly.

[Second Aspect of Fourth Mode]

In the first aspect of the fourth mode, of the outer peripheral surface of the stationary member, at a position which lies in the same phase relative to a circumferential position of the sensor fixing projecting piece, a pedestal projecting in a radially outward direction may be provided, an upper surface of which is flattened to define a flat area to which that another portion of the strain sensor unit is fixed. In this case, that another portion of the strain sensor unit can be tightly provided in correspondence with the flattened surface of the flat area. Accordingly, unlike the case, in which it is fixed to an outer peripheral surface, which is a cylindrical surface, of the stationary member of the wheel support bearing assembly, that another portion of the strain sensor unit can be firmly and stably fixed to the flat area. The work of fixing such another portion of the strain sensor unit is effective to reduce the length of time required to complete such fixing work and also to lessen the work load, as compared with the case in which the strain generating member is fixed to the generally cylindrical surface.

[Third Aspect of Fourth Mode]

In the first aspect of the fourth mode, the fixing of the strain generating member and the stationary member together may be carried out by the use of either one of a bolt and a bonding agent or the both or welding.

If the strain generating member and the stationary member are fixed together by the use of any one of the foregoing methods, the strain generating member can be firmly fixed to the stationary member. For this reason, there is no possibility that the strain generating member may displace in position relative to the stationary member, and it is therefore possible to transmit the deformation of the stationary member to the strain generating member accurately.

[Fourth Aspect of Fourth Mode]

In the first aspect of the fourth mode, the strain generating member may be of an L-shaped configuration including a radially oriented portion extending in a radial direction and an axially oriented portion extending in an axial direction

[Fifth Aspect of Fourth Mode]

In the first aspect of the fourth mode, the strain generating member referred to above may be fitted to the outer peripheral surface of the stationary member and the sensor fixing projecting piece through respective mounting members. In this case, the strain generating member can have a simplified shape and, accordingly, the processing of the strain generating member can be facilitated with the cost reduced accordingly.

[Sixth Aspect of Fourth Mode]

In the first aspect of the fourth mode, the stationary member can be the outer member. In this case, a portion of the strain sensor unit has to be fitted to the sensor fixing projecting piece on the outer peripheral surface of the outer member.

[Seventh Aspect of Fourth Mode]

In the first aspect of the fourth mode, an acting force calculating section may be provided, which is operable to calculate an external force acting on the wheel support bearing assembly or a force acting between a wheel tire and a road surface in response to an output form the strain sensor unit.

As hereinbefore fully described, in each of the preferred embodiments of the present invention and the applied examples, reference has been made to the outer member 1 serving as the stationary member, but the present invention can be equally applied to a wheel support bearing assembly of a type, in which the inner member serves as the stationary member, in which case the strain sensor unit 21 is to be provided on a peripheral surface which forms an inner periphery of the inner member 2.

Also, although each of the preferred embodiments of the present invention and the applied examples has been shown and described as applied to the wheel support bearing assembly of the third generation type, the present invention can be equally applied to a wheel support bearing assembly of a first or second generation type, in a bearing unit and a hub comprises members separate from each other, and also to a wheel support bearing assembly of a fourth generation type, in which a portion of the inner member is constituted by an outer ring of a constant velocity joint. Also, this sensor equipped wheel support bearing assembly is applicable to any wheel support bearing assembly for use in supporting a vehicle driven wheel and, yet, to a tapered roller bearing assembly of any of the various generation types for the support of a vehicle wheel.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A sensor equipped wheel support bearing assembly for supporting a vehicle wheel rotatably relative to a vehicle body, comprising:

an outer member having an inner periphery formed with a plurality of rolling surfaces;

an inner member having rolling surfaces defined therein in face-to-face relation with the respective rolling surfaces in the outer member;

a plurality of rows of rolling elements interposed between the rolling surfaces of the outer and inner member;

a strain sensor unit, made up of a strain generating member and a sensor element fitted to the strain generating member for detecting strains induced in the strain generating member, is fitted to the outer member, the outer member serving as a stationary member, the strain generating member including first and second contact fixing elements fixed to respective locations of the stationary member, the first contact fixing element being fixed to a flange surface provided in the stationary member and the second contact fixing element being fixed to a peripheral surface of the stationary member, and the sensor element being arranged at a location radially inwardly of the first contact fixing element on a sensor mounting surface, which is an inboard side surface of a radially oriented portion of the strain generating member; and a covering member that is provided on a mounting surface of the strain generating member of the strain sensor unit, on which the sensor element is mounted, to cover at least the sensor element sealingly in contact therewith, being made of a resin which is over-molded or an elastomer bonded by vulcanization.

2. The sensor equipped wheel support bearing assembly as claimed in claim 1, wherein the sensor element in the strain sensor unit is provided with a cable drawn outwardly from a location proximate to the second contact fixing element in the strain generating member fixed to the peripheral surface of the stationary member in a direction circumferentially of the stationary member.

3. The sensor equipped wheel support bearing assembly as claimed in claim 2, wherein the cable is fixed to the peripheral surface of the stationary member by means of a clamp member equipped with a ferrite.

4. The sensor equipped wheel support bearing assembly as claimed in claim 1, further comprising an acting force calculating section operable in response to an output from the sensor element to calculate an external force acting on the wheel support bearing assembly or a force acting between a tire and a road surface.

5. The sensor equipped wheel support bearing assembly as claimed in claim 1, wherein the strain generating member is of an L-shaped configuration including a radially oriented segment, extending in a radial direction, and an axially oriented segment extending in an axial direction.

6. The sensor equipped wheel support bearing assembly as claimed in claim 1, wherein the outer member, that serves as the stationary member, is formed integrally with a sensor fixing boss, and the strain generating member and at least one strain sensor unit fitted to the strain generating member are provided on the stationary member through the sensor fixing boss.

7. The sensor equipped wheel support bearing assembly as claimed in claim 6, wherein the sensor fixing boss includes a first boss formed integrally with the flange surface provided in the stationary member and a second boss formed integrally with the peripheral surface of the stationary member, and wherein the first contact fixing element is adapted to be fixed to a foremost end face of the first boss in contact therewith and the second contact fixing element is adapted to be fixed to a foremost end face of the second boss in contact therewith.

* * * * *